US012346670B2

(12) United States Patent
McVeigh et al.

(10) Patent No.: US 12,346,670 B2
(45) Date of Patent: Jul. 1, 2025

(54) SYSTEMS AND METHODS FOR GENERATION OF A TENANT-SPECIFIC SERVICE FOR A SOFTWARE-AS-A-SERVICE PLATFORM

(71) Applicant: Suvoda LLC, Conshohocken, PA (US)

(72) Inventors: Andrew James Lawson McVeigh, Malibu, CA (US); Adrian Vasile, Denver, CO (US); Rahul Mishra, Devon, PA (US); George Lucian Pancescu, Brasov (RO)

(73) Assignee: Suvoda LLC, Conshohocken, PA (US)

( * ) Notice: Subject to any disclaimer, the term of this patent is extended or adjusted under 35 U.S.C. 154(b) by 0 days.

(21) Appl. No.: 17/944,906

(22) Filed: Sep. 14, 2022

(65) Prior Publication Data
US 2023/0385030 A1 Nov. 30, 2023

Related U.S. Application Data

(60) Provisional application No. 63/347,422, filed on May 31, 2022.

(51) Int. Cl.
*G06F 8/65* (2018.01)
*G06F 8/30* (2018.01)
(Continued)

(52) U.S. Cl.
CPC .............. *G06F 8/311* (2013.01); *G06F 8/71* (2013.01); *G06F 8/61* (2013.01); *G06F 8/65* (2013.01);
(Continued)

(58) Field of Classification Search
CPC . G06F 8/311; G06F 8/71; G06F 8/433; G06F 8/75; G06F 8/36; G06F 16/188; G06F 9/5077; H04L 67/10
See application file for complete search history.

(56) References Cited

U.S. PATENT DOCUMENTS 8,650,534 B2    2/2014   Kopp et al.
9,509,571 B1   11/2016   Liu
(Continued)

FOREIGN PATENT DOCUMENTS

EP          4033425 A1     7/2022

OTHER PUBLICATIONS

Carlo Curino et al., Schism: a Workload-Driven Approach to Database Replication and Partitioning, 2010, [Retrieved on Feb. 10, 2025]. Retrieved from the internet: <URL: https://dspace.mit.edu/bitstream/handle/1721.1/73347/Madden_Schism.pdf?sequence=1&isAllowed=y> pp. 11 (1-11) (Year: 2010).*

(Continued)

*Primary Examiner* — Anibal Rivera
(74) *Attorney, Agent, or Firm* — Ballard Spahr LLP

(57) ABSTRACT

Technologies are provided for generation of an executable package that provides a tenant-specific service. Generation of the executable package can be based on customization assets and a core codebase. The core codebase can define core modules that provide a core service that is common across tenants. Each core module includes one or multiple extension points. The customizations can be defined within one or multiple virtual partitions, where a virtual partition includes a filesystem or another type of non-transitory storage structure. The VP can include multiple customization resources and customization components. The customizations can permit building extension modules that can be mapped onto respective extension points of core module(s) in order to customize the common core service and yield the tenant-specific service. The core codebase can be built to generate built core modules. The executable package can be formed by combining built extension modules and built core modules.

34 Claims, 19 Drawing Sheets

(51) Int. Cl.
*G06F 8/61* (2018.01)
*G06F 8/71* (2018.01)
*G06F 9/455* (2018.01)
*G06F 16/2457* (2019.01)
*G06F 16/9038* (2019.01)
*H04L 9/40* (2022.01)

(52) U.S. Cl.
CPC .... *G06F 9/45533* (2013.01); *G06F 16/24573* (2019.01); *G06F 16/9038* (2019.01); *H04L 63/1433* (2013.01)

(56) References Cited

U.S. PATENT DOCUMENTS

| | | | |
|---|---|---|---|
| 10,824,648 | B2 | 11/2020 | Srivastava |
| 11,061,548 | B1 | 7/2021 | Catakli et al. |
| 2013/0297544 | A1 | 11/2013 | Allgaier |
| 2016/0246592 | A1 | 8/2016 | Jamjoom et al. |
| 2016/0321288 | A1* | 11/2016 | Malhotra ............ H04L 63/0428 |
| 2018/0218295 | A1 | 8/2018 | Hasija et al. |
| 2018/0324204 | A1* | 11/2018 | McClory ............... G06F 9/5027 |
| 2018/0375788 | A1 | 12/2018 | Ionita et al. |
| 2019/0253457 | A1* | 8/2019 | Koul ....................... H04L 63/20 |
| 2019/0265971 | A1 | 8/2019 | Behzadi et al. |
| 2020/0137097 | A1 | 4/2020 | Zimmermann et al. |
| 2020/0356635 | A1 | 11/2020 | Szturo et al. |
| 2021/0250424 | A1 | 8/2021 | Cameron et al. |
| 2022/0129798 | A1 | 4/2022 | Chintalapati et al. |
| 2022/0138207 | A1* | 5/2022 | Yelheri .................. G06F 16/289 707/722 |
| 2022/0382522 | A1 | 12/2022 | Heynemann Nascentes da Silva et al. |
| 2023/0315418 | A1* | 10/2023 | Bokhan-Dilawari ..... G06F 8/61 |
| 2023/0315789 | A1* | 10/2023 | Werner ............... G06F 16/9027 |
| 2023/0319054 | A1* | 10/2023 | Hendrey ............... H04L 63/105 726/4 |

OTHER PUBLICATIONS

API Managment Platform & API Gateway_Tyk; http://tyk.oi/, dated Dec. 14, 2022; 6 pages.
Piral—The Ultimate Micro Frontends Framemwork; https:///www.piral.io/, dated Dec. 14, 2022, 11 pgs.
McVeigh, "A Rigorous, Architectural Approach to Extensivle Applications", Imperial College London, Department of Computing, dated 2009, 298 pages.
SaaS Knockoffs, "Often Disguised as Wolves in SaaS Clothing", SaaS knockoffs fail to live up to expectations, 7 pages.
Vault Query Language, Introduction to Vault Queries, https://developer.veevavault.com/vql/#introduction-to-vault-queries, dated Dec. 14, 2022, 114 pages.
API Managment Platform & API Gateway_Tyk; http://tyk.io/, dated Dec. 14, 2022; 16 pages.
Micro Frontends, https://microfrontends.com, dated Dec. 14, 2002, 4 pages.
Piral—The Ultimate Micro Frontends Framemwork; https:///www.piral.io/, dated Dec. 14, 2022, 4 pgs.
Webpack, Bundle your assets, https://webjack.js.org/, dated Dec. 14, 2002, 6 pgs.
Discover Data Warehouse & Business Intelligence Architecture, https://www.datapine.com/blog/date-warehousing-ans-business-intellig . . . ; dated Dec. 14, 2022, 22 pages.
Data Warehousing—Schemas; https://www.tutorialspoint.com/dwh/dwh_schemas.htm, dated Dec. 14, 2022; 5 pages.
Heap, "8 Common API Gateway Request Transformation Policies", Jul. 27, 2021, API Gateway Request TransformationPolicies Guide, https://konghq.com/clog/api-gateway-request-transformation, 18 pages.
Vault Query Language, Introduction to Vault Queries, https://developer.veevavault.com/vql/#introduction-to-vault-queries, dated Dec. 14, 2022, 112 pages.
Vault Developer Portal, API + DOCS, https://developer.veevavault.com, 2022, dated Dec. 14, 2022, 2 pages.
MDL, https://developer.veevavault.com/mdl/#component-support-matrix, dated Dec. 14, 2022, 6 pages.
Documentation, REST API, https://developer.veevavault.com/docs/#rest-api, dated Deceber 14, 2022, 36 pages.
Vault Java SDK Documention, https://developer.veevavault.com/sdk/#vault-java-sdk-overview, dated Dec. 14, 2022, 87 pages.
Veeva, "Veeva Annouces New Application to Speed Validation Execution" Sep. 15, 2021, https://veeva.com/eu, 2 pages.
Unified Paperless Validation Solution for Life Sciences | Veeva, Faster Validation at Low Cost, https://www.veeva.com/products/vault-validation-management, dated Dec. 14, 2022, 5 pages.
Components—Saleforce Lightning Component Library, https://developer.salesforce.com/docs/component-library/overview/co . . . ,dated Dec. 14, 2022, 50 pages.
GraphQL Admin API reference, https://shopify.dev/api/admin-graphql, dated Dec. 14, 2022, 4 pages.
Edwards, "GraphQL in eCommerce", https://developers.bloomreach.com/blog/2021/graphql-in-commerce.html, dated December Feb. 11, 2021, 11 pages.
E-commerce Al-Saleor Commerce, https://saleor.io/api, dated Dec. 14, 2022, 2 pages.
Super fast GraphQL API for eCommerce / Crystallize, Super fast GraphQL API for e Commerce, https://crystallize.com/graphql-api, dated Dec. 14, 2022, 15 pages.
Configuring and Extending Application, Oracle Fusion Cloud Applications, https://docs.oracle.com/en/cloud/assa/applications-common/22d/oaext/i . . . , dated Dec. 14, 2022, 1 page.
Fivetran / Automated, reliable, and secure data pipelines, "Optimize your data movement", https://www.fivetran.com/, dated Dec. 14, 2022, 6 pages.
Cloud Data Fusion | Google Cloud, Cloud Data Fusion, https://cloud.google.com/data-fusion, dated Dec. 14, 2022, 13 pages.
Enterprise API Gateway Management | Kong Inc., "Take control of your APIs across any environment", https://konghq.com/products/api-gateway-platform, dated Dec. 14, 2022, 11 pages.
Apigee API Mangement | Google Cloud,"Apigee API Managment", https://cloud.google.com/apigee/, dated Dec. 14, 2022, 21 pages.
Veeva Vault Platform | Veeva, "Bringing Content and Data Together", https://www.veeva.com/products/vult-platform/, dated Dec. 14, 2022, 7 pages.
U.S. Appl. No. 17/944,907, filed Sep. 14, 2022, Suvoda LLC.

* cited by examiner

410

Virtual-Partition-Trial-1243

Definitions & extensions for trial 1243

Files ▾ | Filter Files

/

| Name | Size | Last Commit | Message |
|---|---|---|---|
| configuration | | 2121-09-24 | no message |
| extensions | | 2121-09-24 | no message |
| metadata | | 2121-11-17 | working on definition for slides |
| modules | | 2121-11-17 | no message |
| validation-tests | | 2121-10-04 | demo for Tony Stark |
| workflows | | 2121-09-24 | no message |
| .gitignore | 624 B | 2121-09-24 | initial commit |
| README.md | 752 B | 2121-09-24 | updated protocol |
| virtual-partition-definition.json | 343 B | 2121-11-17 | no message |

415

README.md

Trial-1243: ABC Oncology Drug DS7  416

The clinical protocol specifies that the dosage limits are governed by the statistical presentation in the following paper: https://find.papers.src/27910076

This trial has adjusted the dosage calculations, and put in additional checks to avoid toxicity getting within 15% of max levels

Added fields: added subject weight

Augmented workflows: altered subject capture workflow to include weight

Notes: uses the common platform tests to validate as base – includes per-trial additional tests around dosage and toxicity is. – uses commons standards that include additional fields of height and country of birth

Forking status: no forking of any services required

FIG. 4A

```
virtual-partition-trial-1243
File System
  virtual-partition-trial-1243
    configuration
    extensions
    metadata
    modules
    validation tests
    workflows
    README.md
    virtual-partition-definition.json
``` virtual-partition-definition.json                                                    420

```
{
    "trial-name": "1243",
    "use-platform-version": "2.9.0",
    "release-feature-optin": "2.8.0",
    "use-base-virtual-partitions": [
        "https://bitbucket001.company.cloud/projects/platform-tests:1.9.3",
        "https://bitbucket001.company.cloud/projects/sponsorX-common-standards:1.7.1"
    ],
    "use-forked-repos": [
    ]
}
```

424 — use-platform-version
426 — release-feature-optin
428 — use-base-virtual-partitions
430a
430b

SYSTEMS AND METHODS FOR GENERATION OF A TENANT-SPECIFIC SERVICE FOR A SOFTWARE-AS-A-SERVICE PLATFORM

CROSS-REFERENCE TO RELATED APPLICATION

This application claims the benefit of and priority to U.S. Provisional Patent Application No. 63/347,422, filed May 31, 2022, the contents of which application are hereby incorporated by reference herein in their entireties.

BACKGROUND

In a software-as-a-service model of access to functionality provided by software, a computing platform hosts a version of the software that is common across end-user devices accessing the functionality via the computing platform. The access to the functionality can be referred to as multitenant access, where the end-users devices pertain to various different entities that have been granted access to the software. Each one of those entities can be referred to as a tenant. Besides accessing the functionality provided by the software, end-user devices pertaining to a tenant also can access storage infrastructure and other computing resources of the computing platform.

Although the software-as-a-service (SaaS) model provides straightforward access to the functionality of the software, without the burden of maintenance of that software, the codebase corresponding to the version of the software is common across tenants. Such codebase can be referred to as a platform. In some existing SaaS systems, tenant experience on the platform may be customized via restricted registration of tenant-specific logic, where such customization can rely on predetermined extensibility already built into that platform. That is, those existing SaaS systems can provide a restricted form of customizability, and expanding that customizability may entail adding new extensibility across the entire platform instead of focusing on individual functionality needs of each tenant accessing the platform.

Indeed, greater flexibility of customization can be more easily achieved in isolation, with a codebase configured and adjusted to provide functionality germane to a particular tenant. Customization of a codebase in this way, however, typically relies on modification of a monolithic, rather complex arrangement of program code. Modification of such an arrangement of program code can permit total customization. Yet, customization in such a fashion can be time intensive and rather unwieldy, and also can continually add to maintenance complexity by proliferating isolated customized codebases. Additionally, it may not be feasible to treat such codebases collectively because there may be no guarantees that the codebases conform to a defined set of functions.

Therefore, the ease of access to software in a SaaS multitenant platform and the rich tenant-specific customization of that software appear to be sharply opposed to one another in terms of design and implementation. Existing computing platforms that provide straightforward access to software to multiple tenants thus tend to lack rich, granular extensibility, and vice versa. Accordingly, much remains to be improved in existing technologies that provide multi-tenant access to software and tenant-specific customization to the software.

SUMMARY

It is to be understood that both the following general description and the following detailed description are illustrative and explanatory only and are not restrictive.

In one embodiment, the disclosure provides a computing system. The computing system includes one or more processors; and one or more memory devices storing computer-executable instructions that, in response to execution by the one or more processors, cause the computing system to: identify a group of one or more references to respective first virtual partitions, the group of one or more references defining a graph representative of a logical organization of the respective first virtual partitions, wherein the graph comprises a first node representing a first one of the respective first virtual partitions and a second node representing a second one of the respective first virtual partitions; determine that the group of one or more references satisfies a consistency criterion; generate a second virtual partition by flattening the graph, the second virtual partition containing one or more computer-readable components present in the respective first virtual partitions, wherein the flattening comprises applying, in graph order, one or more primitives present in at least one of the respective first virtual partitions; and generate, based on the one or more computer-readable components, one or more computer-executable components. The computing system also can generate an executable package component by combining the one or more computer-readable components with second computer-executable components corresponding to a group of core modules.

Additional elements or advantages of this disclosure will be set forth in part in the description which follows, and in part will be apparent from the description, or may be learned by practice of the subject disclosure. The advantages of the subject disclosure can be attained by means of the elements and combinations particularly pointed out in the appended claims.

This summary is not intended to identify critical or essential features of the disclosure, but merely to summarize certain features and variations thereof. Other details and features will be described in the sections that follow. Further, both the foregoing general description and the following detailed description are illustrative and explanatory only and are not restrictive of the embodiments of this disclosure.

BRIEF DESCRIPTION OF THE DRAWINGS

The annexed drawings are an integral part of the disclosure and are incorporated into the subject specification. The drawings illustrate example embodiments of the disclosure and, in conjunction with the description and claims, serve to explain at least in part various principles, elements, or aspects of the disclosure. Embodiments of the disclosure are described more fully below with reference to the annexed drawings. However, various elements of the disclosure can be implemented in many different forms and should not be construed as limited to the implementations set forth herein. Like numbers refer to like elements throughout.

FIG. 4A illustrates a user interface representing an example of a VP for a particular tenant, in accordance with one or more embodiments of this disclosure.

FIG. 4B illustrates a user interface representing another example of a VP for a particular tenant, in accordance with one or more embodiments of this disclosure.

DETAILED DESCRIPTION

Figure 1:
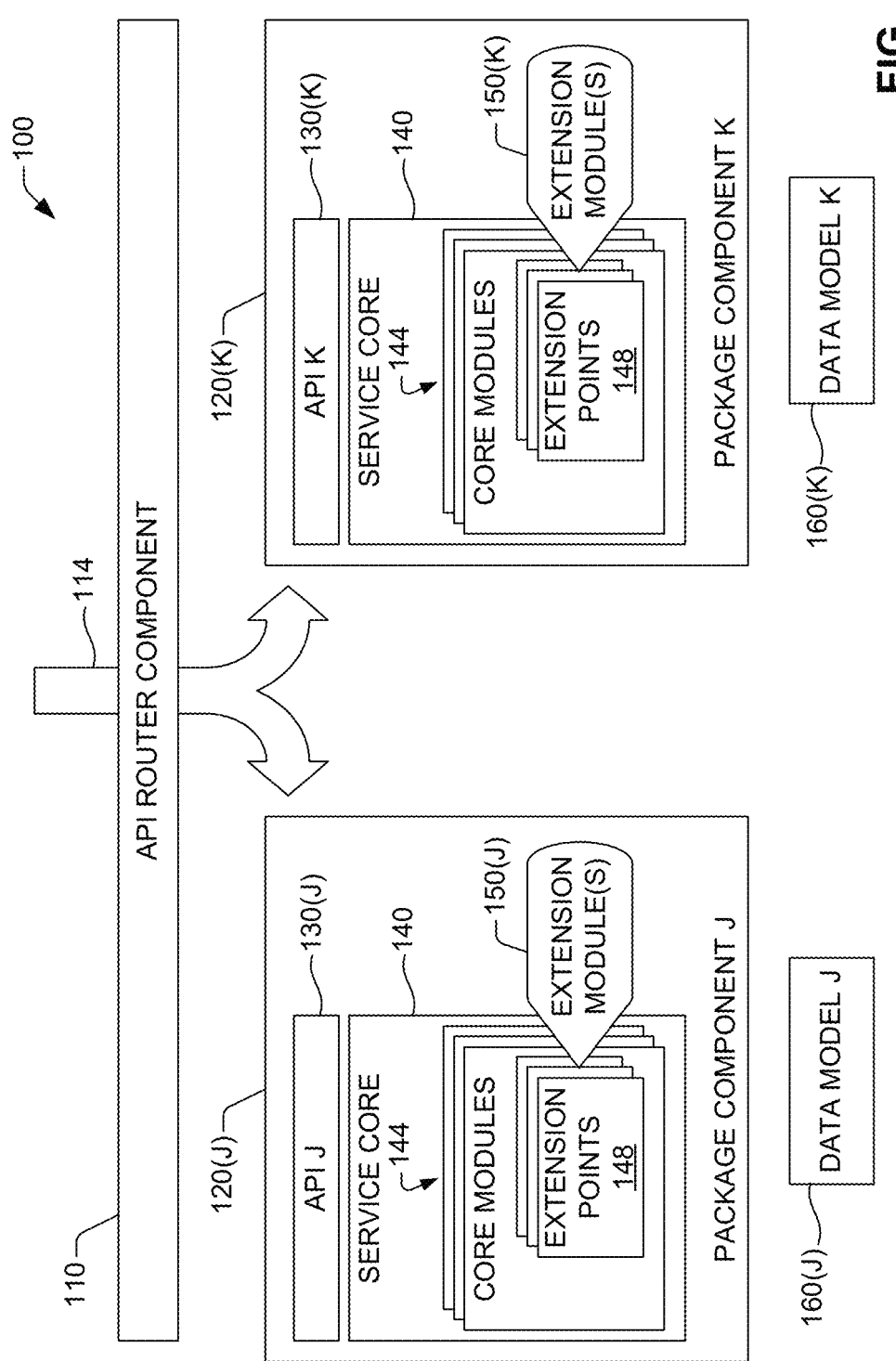
FIG. 1 illustrates an example of a computing system that implements an extensible SaaS platform providing services customized to respective single-tenants, in accordance with one or more embodiments of this disclosure.

The disclosure recognizes and addresses, among other technical challenges, the issue of extensibility of software-as-a-service (SaaS) computing platforms. As is described in greater detail below, embodiments of this disclosure provide an extensible SaaS computing platform that host single-tenant, tenant-specific services and includes an API that permits access to those services in multi-tenant fashion. Embodiments of the disclosure, individually or in combination, permit treating a collection of customized, single-tenant services as a single multi-tenant system, by building each service by integrating a group of one or more tenant-specific extension modules into a collection of core modules that are common among tenants. The collection of core modules by itself can be referred to as a core platform and can be customized by mapping extension modules onto extension points exposed by the collection of core modules, and, in some cases, also by providing configuration information. The customized core platform can have a superset of a common core API and common core data model. An API router component can be functionally coupled to one or more customized core platforms. The API router component can present the group of customized core platform as a multi-tenant platform to client devices in communication with the router. A client device can communicate with the router component to access the common core API of the multi-tenant platform, and also can selectively target each individual API function (or extensions) of individual customized core platforms. Further, some embodiments can uniquely and systematically augment core functionality of a group of core modules in situations where extension points present in the core module(s) may not be enough to effect a desired customization. Specifically, embodiments of the disclosure can temporarily fork a version of a core platform, allowing the incorporation of additional extension point(s) into the core platform. After the integrity of the operation of the added extension point(s) has been proven to be satisfactory, embodiments of the disclosure can then safely re-introduce (or fold) the extension point(s) into an upgraded common core. Each existing customized, single-tenant platform can be upgraded to a new core platform safely, in terms of satisfactory performance, using such an approach.

In some embodiments, a computing system includes computer-executable components comprising multiple core modules that provide a defined service. The multiple core modules also define a core API. The multiple core modules include at least one extension point corresponding to a first core module of the multiple core modules. Each extension point of the at least one extension point can be formed by program code in the first core module, where the program code defines logic associated with registration of one or multiple functions from another module. After that other module has been mapped to the extension point, core logic pertaining to first core module can then call the function(s) provided by that other module as part of the core logic. A first extension point of the at least one extension point corresponding to the first core module has a tenant-specific extension module mapped thereto that customizes the defined service. Customization results, at least partially, from registration of one or more defined functions in the tenant-specific module, which defined function(s) can be called by the first core module. Thus, the customized defined service is a tenant-specific service. The computer-executable components also can include an API and a data model both corresponding to a defined tenant. Tenant-specific extension modules mapped to the at least one extension point can customize the core API to yield the API corresponding to the defined tenant. The data model is customized in similar fashion. A collection of tenant-specific services can be treated as a single SaaS platform with a common core API by deploying an API router component overlaying, in logical space, the collection of tenant-specific services. Because tenant-specific extension modules can be maintained separate from core modules, tenant-specific services can be upgraded to a new core by pointing to the upgraded core modules.

With reference to the drawings, FIG. 1 illustrates an example of a computing system 100 that provides extensible functionality customized to a single-tenant, in accordance with one or more embodiments of this disclosure. The computing system 100 includes an API router component 110 and multiple executable package components for respective tenants, including an executable package component 120(J) for a tenant J and an executable package component 120(K) for a tenant K. The multiple executable package components provide respective single-tenant services, where each one of those single-tenant services can be customized to a respective particular tenant. In one example, a single-tenant service includes a clinical trial service. Each one of the multiple executable package components can be embodied in, for example, a container (such as Docker container), an executable binary file, or similar. The single-tenant services can have respective data models associated therewith. The single-tenant service provided by the executable package component J 120(J) can have a data model J 160(J) associated therewith, and the other single-tenant service provided by the executable package component K 120(K) can have a data model K 160(K) associated therewith. For purposes of illustration, in this disclosure a data model represents the form of and relationships among service data owned, generated, and accessed by a service. The service can be a tenant-specific service or a core service. The data model can include data entities and associations among at least some of the data entities, where the associations embody such relationships. A data entity includes a data structure having one or more fields. In one example, the data entity can be a table and fields can correspond to respective columns in the table. As such, the data model can include a group of tables and associations among two or more tables, where the associations logically link a field in a first table in the group and another field in another table in the group.

Further, the data model can be defined before the service data becomes available to the service. After the data model has been defined, the service data can be stored in a data storage according to the data model. In other words, the data model dictates how the service data is to be organized in the data repository. Simply for the sake of nomenclature, a data model corresponding to a core service is referred to as core data model, and a data model corresponding to tenant-specific service can be referred to simply as data model.

The API router component 110 exposes an API that permits access to the multiple single-tenant services as if the computing system 100 were a multi-tenant computing platform. To provide access in such a fashion, the API router component 110 can receive a message invoking a function call to a customized service for a particular tenant (e.g., tenant J or tenant K), where the message includes an attribute that identifies the particular tenant. The message can be received from a client computing device (not depicted in FIG. 1) via a communication network 114 that functionally couples the client computing device and the API router component 110. The communication network 114 or another communication network, in some cases, can functionally couple the API router component 114 and other components, such as the executable package component J 120(J) and the executable package component K 120(K). The API router component 110 can then redirect the function call to the customized defined service based on the attribute. The API router component 110 can be embodied in an API gateway, for example. The API exposed by the API router component 110 can be one of various types of APIs, such as a representational state transfer (REST) API, a GraphQL service, a simple object access protocol (SOAP) service, or a remote procedure call (RPC) API. In cases where the exposed API is a REST API, the attribute that identifies the particular tenant can be either an authentication token or a REST parameter. In other cases, the attribute can be a tenant identifier (ID) that uniquely identifies the defined tenant. The tenant ID can be a universally unique identifier (UUID), for example.

As mentioned, each single-tenant service can be customized to a particular tenant. To that end, the executable package component for the particular tenant can include a service core that has multiple core modules that provide a defined service. The service core also defines and exposes an API (referred to as core API or common core API), and further defines a data model (referred to as core data model or common core data model). The API exposed by the service core can be one of various types of APIs, such as a REST API, a GraphQL service, a SOAP service, or an RPC API. It is noted that the core API exposed by the service core can be a subset of the API exposed by the API router component 110. More specifically, the API exposed by the API router component 110 includes the union of the APIs respectively exposed by each customized single-tenant instance of the collection of customized single-tenant instances. For instance, the API exposed by the API router component 110 can expose the union of API J 130(J) and API K 130(K). First core module of the multiple cores modules can provide at least one first element to the data model, and a second core module of the multiple core modules can provide at least one second element to the data model. Additionally, or in some cases, the first core module can provide at least one first function to the API, and the second core module can provide at least one second function to the API. The API and the data model can result from changes configured by one or multiple core modules. For example, the first core module can change at least one of an extant data model or an extant API, resulting in at least a portion of the API or at least a portion of the data model associated with the service core.

The multiple core modules have at least one extension point. A first extension point of the at least one extension point can correspond to a first core module of the multiple core modules. For purposes of illustration, an extension point refers to program code that (i) identifies a function that may be invoked by the core module having the extension point, and (ii) calls out to an optional module for an implementation of the function. The optional module thus defines the function (or logic thereof) and, in that way, can add logic to the core module and/or can adjust logic in the core module. Rather than defining extension logic, the program code identifies a signature of a desired function and also serves as a placeholder for function (or logic) that is defined in the optional module.

The service core is common across the multiple executable package components within the computing system 100. That is, the multiple core modules and at least one extension points, the API, and the data model are common across the multiple executable package components. The defined service for the particular tenant can be customized by mapping one or multiple tenant-specific extension modules to respective ones of the extension point(s) present in the service core. Mapping refers to assigning functionality provided by the extension module to program code in the extension point within a core module that can invoke that functionality. The program code has been configured to serve as a placeholder for the functionality. The functionality can be assigned to the program code by reference—e.g., assigned by passing a reference to the functionality (or an object representing the functionality). Stated differently, mapping refers to taking a function from the extension module and registering that function with the core module, where the core module is configured to invoke that function. The function is registered (or assigned) by reference via an extension point within the core module. By registering that function with the core module, a customization dictated by the function can be achieved. Although mapping is referred to with respect to a core module and an extension module, the disclosure is not limited in that respect. Indeed, a module (core module or extension module) that defines a function can be mapped to another module (core module or extension module) having an extension point that permits registering the function. As an illustration, a module defining functionality can be mapped to a module 210 (FIG. 2A) having extension points 220(1)-220(Q), where one of those extension points has program code that can receive the functionality by reference.

The tenant-specific extension module(s) can non-destructively modify the core API and the core data model, resulting in a customized API and/or a customized data model for the particular tenant. That is, a first tenant-specific extension module preserves multiple core functions that constitute the core API and also preserves multiple core elements that constitute the core data model. Accordingly, non-destructive modifications can be additive. In other words, addition is an example of a non-destructive mechanism to modify the core API and the core data model. More specifically, the first tenant-specific extension module can provide at least one element to the core data model or a function to the core API, or can provide both the at least one element to the core data model and the function to the core API. The at least one element that can be provided to the core data model can include a field in a table or a measure in that table or another table. Providing such element(s) can result in the addition of column(s) to one or more tables present in the core data model. Additionally, or in some non-destructive modifications, the at least one element that can be provided to the core data model can include a table.

In some cases, a destructive modification of the core API may be desired. For example, a tenant-specific service may no longer support a particular core function of the multiple functions that constitute the core API. In such cases, a first tenant-specific extension module can remove that particular core function while preserving the multiple core elements that constitute the core data model. By removing that unsupported particular core function, the tenant-specific service can be configured in a manner consistent with the actual capability of the tenant-specific service. As an illustration, in cases the tenant-specific service is a clinical trial, the particular core function being removed may be a function to determine drug dosage. As another illustration, rather than removing than removing the particular core function entirely, the destructive modification can include adding a parameter to the function to determine drug dosage, resulting in lack of compatibility with an existing function being replaced. Such a destructive modification can decrease the participation of that single destructively customized instance from the common core API. In other words, that single destructively customized instance supports a smaller subset of the common core API. The destructive modification also reduces the size of the union of the APIs respectively exposed by each customized single-tenant instance of the collection of customized single-tenant instances. Destructive modification is not limited to destructive changes to the core API. In some example scenarios, destructive modification also can be applied to the core data model, where the first tenant-specific extension module can remove a particular core element of the multiple core elements that constitute the data model while preserving the multiple core functions that constitute the core API. The particular core element may be removed because the tenant-specific service does not rely on that particular element. As an illustration, in cases the tenant-specific service is a clinical trial, the core element being removed may be weight or country of birth of a subject participating in the clinical trial'. Such a removal can yield various efficiencies, such as more efficient usage of memory resources and/or processing resources. Simply as an illustration, the particular core element can be a field in a table or an entire table. In other example scenarios, the first tenant-specific extension module can remove both the particular core element from the data model and the particular core function from the core API.

As such, select tenant-specific extension module(s) can cause a destructive modification of the core API or the core data model, or both, in response to being mapped to respective extension points present in the core modules that provide the defined service. As a result, the select tenant-specific module(s) can cause the breaking of backward compatibility of a customized defined service with the defined service. The customized defined service results from such a mapping.

As is shown in FIG. 1, both the executable package component J 120(J) and the executable package component K 120(K) can include a service core 140 having multiple core modules 144 and multiple extension points 148. Because each one of those executable package components can provide a single-tenant service that is customized to respective tenants, the executable package component J 120(J) can include one or multiple extension modules 150(J) that extend the functionality of the core modules 144, providing a customized API J 130(J) and a customized data model J 160(J). In addition, the executable package component K 120(K) can include one or multiple extension modules 150(K) that extend the functionality of the core modules 144, providing a customized API J 130(K) and a customized data model J 160(K).

Figure 2A:
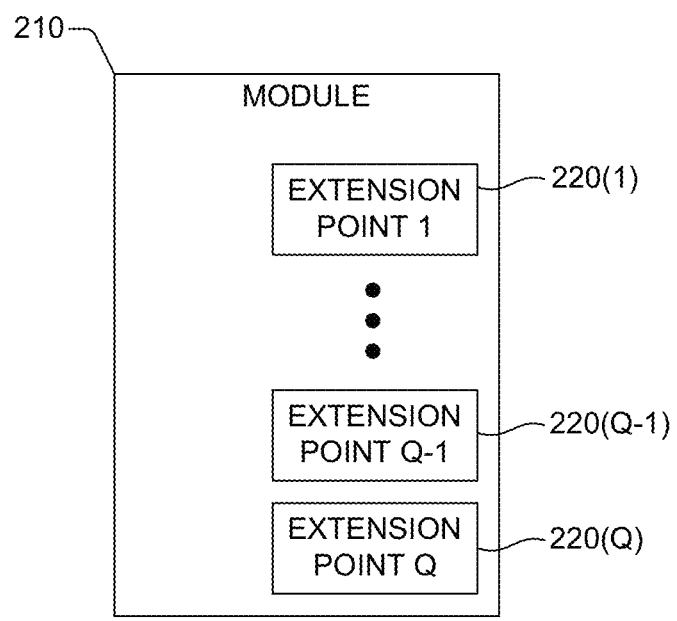
FIG. 2A illustrates schematically an example architecture of a module (core module or extension module), in accordance with one or more embodiments of this disclosure.

With further reference to FIG. 2A illustrates schematically an example architecture of a module 210, in accordance with one or more embodiments of this disclosure. The module 210 can represent a core module or an extension module. Regardless of its type, the module 210 has program code that provides defined functionality of the module 210, and also has other program code that defines a group of extension points including a first extension point 220(1), up to a Q−1-th extension point 220(Q−1) and a Q-th extension point 230(Q), where Q is a natural number greater than unity. While Q is illustrated as being greater than 1, the disclosure is not limited in that respect and, in some cases, a single extension point can be present within the module 210. As part of defining an extension point of the group of extension points, that other program code defines logic associated with registration of one or multiple functions from another module (a core module or an extension module). After that other module has been mapped to the extension point, logic pertaining to the module 210 can then call the function(s) provided by that other module as part of the logic of the module 210. Hence, the defined functionality of the module 210 is extended to include added functionality provided by such function(s).

As such, each extension point of the group of extension points permits extending the defined functionality of the module 210 by receiving one other module or a collection of two or more other modules. In other words, an extension point 2200, with j=1, 2 . . . , Q−1, or Q, can be associated with a single extension module or multiple extension modules. Here, Q is a natural number defining a number of extension points and can be greater than or equal to unity. In some cases, depending on desired functionality of the module 210, one or multiple extension points may be vacant. That is, each one of those extension point(s) may not be associated with an extension module.

Figure 2B:
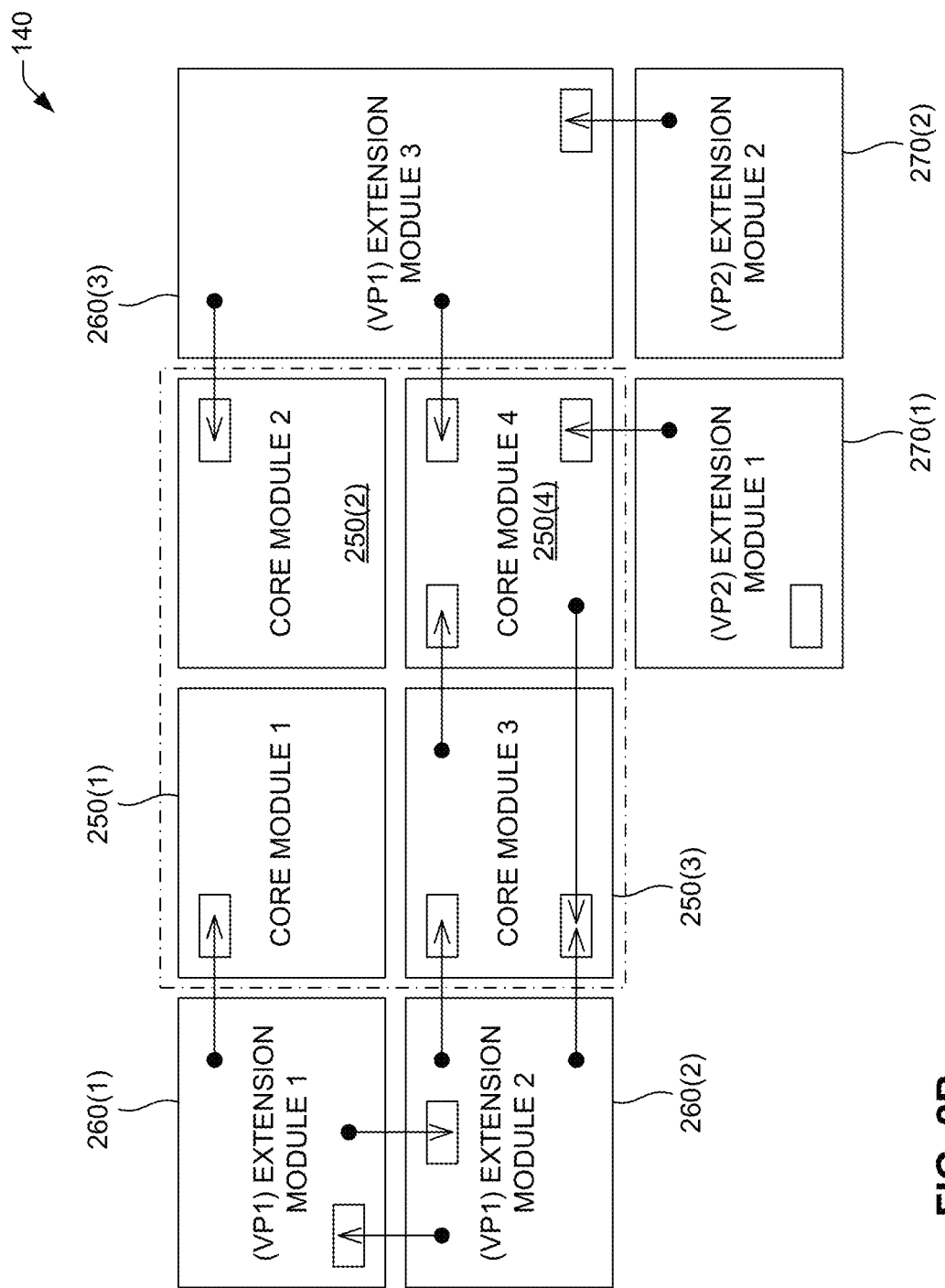
FIG. 2B illustrates an example of an architecture of a service core extended by extension modules corresponding to a tenant, in accordance with one or more embodiments of this disclosure.

FIG. 2B illustrates an example architecture of the service core 140, including customizations afforded by multiple extension modules. The exemplified service core 140 can include multiple core modules that constitute an example of the core modules 144 (FIG. 1) and include a core module 1 250(1), a core module 2 250(2), a core module 3 250(3), and a core module 4 250(4). The multiple core modules can provide core functionalities that, as is described herein, are common to all tenants accessing the computing system 100. The particular service provided by those core modules in the exemplified service core 140 can be customized by mapping multiple extension modules to respective extension points present in the core modules 250(1) to 250(4). Such a mapping is depicted as an arrow from a module to an extension point of another module. For the sake of illustration, in FIG. 2B, extension points are represented by respective small rectangles. The multiple extension modules include an extension module 1 260(1), an extension module 2 260(2), and an extension module 3 260(3). Such extension modules can pertain to a first source filesystem (denoted by "VP1" in FIG. 2B). The multiple extension modules also include an extension module 1 270(1) and an extension module 2 270(2), each pertaining to a second source filesystem (denoted by "VP2"). As is described herein, each one of those extension modules configures additional custom functionality to the exemplified service core 140, resulting in a customized service for a particular tenant.

The manner of configuring the additional custom functionality can be based on logical relationships between the core modules, and the various extension modules. For example, the core modules 250(1) to 250(4) can constitute a first tier on a hierarchical structure defining the logical relationships. As is illustrated in FIG. 2B, a core module in the first tier can map onto an extension point of another core module in that first tier—e.g., core module 4 250(4) can map to an extension point of core module 3 250(3). As a result, a single extension point can receive more than one module, e.g., core module 3 260(3) and extension module 260(2). The extension modules 260(1) to 260(3) can constitute a second tier on the hierarchical structure and can map onto extension points present in the core modules 250(1) to 250(4) in the first tier and/or the extension modules that form the second tier. Core modules in the first tier, however, cannot map onto extension points in the second tier. The extension module 270(1) and extension module 270(2) can constitute a third tier on the hierarchical structure and can map onto extension points within the core modules in the first tier and other extension modules in the second tier.

Because extension modules and core modules share same program code architecture principles, the development of a tenant-specific service can be accomplished significantly more computationally efficiently than in existing technologies. The extensibility mechanism afforded by the mapping of core modules and extension modules to respective extension points provides superior customization flexibility. Relative to existing technologies, such a flexibility, when leveraged across individual single-tenant services and combined with the API router component 110, can permit implementing a SaaS multi-tenant computing platform having richly customized single-tenant systems.

Figure 3:
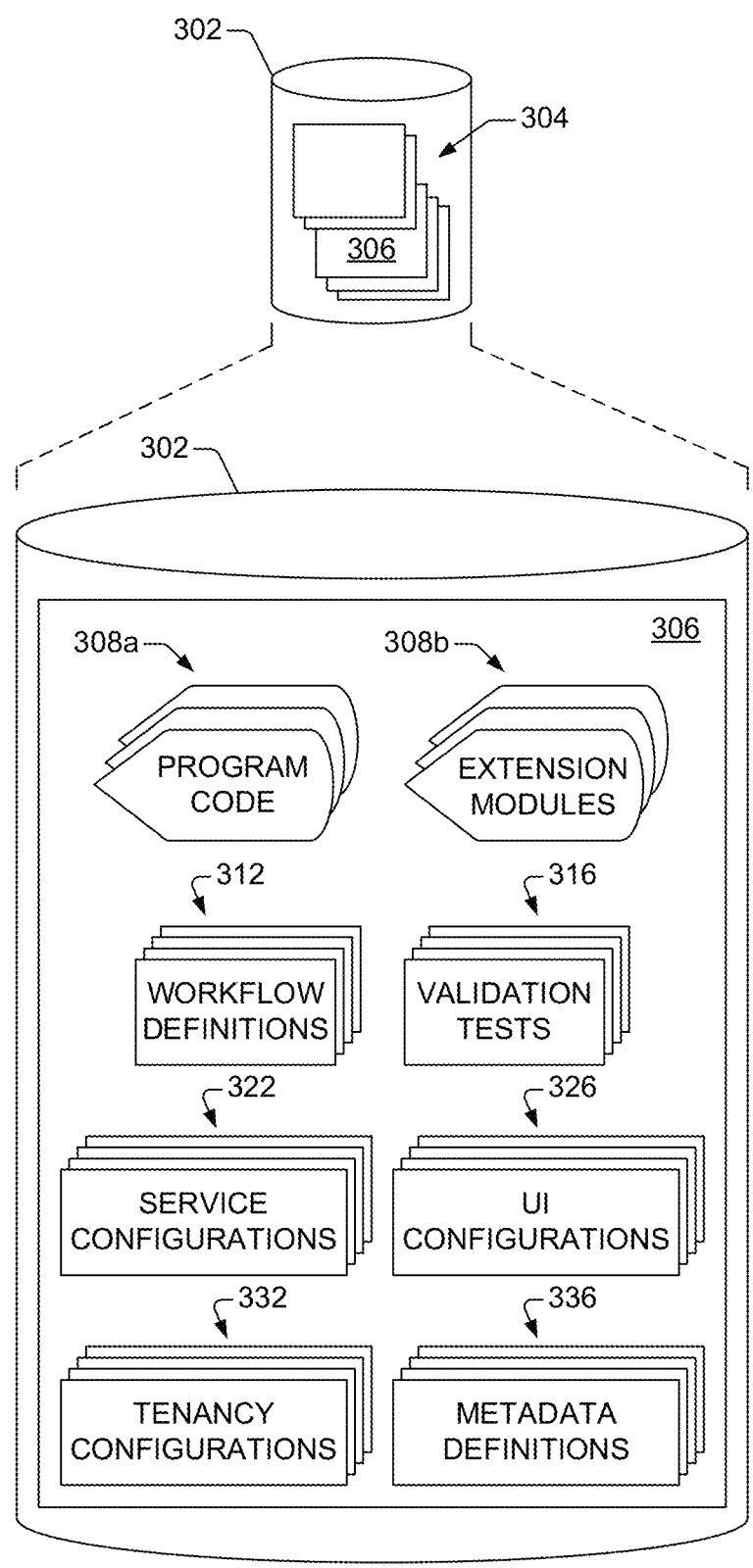
FIG. 3 illustrates an example of data storage for a virtual partition (VP) that serves to configure a service customized to a single tenant, in accordance with one or more embodiments of this disclosure.

FIG. 3 illustrates an example data storage 302 for configuration of a service customized to a single tenant, in accordance with one or more embodiments of this disclosure. The data storage 302 includes one or more memory devices having various types of information representing a source of customization options and isolation guarantees for a tenant-specific service for particular tenants. An isolation guarantee can include permission parameters configured to grant exclusive access to the tenant-specific service to a particular tenant. The various type of information are configurable, and the data storage 302 can receive input data defining the various types of information from a computing device (not depicted in FIG. 3 for the sake of simplicity). The computing device can execute an application that can cause the computing device to present a user interface that can receive the input data to be sent to the data storage 302. The application can be, for example, a web browser, an integrated development environment (IDE) application, or similar. The computing device can be functionally coupled to the data storage 302 via a network interface. In some cases, the computing device can have the data storage 302 integrated therein, and the input data can be sent to the data storage 302 via a bus architecture. At least some of the information retained in the data storage 302 can include a filesystem structure having multiple filesystems 304, each one dedicated to a respective tenant of the multiple tenants. Thus, for a tenant, information within the data storage 302 can be arranged in a filesystem 306 dedicated to the tenant. The information can include program code, data, and/or metadata corresponding to a defined version of available customizations for the tenant. The defined version corresponds to a perennial unique identifier indicative of immutable content that forms the available customizations at a particular point in time. In some cases, an available customization can be embodied in definition data resulting from a modification (such as an additive modification) to definition data present in a service core. Thus, a customization option present in the data storage 302 can be an adjusted instance of a configuration present in the service core. The disclosure is, of course, not limited to a particular type of non-transitory storage structures (such as filesystems) and other non-transitory storage structures can embody a virtual partition. Those other non-transitory storage structures can be retained in the data storage 302 and can include, for example, a file folder on disk, a git repository, a table or another type of entry in a database, a combination thereof, or similar. Regardless of its type, a non-transitory storage structure that retains program code and configuration information dedicated to a tenant can be referred to as a virtual partition. The virtual partition can be identified by the defined version of the customizations available for the tenant.

Each filesystem can include program code 308a defining extension logic. In some cases, the program code 308a can include multiple class objects defining respective extension logic. In addition, or in some cases, each filesystem can include one or multiple extension modules 308b defining other extension logic. Further, or in other cases, each filesystem also can include multiple configuration attributes. A subset of the multiple configuration attributes can constitute a resource pertaining to a particular tenant. Some resources can be retained in respective files within a filesystem for that particular tenant. As is illustrated in FIG. 3, first resources can include workflow definitions 312. A workflow definition is a type of configuration that specifies a number of operations that constitute a workflow for a tenant. In one example, the operations can constitute a subject-capture workflow that permits a subject in a clinical trial, or another type of end-user, to provide input data defining various subject attributes (e.g., birth date, gender, weight, and the like). In some cases, the subject-capture workflow causes a client device to present one or a series of UIs or questions to obtain such input data. In some cases, a workflow definition of the workflow definitions 312 can be generated by modifying, e.g., adding an element, an extant workflow definition in a service core. Modifying the extant workflow can include, for example, adding one or more operations to the extant workflow definition, removing one or more operations from the extant workflow definition, replacing one or more operations present in the extant workflow definition, or a combination thereof, thus resulting in the workflow definition contained in the workflow definitions 312. The workflow definition generated in such a fashion can serve as a local replacement workflow associated with the service core.

Other resources can include validation tests 316. A validation test can be an individual automated testing operation, for example. Yet other resources can include service configurations 322. A service configuration can specify one or more features of a service, such as tables, REST resources, logic, and UI elements, a combination of the foregoing, or similar. In some cases, a service configuration can be defined in terms of abstraction data indicative of a desired custom configuration of the service (e.g., a menu option or a response entry in a survey or another type of questionnaire, and associated action that values of the menu option or response entry can invoke). In some cases, the abstraction data can be indicative of human-readable content that is devoid of program code, where the human-readable content forms a definition of the desired custom configuration. The human-readable content can thus define a manner of extending or otherwise modifying the service. Such a customization may be referred to as a NOCODE customization or NOCODE abstraction. In other cases, a service configuration can be defined in terms of other type of abstraction data that can be indicative of human-readable content that includes a limited amount of custom program code. Such human-readable content also can define a manner of extending or otherwise modifying the service. The limited amount of custom program code (e.g., a custom code snippet) permits introducing straightforward yet customized logic, for example. The limited amount of program code also permits maintaining the customization as a service configuration, rather than elevating that customization to program code 308a or one of the extension modules 308b. Such a customization approach can be referred to as LOWCODE customization or LOWCODE abstraction. Other resources can include user interface (UI) configurations 326. Other global resources can include tenancy configurations 332. Other resources can include metadata definitions 336. A metadata definition is a form of configuration that can define a data model for a particular tenant. For example, one or more of the metadata definitions 336 can define the data model K 160(K) for tenant IDK.

An example of a user interface 410 including visual elements representing a filesystem 415 (or example virtual partition) for a particular tenant is shown in FIG. 4A. In accordance with aspects described herein, the filesystem 415 includes several file folders corresponding to configurations files, extension files, extension metadata files, module files, validation-test files, and workflow files. As is shown in FIG. 4A, the user interface 410 also can include a section 416 that can present at least a preview of a file (README.md) within the filesystem 415. FIG. 4B illustrates an example of a user interface 418 including visual elements representing another example of the filesystem 415, as that example VP may be accessed in an IDE, in accordance with one or more embodiments of this disclosure. The IDE, and the user interface 418, may be presented at a computing device that can received input data, via interaction with the IDE, in order to configure or otherwise manipulate elements of the filesystem 415. In FIG. 4B, a JavaScript object notation (JSON) definition of the example VP is shown in the pane 420. Indeed, each virtual partition described herein includes a VP definition that identifies one or more compatibility attributes. Each one of the compatibility attribute(s) identifies a component that may be functionally coupled (by reference, for example) to the virtual partition. In particular, as is shown in FIG. 4B, the VP definition includes a first compatibility attribute that identifies a version of a core platform that the virtual partition is configured to operate with. The version of the core platform corresponds to a perennial unique identifier indicative of immutable content that forms the core platform at a particular point in time. As such, the first compatibility attribute can be, for example, a tag associated (e.g., concatenated) with a perennial unique identifier that identifies the version of the core platform. In one example, as is shown in FIG. 4B, a tag 424 corresponding to an example first compatibility attribute is "use-platform-version:" and the perennial unique identifier is the string of characters "2.8.0."

As is described herein, core platform refers to a group of multiple core modules having respective sets of extension points, where the group of multiple core modules may be available in a repository, in computer-executable form. Thus, for a version of the core platform, the immutable content that forms the core platform at a particular point contains the group of multiple core modules. The group of multiple core modules provides a defined service that is common across tenants, and defines shared resources including a core API and a core data model. For purposes of illustration, a shared resource can be a resource that is composed by contributions from each module (core module or extension module) within a group of modules, but is used and seen as a whole, atomic resource from the overall service perspective. Additionally, in some cases, in the core data model, each core module can contribute definitions and linkages, but the data model in its entirety (or partially, in some cases) may be used to create a database. Further, in the core API, each core module adds function(s) and endpoint(s), but viewed from a client perspective, this is the API of the entire service. Shared resources arising from extension modules can have similar structure and functionality as shared core resources.

The VP definition also includes a second compatibility attribute defining a reference to another VP (or, in some cases, multiple other VPs). The reference can include a unique location identifier indicative of a location, within a computer network, of that other VP and a datum identifying a version of that other VP. The unique location identifier can thus include, for example, a uniform resource locator (URL). The datum can be a perennial unique identifier indicative of immutable content that forms that other VP at a particular point in time. The version of that other VP thus corresponds to the perennial unique identifier. The second compatibility attribute can be, for example, a tag associated with one or multiple strings of characters. Each string includes a unique location identifier indicative of a location of a VP within a computer network, and a datum identifying a version of the VP. In one example, as is shown in FIG. 4B, a tag 428 corresponding to an example second compatibility attribute is "use-base-virtual-partitions:", and a first string of characters 430a includes unique location identifier "https://bitbucket001.company.cloud/projects/platform-tests" and "1.9.3" as a perennial unique identifier and a second string of characters 430b includes unique location identifier https://bitbucket001.company.cloud/projects/sponsorX-common-standards" and "1.7.1" as a perennial unique identifier.

Virtual partitions can be used to customize a core platform to build a tenant-specific service, as is described herein. As such, a VP definition also can include one or more control attributes (or another type of metadata) that can control a number of functionalities that are available when executing a service resulting from building the core platform. To that end, in some cases, a first control attribute of the one or more control attributes can identify a prior version of the core platform. The first control attribute also can cause a service that has been built against a current version of the core platform to provide functionality that is constrained to the functionality of a prior service built against the prior version of the core platform. The first control attribute can be, for example, a tag associated (e.g., concatenated) with a perennial unique identifier that identifies the prior version of the core platform. As is shown in FIG. 4B, a tag 426 corresponding to an example first control attribute is "release-feature-optin:" and the perennial unique identifier is the string of characters "2.8.0."

Because a current version of the core platform can be built using a tenant-specific VP, such a first control attribute can be present in the VP definition of the tenant-specific VP. The first control attribute (such as the attribute exemplified by tag 426) can be accessed during build time of a current version of the core platform, and can cause a package component to be built where functionalities of a prior version of the core platform are provided and upgraded functionalities of the current version of the core platform may be suppressed. More specifically, the codebase that forms the current version of the core platform can include program code that, in response to being compiled, can read the VP definition that includes the first control attribute. A compiler subsystem can then generate an executable package component for the current version of the service where the package component constrains functionalities of the service to those of the prior version of the core platform.

As such, the introduction of a control attribute that identifies a prior version of the core platform in a VP definition can permit upgrading a current version of a service to a next version of the service without forcing the operation of the upgraded service according to the next version of the service. Hence, a cadence of upgrades to the service can be maintained while exposing desired legacy functionalities to an end-user in the upgraded service. As a result, legacy functionalities of the service can be flexibly selected and exposed, without causing disruption in the implementation of upgrades to the service and/or forcing changes to a tenant.

Figure 4C:
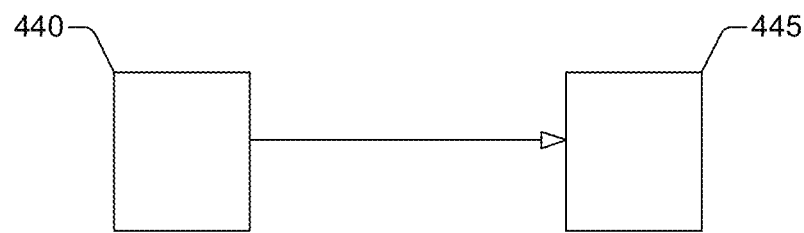
FIG. 4C illustrates an example of a tenant-specific VP and another virtual partition containing reusable customization components, in accordance with one or more embodiments of this disclosure.

At least some of the resources present in a tenant-specific virtual partition can be reusable across disparate tenants. For example, some customization components defined in terms of generic functions can be applied across different clinical trials. Accordingly, in some embodiments, as is shown in FIG. 4C, a first virtual partition 440 (e.g., a filesystem) can be configured to retain tenant-specific customization components, and a second virtual partition 445 (e.g., another filesystem) can be configured to retain reusable customization components. The second virtual partition 445 can be referred to as "base virtual partition," simply for the sake of nomenclature. The second virtual partition 445 can be referenced in a VP definition of the first virtual partition 440, via a customization attribute, where the customization attribute has a value defined by data identifying the second virtual partition. As an example, the customization attribute can be the tag 428, and the data can include the string of characters 430a. The first virtual partition 440 can include various types of customization resources, such as definition data identifying a tenant-specific service; configuration data corresponding to the tenant-specific service; and/or metadata corresponding to the tenant-specific service. In addition, or in some embodiments, the first virtual partition 440 can include customization components, such as extension modules customizing the tenant-specific service. Further, or in other embodiments, the first virtual partition 440 also can include catalog data identifying a catalog of extension points. The catalog data can include first data identifying a first extension point, the first data comprising data identifying a domain of the first extension point; data identifying functionality corresponding to the first extension point; a description of the first extension point identifying one or more methods; and corresponding to the first extension point, input parameters of the first extension point, and output corresponding to the first extension point. Here, the term domain refers to a topic of subject matter pertaining to a tenant-specific service. For example, in cases the tenant-specific service is a clinical trial, an example of a domain can be subject onboarding, subject management, drug management, supply management, or similar. Still further, in yet other embodiments, the first virtual partition 440 also can include one or more abstractions defining at least one of extension logic or extension parameters characterizing a manner of extending or otherwise modifying functionality of a tenant-specific service. The one or more abstractions can include, for example, at least one NOCODE abstraction, at least one LOWCODE abstractions, or a combination thereof. Thus, each one of the abstractions can include human-readable defining a manner of extending or otherwise modifying the tenant-specific service.

Because a tenant-specific service can be customized by means of a combination of tenant-specific customization components and reusable customization components, the first virtual partition 440 can refer (or point) to the second virtual partition 445. By referring to the second virtual partition 445, the first virtual partition 440 can inherit a reusable customization component (e.g., a configuration file). Reference to the second virtual partition 445 is represented by an open-head arrow in FIG. 4C. Such a reference can include a unique location identifier indicative of a location, within a computer network, of the second virtual partition 445 and a datum identifying a version of the second virtual partition 445. As mentioned, in this disclosure, version corresponds to a perennial unique identifier indicative immutable content that forms the virtual partition at a particular point in time. The unique location identifier can include, for example, a URL and the perennial unique identifier can be, for example, a string of characters. Each character in the string of characters can have a meaning defined in a versioning schema, for example. Simply as an illustration, the string of characters can be "2.3.1."

In some cases, the first virtual partition can refer (or point) to one or multiple second virtual partitions, where each reference to a virtual partition of the second virtual partition(s) includes a datum identifying a version of the virtual partition. Similarly, because a reusable customization component can rely on another reusable customization component, a base virtual partition can refer (or point) to another base virtual partition. Again, the virtual partition that refers to another virtual partition can inherit a reusable customization resource (e.g., a configuration file) or a customization component, or both, present in that other virtual partition. The reusable customization asset being inherited can be modified at the virtual partition that inherits the reusable customization component. To that end, the virtual partition can define a modification applicable to the reusable customization asset. The modification can be defined via a primitive or another type of code segment specifying a directive at the virtual partition. As an illustration, the reusable customization component can be a workflow definition and the virtual partition can define a modification to that workflow definition where the modification, in response to being implemented, causes the generation of a new workflow definition that includes additional operation(s). A modification to a reusable customization component can include, for example, addition of an element to the reusable customization component, deletion of an element from the reusable customization component, replacement of an element of the reusable customization component, or a combination thereof. Such a modification can be generally referred to as configuration amendment, and can be defined in terms of a program code instructing the modification, e.g., "Add," "Delete," "Replace."

A reference from the first virtual partition 440 to the second virtual partition 445 can cause selection of reusable customization components to be integrated (or otherwise used), by reference, into the first virtual partition 440. In some cases, such a selection can be whole, whereby the entire reusable customization components present in the second virtual partition 445 can be integrated (by reference) into the first virtual partition 440. In other cases, the selection can be partial, whereby a subset of the reusable customization components is identified and integrated into the first virtual partition 440.

Figure 4D:
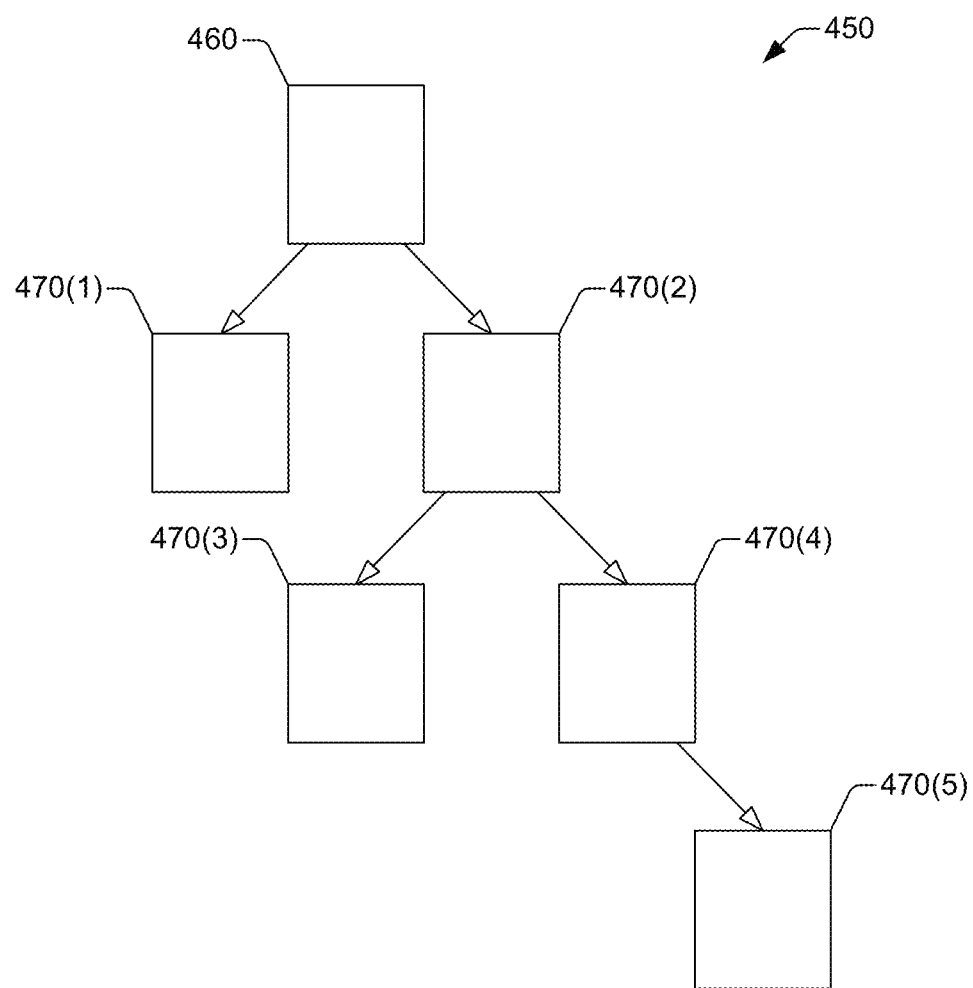
FIG. 4D illustrates an example of a hierarchical structure that logically associates a tenant-specific VP and several other virtual partitions containing reusable customization components, in accordance with one or more embodiments of this disclosure.
Figure 4E:
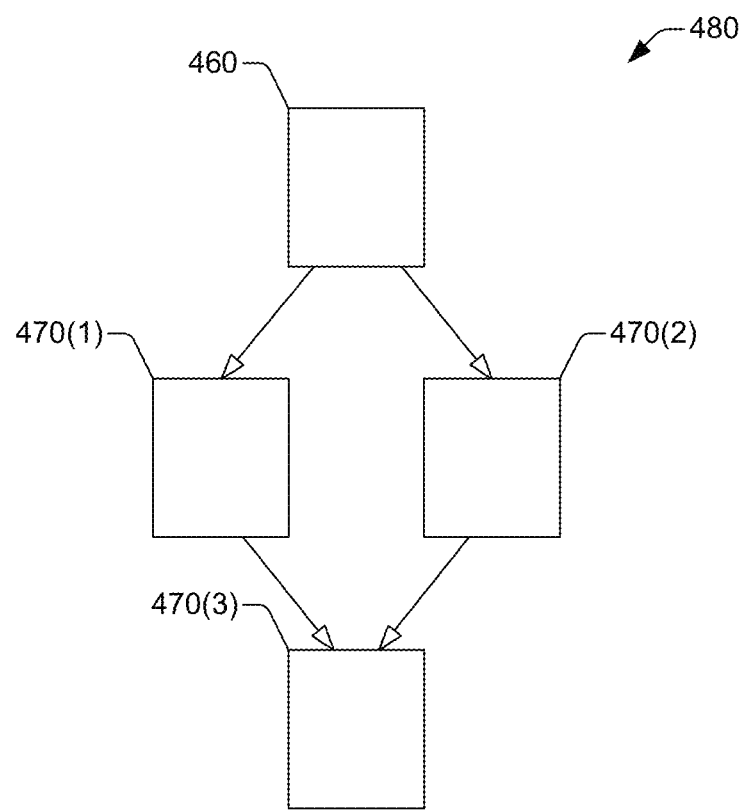
FIG. 4E illustrates another example of a hierarchical structure that logically associates a tenant-specific VP and several other virtual partitions containing reusable customization components, in accordance with one or more embodiments of this disclosure.

FIG. 4D illustrates an example of a hierarchical structure that logically associates a tenant-specific virtual partition 460 and several other virtual partitions containing reusable customization components, in accordance with one or more embodiments of this disclosure. The several other virtual partition can be referred to as "base virtual partitions," simply for the sake of nomenclature. The base virtual partitions include a first base VP 470(1), a second based VP 470(2), a third base VP 470(3), a fourth based VP 470(4), and a fifth base VP 470(5). The exemplified hierarchical structure is a tree structure 450 where the root node represents the tenant-specific virtual partition 460, and leaf nodes represent respective ones of the base virtual partitions 470(1)-470(5). Other hierarchical structures can be used to represent a logical association between the tenant-specific virtual partition 460 and one or multiple base virtual partitions. For example, the hierarchical structure can be embodied in a directed graph having a first node representative of the tenant-specific virtual partition 460 and one or more second nodes representative of respective base virtual partition. To illustrate that point, in FIG. 4E, the directed graph is exemplified as a directed graph 480 where the root node represents the tenant-specific virtual partition 460 and other nodes in the directed graph 480 represent respective ones of the base virtual partitions 470(1)-470(3). Regardless of particular type of hierarchical structure (tree structure or another type of graph), an edge in the hierarchical structure represents a reference from a first virtual partition to a second virtual partition. In one example, the first virtual partition can be a root virtual partition or a base virtual partition, and the second virtual partition can be another base virtual partition. Such a reference identifies the second virtual partition in terms of a location within a computer network and a version of the second virtual partition. The reference also can include data defining one or more configuration flags, each controlling selection of a customization asset (e.g., either a customization resource or a customization component) within the second virtual partition for inclusion within the first virtual partition. A configuration flag can indicate selection of a customization asset or deselection of the customization asset. In some cases, a single configuration flag can indicate selection of a group of customization assets or deselection of the group of customization assets. For example, the group being selected or deselected can be the entire set of customization assets present in the second virtual partition. As such, customization assets of the second virtual partition can be selected individually or as a group for inclusion in the first virtual partition. FIG. 4E illustrates an example.

In order to customize a service for a particular tenant, a tenant-specific virtual partition for the particular tenant can be selected. Specifically, program code, configuration attributes, and/or other configuration resources within the tenant-specific virtual partition (e.g., a filesystem) can be selected as a whole. The tenant-specific virtual partition constitutes a root node in a hierarchical structure that logically associates that tenant-specific virtual partition to other virtual partitions (e.g., base virtual partitions). As is described herein, examples of the hierarchical structure include a tree structure (such as the tree structure 450 in FIG. 4D) or a directed graph (such as the directed graph 480 in FIG. 4E). Regardless of its type, the hierarchical structure is representative of a system of memory devices that, individually or in a particular combination, contain the tenant-specific virtual partition and the other virtual partitions. Again, whether the hierarchical structure is a tree structure or a directed graph, associations between the tenant-specific virtual partition and the other virtual partitions are represented by respective edges of a graph corresponding to the hierarchical structure. Each edge of the respective edges is representative of a reference identifying a particular virtual partition of the other virtual partitions in terms of a location within a computer network and a version of the particular virtual partition. One or more configuration flags corresponding to such a reference define a selection of one or multiple customization assets for inclusion in the tenant-specific virtual partition. Hence, references pertaining to the hierarchical structure can collectively define a complete selection of customization assets (e.g., customization resource(s), customization component(s), or a combination thereof) for inclusion in the tenant-specific virtual partition.

Figure 5:
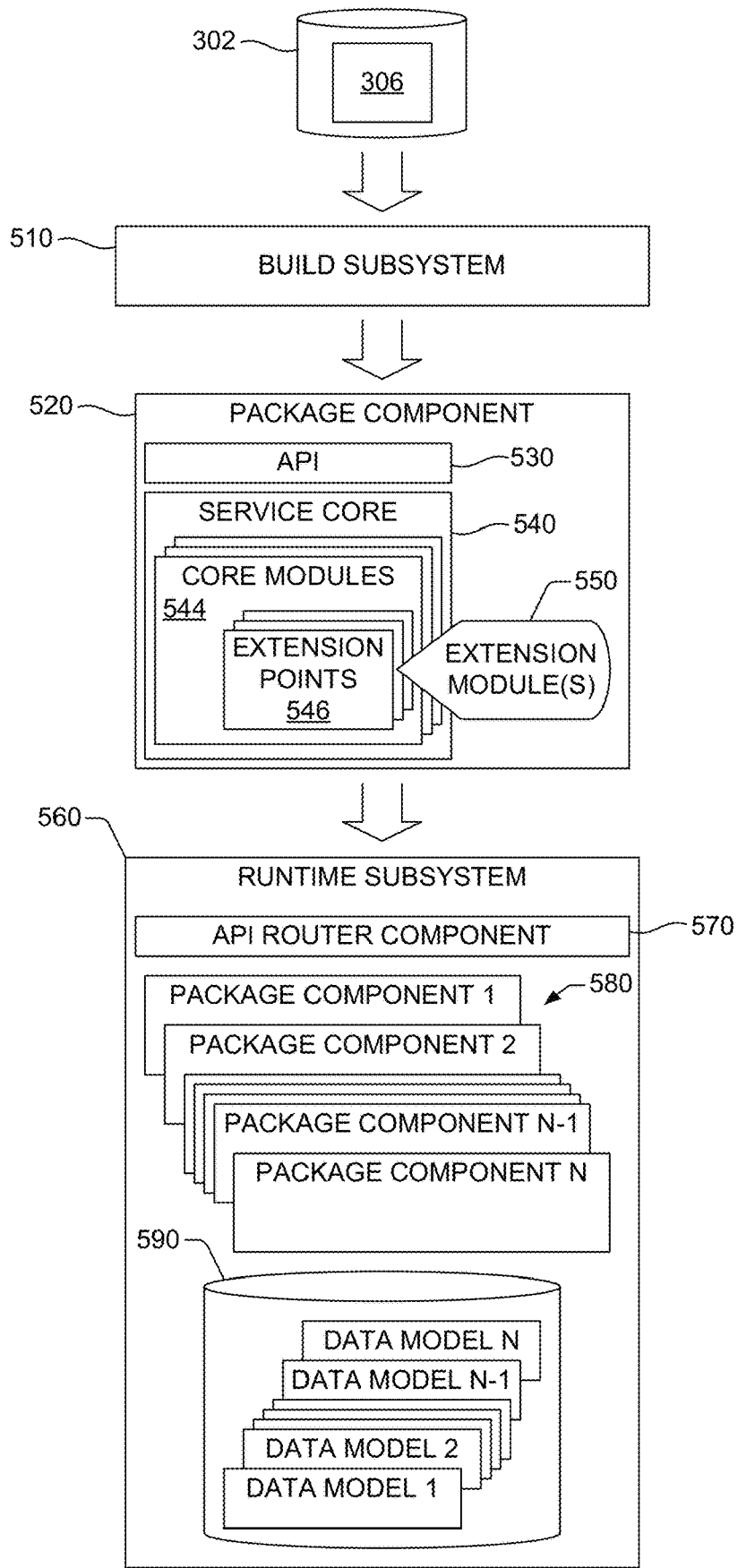
FIG. 5 illustrates an example of another computing system that provides an extensible SaaS platform having services customized to respective single-tenants, in accordance with one or more embodiments of this disclosure.

Such a selection can define the service in terms of components that can be built into an executable package component (e.g., a container (such as a Docker container), an executable binary file, or similar). To that point, the service definition resulting from the selection can be sent to a build subsystem 510 (FIG. 5). In some cases, the service definition can be sent in response to a one-click interaction or similar gesture interaction with a user interface presented at a computing device (not shown) functionally coupled to the build subsystem 510 (FIG. 5). The build subsystem 510 can generate, based on the service definition, an executable package component 520. More specifically, the build subsystem 510 can translate the service definition into the executable package component 520. Similar to other executable package components disclosed herein, the executable package component 530 includes a service core 540, multiple core modules 544 (also referred to as feature modules) and tenant-specific extension modules 550 mapped to extension points 546. The service core 540 defines and exposes an API 530 (such as a REST API) for the service. Indeed, the collection of the multiple core modules 544 and the tenant-specific modules 550 define and expose the API 530.

In order to translate the service definition into the executable package 520, the build subsystem 510 can contain a set of multiple rules within one or more memory devices (e.g., a mass storage device). The set of multiple rules can map service elements—configuration(s), metadata, and/or program code (such as extension class(es) or extension module(s), or both), for example—identified in the service definition into a format consistent with a package type used to provide the service core 540. The package type permits distribution of the executable package component 520 and can be a container, an executable binary file, or similar. The build subsystem 510 can apply the set of multiple rules individually or in particular combination(s) in order to build the service definition into the executable package component 520.

Configuration attributes that form part of the service definition can be conveyed, in some cases, as one or multiple configuration files within the selected tenant-specific virtual partition or a base virtual partition that depends, directly or indirectly, on that selected tenant-specific virtual partition. In some cases, at least one configuration file of the one or multiple configuration files can be a JSON definition file. Each configuration file can define a NOCODE (or no-code) abstraction identifying a desired customized configuration of the service for a particular tenant. Such an abstraction can be embodied in human-readable content that is devoid of program code, where the human-readable content forms a definition of the desired customized configuration. The human-readable content can thus define a manner of extending or otherwise modifying a tenant-specific service. The set of multiple rules applied by the build subsystem 510 can include code templates that can translate an abstraction into program code (such as C #code or C++ code). The build subsystem 510 can apply the code templates to build an extension module, and package the extension module as part of the package component 520, into a container. The container is specific to a tenant and can be built on top of a base container having the service core 540 (including the core modules 544).

The build system 510 operates on a service definition configured at a filesystem (or virtual partition) within the data storage 302. Therefore, the build subsystem 510 can adapt to changes that may occur at the runtime subsystem 560 while isolating the data storage 302 from such changes. Accordingly, by separating development of the service elements from the generation of executable package components, greater computational efficiency can be achieved relative to existing technologies.

Further, the build subsystem 510 can upgrade a customized single-tenant package component (e.g., package component K 120(K)) by rebuilding a VP against source program code defining a new version of a service core that provides a service that is common across single-tenants. Thus, pre-existing instances of configurations and extension modules can be upgraded to the new version of the common service core (or core platform), causing those pre-existing instances to operate on a same updated core platform. In this way, the build subsystem 510 also can implement backwards compatibility by rebuilding extension modules from source program code, against the updated core modules. Because the build subsystem 510 can rebuild from source program code, backwards compatibility-breaking changes at source program code level and binary level can be detected and corrected. As a result, the build subsystem 510 is more reliable and more robust than existing technologies that simply rely on binary backwards compatibility. It is noted that, in some cases, the build subsystem 510 is flexible and also can leverage binary backwards compatibility by building extension modules against extant prebuilt extension modules. Building extension modules in such a fashion permits faster development. Accordingly, the build subsystem 510 can flexibly transition between build modalities—build from source program code and build from prebuilt modules—thus selecting a build modality that affords speed over backward-compatibility rigor or vice versa.

Figure 6:
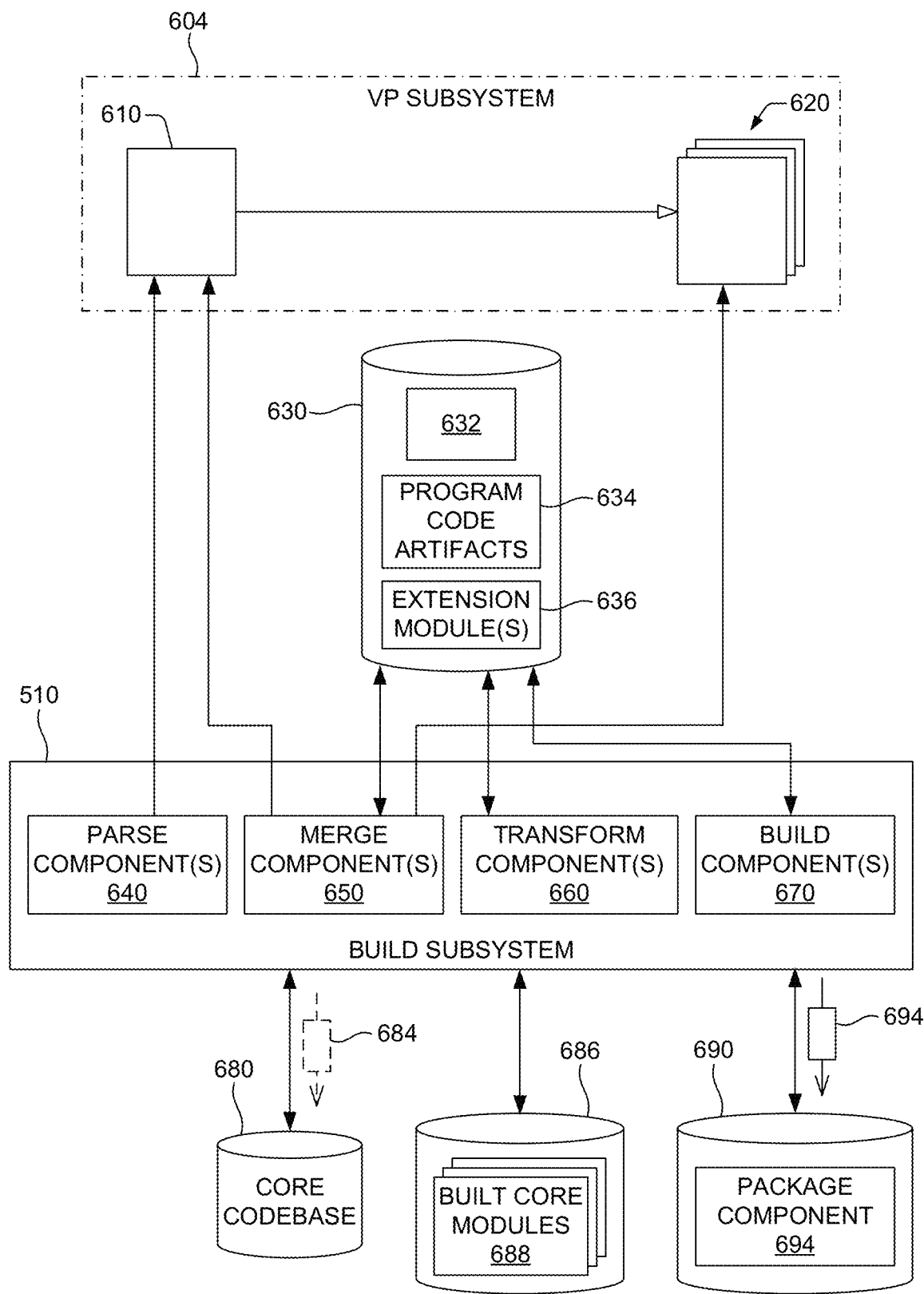
FIG. 6 illustrates an example of yet another computing system to build extension modules, in accordance with one or more embodiments of this disclosure.

In some embodiments, as is shown in FIG. 6, the build system 510 can include one or more parse components 640 that, individually or in combination, can identify a group of one or more references to respective first virtual partitions 620 (e.g., base virtual partition(s)). To that end, the parse component(s) 640, individually or combination, can access (e.g., read) a VP definition file that can be retained (e.g., stored, or stored in a way available for later use) in a second virtual partition 610 (e.g., a trial-specific virtual partition). Simply as an illustration, the VP definition file can be for, example, the JSON file illustrated in FIG. 4B, for example. At least one reference—e.g., a single reference, two references, more than two references, or each reference—of the group of references can include (i) a unique location identifier indicative of a location, within a computer network, of a particular virtual partition of the respective first virtual partitions 620 and (ii) a datum identifying a version of the particular virtual partition. Again, such a version corresponds to a perennial unique identifier indicative of immutable content that forms the particular virtual partition at a particular point in time. The unique location identifier can include, for example, a URL and the perennial unique identifier can be a string of characters, for example. Each character in the string of characters (e.g., "2.3.1") can have a meaning defined in a versioning schema, for example. The first virtual partitions 620 and the second virtual partition 610 can be part of a VP subsystem 604. The VP subsystem 604 can include one or multiple memory devices that, individually or in combination, form one or more data repositories.

As is described herein, in some cases, the group of one or more references defines a graph representing a logical organization of the respective first virtual partitions 620 and the second virtual partition 610. The graph includes nodes and edges, where a first node of the nodes represents a first one of the respective first virtual partitions and a second node of the nodes represents a second one of the respective first virtual partitions. An example of the graph can be the tree structure 450 (FIG. 4D).

The parse component(s) 640, individually or in combination, can determine if the group of one or more references satisfies a consistency criterion. To that end, the parse module 640 can traverse the graph and can compare references that point to same virtual partition of the first virtual partitions 620. The consistency criterion can dictate that such references must identify a same instance or same version of that same virtual partition in order to be consistent.

In cases where the group of references satisfies the consistency criterion, one or more merge components 650 included in the build system 510 can generate, individually or in combination, a consolidated virtual partition 632 within data storage 630 (which may be referred to as a workspace or workspace storage). The consolidated virtual partition 632 can contain one or multiple computer-readable components present in respective ones of the first virtual partitions 620 and the second virtual partition 610. In some cases, at least one computer-readable component of the computer-readable component(s) can be a binary (or computer-executable) component. The one or more merge components 650 can generate the consolidated virtual partition 632 by flattening the graph (a directed graph or a tree structure, for example) representing the logical organization of the first virtual partitions 620 and the second virtual partition 610. As an example, flattening the graph can include generating respective copies of all customization components and customization resources within the first virtual partitions 620 and the second virtual partition 610, and also retaining such respective copies within the consolidated virtual partition 632. The copies can be generated and retained in graph order, according to the logical organization provided by the graph. More specifically, graph order is the order in which references among virtual partitions in the graph are made. In addition, or in some cases, flattening the graph can include applying one or multiple primitives (or other type of directives) present in the first virtual partitions 620 and the second virtual partition 610. The one or multiple primitives can be applied in graph order. As is described herein, such primitive(s) can define one or multiple modifications applicable to a customization resource or a customization component. As such, as part of flattening the graph, at least one of the merge component(s) 650, individually or in combination, can apply the one or multiple primitives.

Prior to retaining the respective copies, at least one component of the merge component(s) 650 can collect information identifying one or multiple conflicts that may be present among two or more copies of respective customization assets. An example of conflict is a file collision (or collision) involving two or more files, where each file of the two or more files corresponds to a same customization resource but has differing identifying attributes relative to the other file(s) of the two or more files. The at least one component of the merge component(s) 650 can collect such information in response to detecting the one or multiple conflicts as part of flattening the graph. In other words, as part of flattening the graph, the at least one component of the merge component(s) 650 can determine that a conflict is present among a first copy of a customization asset and a second copy of the customization asset. Such copies can be included in respective virtual partitions of the first virtual partitions 620 (base VPs for example) and the second virtual partition 610 (a tenant-specific VP, for example). Determining that such a conflict is present can cause the at least one component of the merge component(s) 650 to collect information indicative of the conflict. As the flattening of the graph progresses, the at least one component of the merge component(s) 650 can detect one or more other conflicts and, in response, can collect addition information indicative of such other conflict(s). Additionally, or in some cases, the at least one component of the merge component(s) 650 can supply a report identifying the one or more conflicts detected as part of flattening the graph. Supplying the report can include retaining data constituting the report within data storage, sending such data to a computing device (not depicted in FIG. 6), and/or causing a display device to present the data constituting the report. In one example, the display device can be integrated into the computing device or functionally coupled thereto.

In addition, or in some cases, the at least one component of the merge component(s) 650 can receive input data defining a solution to the one or more conflicts that have been detected. The at least one component of the merge component(s) 650 can resolve the one or more conflicts by applying such a solution. The input data can be referred to as resolution data, simply for the sake of nomenclature. Further, or in other cases, such at least one component of the merge component(s) 650 can resolve, at least partially, the one or more conflicts. To that end, the at least one component of the merge component(s) 650 can determine, and in some cases, also implement, a solution to at least one of the conflict(s) by applying a conflict resolution process. In some situations, the at least one component of the merge component(s) 650 can use the resolution data as part of applying the conflict resolution process. As an illustration, in an example scenario where a conflict is present within a file, a component of the merge component(s) 650 can resolve the conflict by overriding the use of that file in favor of another file. That other file can then be retained in the consolidated virtual partition 632. As another illustration, in an example scenario where one or more collisions are present, a component of the merge component(s) 650 can resolve a collision by selecting one file of two or more collided files. Such a selection can be based on a policy. For example, the two or more collided files can have respective relevancy parameters (e.g., priority values), and the policy can dictate that a collided file having the greatest relevancy parameter among the two or more collided files is to be selected. In situations where more than one collided files have a same relevancy parameter and that parameter is the greatest relevancy parameter, the policy can dictate that an error message is to be supplied or the policy can cause the application of a defined disambiguation process.

The build subsystem 510 can generate, based on the one or multiple computer-readable components contained in the consolidated virtual partition 632, one or multiple computer-executable components. The computer-executable component(s) can include one or more tenant-specific extension modules 636. Generating the computer-executable component(s) can include building (e.g., linking and/or compiling) the computer-readable component(s). As such, the build subsystem 510 can include one or more build components 670 that, individually or in combination, can build the computer-readable component(s).

In some cases, generating the computer-executable component(s) can include transforming at least one computer-readable component of the one or more computer-readable components into respective program code artifacts 634. To that end, as is illustrated in FIG. 6, the build subsystem 510 can include one or more transform components 660 that, individually or in combination, can obtain the at least one computer-readable component from the consolidated virtual partition 632 and can then generate, using the at least one computer-readable component, a particular code artifact that can be compiled or otherwise built. The at least one computer-readable component can be based on abstraction data configured using a NOCODE approach or a LOWCODE approach. In the NOCODE approach, the abstraction data can be configured in terms of human-readable content devoid of program code. In the LOWCODE approach, the abstraction data can be configured in terms of human-readable content including a limited amount of custom program code (e.g., a snippet of custom program code). That limited amount can be, for example, a small number of lines of custom program code, such as 5 lines, 10 lines, 15 lines, 20 lines, or similar. To generate the particular code artifact, at least one of the transform component(s) 660 can access a code template (or transformation template) from the second virtual partition 610 or, in some cases, from a set of natively available code templates, and can apply the accessed code template to the at least one computer-readable component, resulting in the particular code artifact. Additionally, generating a computer-executable component based on the particular code artifact also can include building, using the respective program code artifacts, the computer-executable component. At least one of the build component(s) 670 can build the particular program code artifact.

More specifically, simply as an illustration, generating the computer-executable component(s) (e.g., the extension module(s) 636) can include accessing, from the consolidated virtual partition 632, abstraction data included in the one or more computer-readable components. Again, abstraction data can define human-readable content indicative of a manner of extending a tenant-specific service, where the human-readable content is devoid of program code or includes a limited amount of custom program code. At least one component of the transform component(s) 660 can access the abstraction data. As an example, as present in the consolidated virtual partition 632, the abstraction data can be formatted according to JSON and can be retained in a configuration file or another type of data structure. Additionally, generating the computer-executable component(s) also can include accessing a code template (or transformation template) that can be present in the second virtual partition 610. In one example, the at least one component of the transform component(s) 660 also can access the code template. In another example, at least one second component of the transform component(s) 660 can access the code template. Further, generating the computer-executable component(s) also can include generating, via one or a combination of the build component(s) 670, based on the abstraction data and the code template, a first computer-executable component of the one or more computer-executable components.

As part of generating the computer-executable component(s), the build component(s) 670, individually or in combination, also can access, from the consolidated virtual partition 632, computer-readable components defining customization components, such as tenant-specific extension modules. The build component(s) 670, individually or in combination, can build such computer-readable components (e.g., tenant-specific extension modules) against a core codebase 680 containing multiple core modules. As mentioned, the computer-executable component(s) built in that fashion can include at least one of the tenant-specific extension module(s) 636.

The build system 510, via one or a combination of the build component(s) 670, also can build program code defining multiple core modules pertaining to a particular version of core platform. That version can be identified in a VP definition present in the second virtual partition 610, for example. The program code can form the code codebase 680. In this way, the build system 510 can generate built core modules 688 and can retain the built core modules 688 in one or more memory devices 686 (generically referred to as data storage 686).

The build subsystem 510 can then build an executable package component 694 (e.g., one of package components 1 to N 580 (FIG. 5)) by combining the built core modules 688 with the tenant-specific extension modules that have been built as described herein. The executable package component 694 is specific to the particular tenant corresponding to the second virtual partition 610. The executable package component 694 can be embodied in, for example, a container, an executable binary file, or similar. The executable package component 694 can be retained in one or more memory devices 690 (generically referred to as data storage 690). The data storage 690 can be part of a distributed storage system, such as a network of storage server devices. In some cases, the data storage 690 can be part of a computing device (such as a server device) that hosts the build subsystem 510. For example, in such cases, the data storage 690 can be embodied in mass storage present in the computing device.

In some embodiments, the build subsystem 510 can generate program code 684 from the second virtual partition 610 and can pass the generated program code 684 to the core codebase 680. To end, in such embodiments, a transform component of the transform component(s) 660 can generate the program code 684 from a customization component retained in (or, in some cases, referenced by) the second virtual partition 610. Such a transform component can retain the generated program code 684 within a defined section of the core codebase 680. That section can be, for example, an empty directory within the core codebase 680. In such embodiments, the core codebase 680 can be a replica of core codebase corresponding to a particular version of the service core. By relying on such a replica, at least one of the build component(s) 670 can combine, at build time, the program code 684 with one or more other components already present in the core codebase 680. Such a combination can extend, or customize, the one or more components, without duplicating the one or more components in one or more of the second virtual partition 610 or the second virtual partitions 620. Simply as an example, a component present in the core codebase 680 can be a class that can be extended by adding a field or another type of attribute via the generated program code 684. The field (or attribute can be one of subject height, date of subject birth, subject age, or similar. Thus, instead of adding all desired field of the class within a customization component (e.g., one of extension modules 308*b*) within the second virtual partition 610, a the desired field can be added as a single file and then combined with the class using build logic of the build component(s) 670.

Accordingly, at least one of the build component(s) 670 can determine if the core codebase 680 has been modified prior to generating the executable package component 694. In cases where the core codebase 680 has been modified, one or a combination of the build component(s) 670 can generate, using the modified core codebase 680, a new instance of the built core modules 688. At least one of the build component(s) 670 can then generate the executable package component 694 by combining the computer-executable component(s) that form the new instance of the built core modules 688.

With further reference to FIG. 5, the build subsystem 510 can deploy the executable package component 520 to a runtime subsystem 560 comprising a cluster of compute server devices (not depicted in FIG. 5). The runtime subsystem 560 can receive a tenant-specific single instance service (or multi-tenant service, in some cases) packaged as an executable package component q (k=1, 2 . . . , N) and can deploy such a component within the cluster of compute server devices. The index q represents a specific tenant. In some embodiments, that cluster includes a SaaS Kubernetes cluster and Kubernetes container orchestration subsystem, and the executable package component q is, or constitutes, a container. As is shown in FIG. 5, the runtime subsystem 560 can deploy a multiple executable package components 580, including an executable package component 1, an executable package component 2, and up to an executable package component N. Thus, the runtime subsystem 560 can host N mutually isolated tenant-specific services (e.g., clinical trials). The runtime subsystem 560 can handle any configurations of an API router component 570 (e.g., an API gateway). The runtime subsystem 560 also can assign resource quotas to respective tenants. The quotas may apply to processing time and/or storage resources.

The runtime subsystem 560 also can include one or multiple database server devices 590. In some cases, a database server device of the database server device(s) 590 hosts a database that retains a data model q for a specific tenant or a tenant-specific service thereof. That database can isolated (e.g., logically separated) from another database that retains a data model q' for another tenant. The database server device can be embodied in, or can include, a SQL server or a NoSQL server. In some cases, database instances for a first tenant can be physically separated from databases instances for a second tenant. Specifically, a first database service device of multiple database server devices 590 can corresponds to the first tenant, and a second database server device of multiple server devices 590 can correspond to the second tenant.

As is illustrated in FIG. 6, the build subsystem can generate an executable package component by relying on customizations developed in a first development environment and a core codebase developed in a second development environment. As is described herein, the customizations can be defined by a group of one or more virtual partitions, e.g., the first virtual partitions 620 and the second virtual partition 610. The core codebase can be defined, at least partially, by the core codebase 680. The first development environment and the second development environment can be decoupled, and, thus, can be operated or otherwise administered by respective different entities. For example, an entity can develop core codebases to provide a service core, and customizations can be developed by third-parties. Such a decoupling between the first and second development environments can permit upgrading a core codebase independently from the development of customizations that are applicable to a particular tenant. Accordingly, as is described herein, a tenant-specific service can be migrated to an upgraded service core by updating the appropriate virtual partition(s) to reference (sometimes colloquially referred to as "to point to") the upgraded service core. A virtual partition can reference the upgraded service core via a VP definition that includes, for example, the compatibility attribute "use-platform-version:" and a perennial unique identifier that identifies the version of the upgraded service core. Therefore, the customization of a tenant-specific service and upgrades to that service can be simplified, resulting in more efficient use of computing resources and time.

In this disclosure a service core (or core platform) can be upgraded in at least two ways. One way involves the addition of one or multiple extension points to core modules that constitute a current version of the service core. Such an addition yields a core codebase that embodies a next version of the service core. Another way involves changes to functionality, user interfaces, and/or other elements of a current version of the service core. Those changes can include removal of existing functionality, revisions to existing functionality, addition or new functionality, or a combination thereof. Such changes also yield a core codebase that embodies a next version of the service core. Regardless of how an upgrades is achieved, the resulting core codebase (e.g., core codebase 680) can be used to migrate an existing tenant-specific service to the next version of the service core.

Figure 7A:
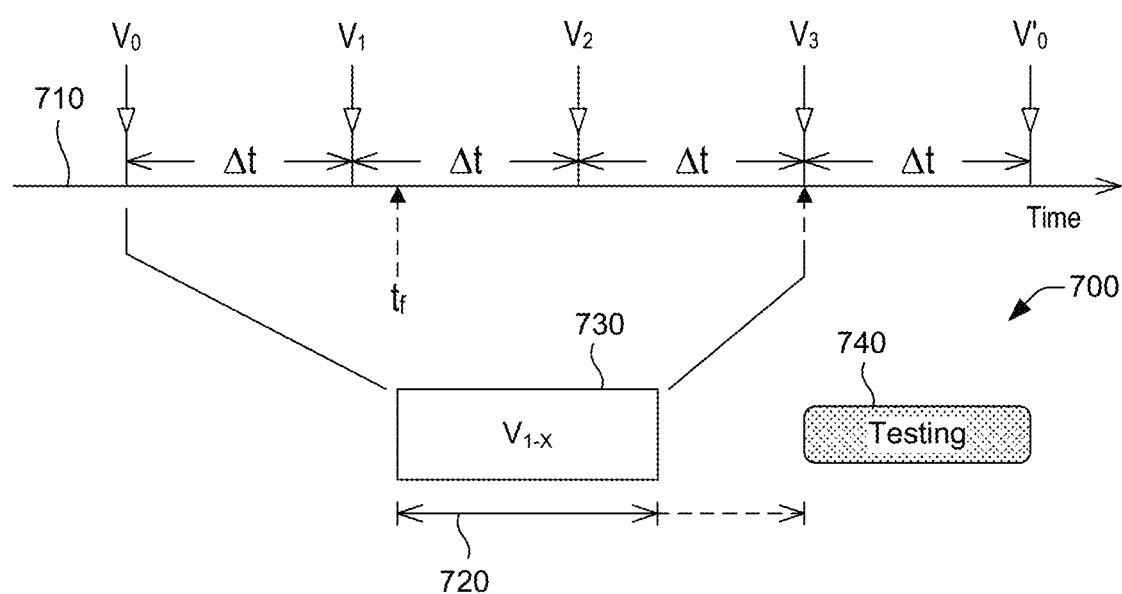
FIG. 7A illustrates an example of a process for expanding the extensibility of a service core associated with a service, in accordance with one or more embodiments of this disclosure.

In connection with the addition of extension points to a service core (or core platform), FIG. 7A is a schematic diagram that illustrates an example process 700 for expanding the extensibility of a service core. The extensibility of the service core (e.g., service core 140 (FIG. 1)) is provided by one or multiple extension points. Thus, the addition of extension point(s) expand that extensibility. A service provided by the service core is common across single-tenants and can be customized to a tenant-specific custom service by mapping one or more extension modules to respective ones of the multiple extension point(s), in accordance with aspects described herein. The example process 700 embodies an extensibility approach that introduces additional extension point(s) into a fork of the service core, and then folds the additional extension point(s) into the service core at a suitable time after the fork is created. That suitable time can be a time after integrity/stability of the fork has been tested and has yielded satisfactory results. The extensibility approach can be referred to as Just-In-Time-Extensibility (JITX), simply for the sake of nomenclature. The extensibility approach can be implemented by a computing system 760 (FIG. 7B), which can referred to as JITX subsystem 760, simply for the sake of nomenclature. The JITX subsystem 760 is part of a computing system 750.

The process 700 can be implemented during a development timeline 710 of the service core. In the development timeline 710, the service core can be maintained periodically, at defined consecutive maintenance intervals $\Delta t$ (e.g., four weeks, one month, six weeks, or similar). Accordingly, starting from a version $V_0$, a version $V_n$ is created after n maintenance intervals have elapsed. After a defined number of maintenance intervals have elapsed, a new version of the service core can be released. In FIG. 7A, simply as an example, a new version $V'_0$ of the service core is released after n=4 maintenance intervals have elapsed.

Figure 7B:
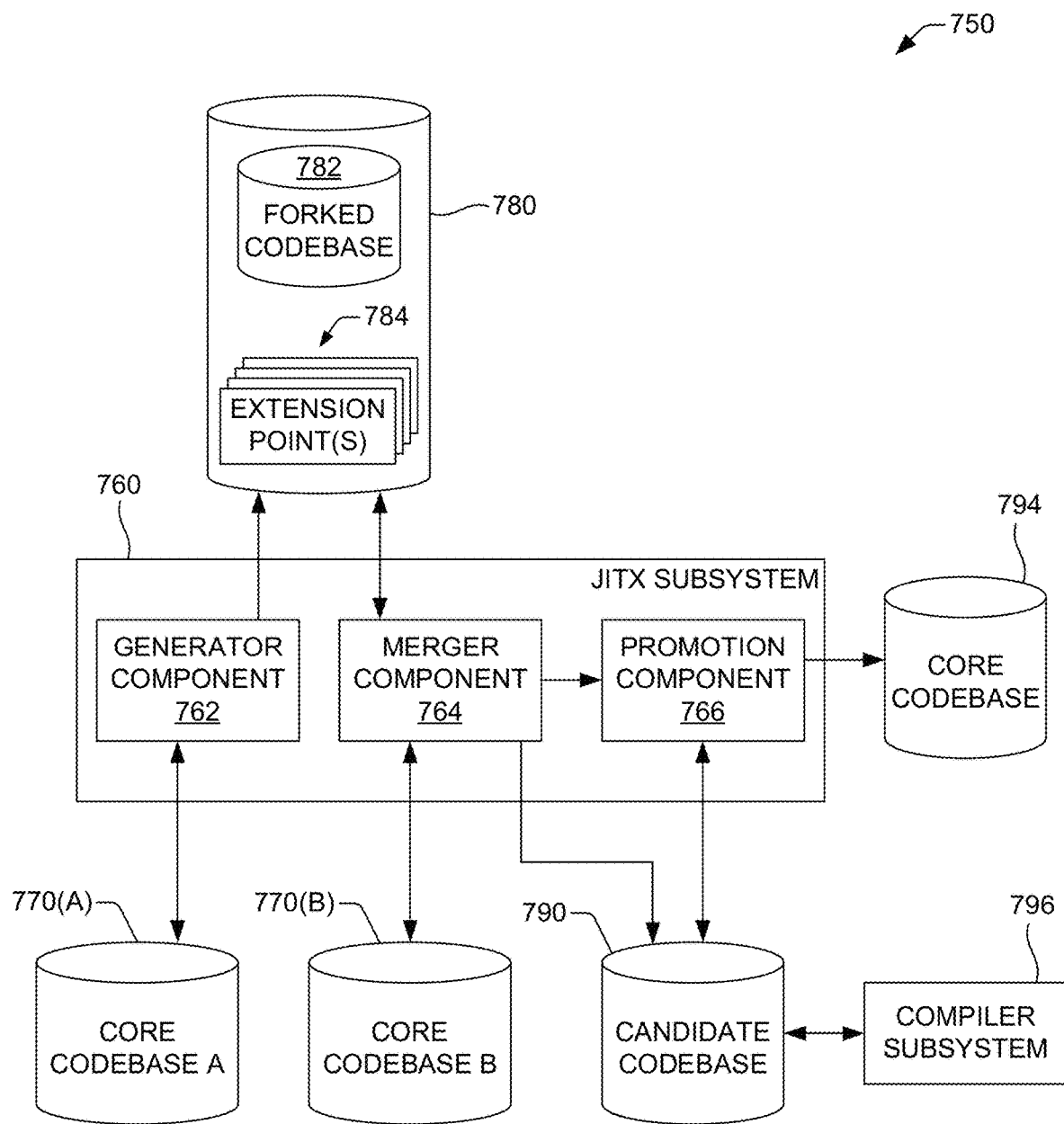
FIG. 7B illustrates an example of a computing system that upgrades a common core service to a new version of the common core service that has increased extensibility, in accordance with one or more embodiments of this disclosure.

Functionality requirements of a particular tenant may not be known in advance after an initial configuration of extension points of the service core. Accordingly, in JITX, a copy of source program code corresponding to the service core can be generated in response to a determination that one or multiple additional extension points are necessary for that particular tenant. As is illustrated in FIG. 7A, simply as an example, at time $t_f$ a copy of the source program code corresponding to version $V_1$ of the service core is generated. A generator component 762 (FIG. 7B) can generate the copy using core codebase A 770(A) containing the source program code corresponding to version $V_1$. The generated copy can be referred to as a fork and the generator component 762 can retain the fork within a forked codebase 782. A repository 780 can retain the forked codebase 782. During a time interval 720 (which may be referred to as fork duration), one or multiple extension points can be added to a set of existing modules (e.g., core modules), thus augmenting the initial configuration of extension points. The one or multiple extension points are specific to the particular tenant. Despite being tenant-specific, in some cases, the extension point(s) can be generated to have a broader scope of applicability upon insertion into a service core release. The set of existing extension points includes a first existing extension point corresponding to a first core module of multiple core modules that form the version $V_1$ of the service core. The span of time interval 720 may be based on complexity of the additional extension points and time to implement and probe the extension points, for example. As is shown in FIG. 7B, the generator component 762 can generate the extension point(s), and can retain the extension point(s) in one or more configuration files 784, for example. Other types of data structure also can contain the extension point(s).

By creating such a copy of the program code and adding tenant-specific extension points(s) to the version $V_1$ of the service core, an updated version 730 of the service core can be created for the particular tenant for which an unforeseen functionality is to be added to the service core. The updated version 730 (referred to as $V_{1-X}$, for the sake of nomenclature) is applicable to the particular tenant, and can be operated upon outside the development timeline 710. As mentioned, the updated version 730 can be retained within forked codebase 782. In that way, $V_{1-X}$ serves as a software testbed for the added tenant-specific extension point(s), and also for increased extensibility of the service core. Thus, the version of the service core that has been forked (e.g., version $V_1$) and subsequent versions of the service core remain common and operable to other tenants. In some cases, the copy of the source program code having the additional tenant-specific extension point(s) can be operated upon in order to probe integrity of that copy. To that point, one or multiple automated tests can be applied to that modified copy of the source program code. The automated test(s), individually or in combination, can probe integrity of the modified copy. In some cases, applying the automated test(s) includes determining, based on control flow analysis, presence or absence of a change to control flow of the copy of the source program code having the added extension point(s).

After satisfactory outcomes of the applied automated test(s), the copy of the source program code having the added extension point(s) can be merged with a current version of the service core in order to yield a next version of the service core having the added extension point(s). In some embodiments, a merger component 764 can merge the copy of the source program code with the current version. The current version can be retained in core codebase 770(B) and the next version of the service core can be retained in a candidate codebase 790. The next version of the service core can then be built into an executable package component. To that end, in some embodiments, a compiler subsystem 796 can build the executable package component. In one example, the next version of the service core can be a maintenance release for the service core. The executable package component (e.g., package component K 120(K) (FIG. 1)) includes the multiple core modules comprising the added extension point(s), and also includes an API (e.g., the API K 130(K) (FIG. 1)). At least one extension point of the added extension point(s) can have respective tenant-specific extension modules mapped thereto, in some cases.

There are multiple ways to merge the copy of the source program code having the added extension point(s) and the current version of the service core. In one example scenario, with reference to FIG. 7A, the added extension point(s) in $V_{1-X}$ are clearly distinguishable from other program code—e.g., the added extension point(s) can be commented or otherwise marked. The added extension point(s) can thus be isolated and incorporated into $V_2$ (the current version, for example) to form $V_3$ (the next version). Such incorporation is represented by a line and arrow from updated version 730 to $V_3$. Besides the added extension point(s), other safeguard code also can be incorporated into $V_3$ in order to ensure that existing logic arising from $V_2$ remains unaltered by the presence of the added extension point(s) in $V_3$. Such an approach to generating the next version of the service core provides full backwards compatibility by construction. In another example scenario, the source program code in $V_{1-X}$ and the source program code in $V_2$ can be combined directly using, for example, commonplace merge techniques, to form $V_3$. This approach is straightforward and efficient, but the merger of source program code may have the potential of incorporating logic or other elements beyond the added extension point(s). Thus, in some cases, a likelihood of unintended partial backward compatibility may be present.

As is illustrated in FIG. 7A, the next version of the service core having the added extension point(s) can be a maintenance release, and as mentioned, can be retained in the candidate codebase 790 for example. Thus, the executable package component obtained from building the source program code resulting from the foregoing merger and having the added extension point(s) can be released as part of a maintenance release for the service core. That is, the service core resulting from the addition of one or more extension points can be made available and common to other tenants besides the particular tenant for which added functionality has been configured. During the intervening time between initial release of the executable package component and a subsequent release of the service core, the process 700 can include a testing stage 740 where the executable package component can be subjected to multiple automated validation tests. The number of the multiple automated validation test can be based on the added functionality. In some cases, instead of subjecting the executable package component to multiple automated validation tests, a single automated validation test may be applied. Such automated validation test(s) can be specific to a tenant and can probe integrity of the executable package component. Integrity of the executable package component can be probed for every tenant using a prior version of the service core. The automated validation test(s) can be part of the prior version of the service core and can be extended by means of a virtual partition. The automated validation test(s) included in the testing 740, either individually or in combination, can be based on control flow analysis and can probe presence or absence of a change to control flow in the executable package component relative to the service core prior to the addition of the extension point(s). Simply as an illustration, as is shown in FIG. 7A, the executable package component can be released as version $V_3$ of the service core, the automated testing can be applied during the intervening period of time before release of version $V_0$ of the service core. In some embodiments, a promotion component 766 (FIG. 7B) can implement the automated validation test(s). In response to satisfactory outcome(s) of the testing (e.g., backwards compatibility has not been broken) the promotion component 766 can promote the program code in the candidate codebase to a core codebase 794 corresponding to the version $V_0$ of the service core. Promoting the program code can include persisting the program code in a repository, and assigning a perennial unique identifier defining the version $V_3$ (or another appropriate version) of the service core.

A terminal computing device (not depicted in FIG. 7A) can cause or otherwise direct the promotion component 766

(FIG. 7B) to implement the testing stage 740 via the API router component 110 (FIG. 1) and an API corresponding to the service core. To that end, the terminal computing device can execute program code, such as a script, that applies one or multiple automated validation tests to the executable package component obtained from building the copy of the source program code having the added extension point(s). The automated validation test(s) can be applied by invoking one or multiple function calls of the API via the API router component 110 (FIG. 1). The terminal computing device, in response to executing the program code, can obtain the automated validation test(s) from a virtual partition within the data storage 302 (FIG. 3). The automated validation test(s) can be a subset of the validation tests 316 (FIG. 3).

At least some of the automated validation test(s) can include respective workflows, each including a collection of defined testing stages. An automated validation test can thus be applied computationally efficiently by selectively performing a subset of the testing stages rather than the entire collection, thus speeding up the performance of the automated validation test. For example, automated validation test(s) can be applied in order of decreasing outcome risk posed by a potential error in operation/logic, first testing logic that, if erroneous, can yield a catastrophic outcome (e.g., injury to the health of a clinical trial subject) and then continuing testing other logic that, if erroneous, yields less catastrophic outcomes. As another example, automated validation test(s) can be applied to portions of the changed logic, without testing other logic that has remained unchanged and is known to perform satisfactorily. Additionally, or in some cases, computational efficiency also can be achieved by generating synthetic data that can avoid human intervention in the testing of various vectors of operation. For purposes of illustration, a vector may be that a given clinical trial sets up hospital visits, not at-home visits. Thus, at-home-visit logic need not be tested or otherwise probed, for example.

Figure 8:
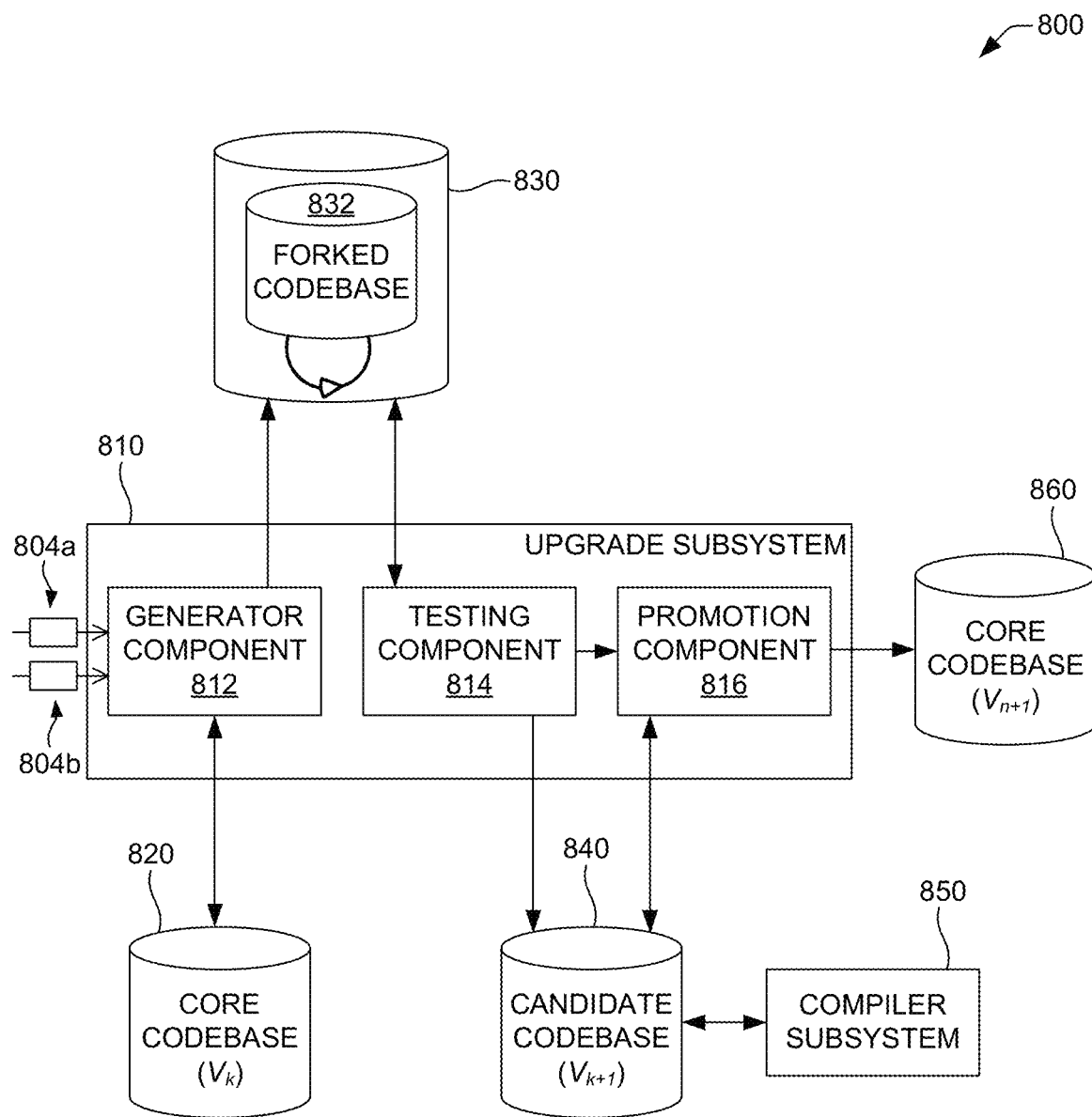
FIG. 8 illustrates an example of a computing system that upgrades a service core, in accordance with one or more embodiments of this disclosure.

In connection with updates to functionality of a service provided by a service core (or core platform), FIG. 8 illustrates an example computing system 800 for the upgrade of the service core based on updated functionality of that service, in accordance with one or more embodiments of this disclosure. As mentioned, the service is common across single-tenants. The example computing system 800 includes a generator component 812 that can generate a copy of source program code corresponding to a service core. The source program code can form a core codebase 820 corresponding to a current version of the service core. That version is denoted by $V_n$, in FIG. 8, simply for the sake of nomenclature. The service core includes multiple core modules that provide the service, and the source program code corresponds to the multiple core modules and encodes defined functionality of the service. That defined functionality is particular to version $V_n$. The generated copy can be referred to as a fork, and the generator component 812 can retain the fork within a forked codebase 832. A repository 830 can retain the forked codebase 832. In some embodiments, the repository 830 can be the same as the repository 780 (FIG. 7).

The generator component 812 can modify the copy of the source program code (the fork) within the forked codebase 832. The modified copy of the source program code updates the defined functionality of the service. The generator component 812 can modify the copy of the source program code by adding program code defining new functionality, revising existing program code defining existing functionality, or removing (which may be referred to as deprecating) existing functionality. In some cases, to modify the copy of the source program code, the generator component 812 can receive input data 804a defining program code and/or signaling 804b altering available program code. Such signaling can include, for example, an instruction to edit a fragment of program code. The input data 804a and the signaling 804b can be received from a computing device (not depicted in FIG. 8), via a user interface functionally coupled to the upgrade subsystem 810, for example. Additionally, the generator component 812 can integrate added program code and changes to program code into the forked codebase 832. Thus, the computing system can evolve, based on input data 804a and/or signaling 804b, the forked codebase 832 until one or more desired changes to the copy of the source program code have been implemented. Such evolution is depicted with an arc having an open arrowhead.

The modified copy of the source program code can be operated upon in order to probe integrity of the modified copy. To that point, the upgrade subsystem can include a testing component 814 that can apply one or multiple automated tests to that modified copy of the source program code. The automated test(s), individually or in combination, can probe integrity of the modified copy. In some cases, applying the automated test(s) includes determining, based on control flow analysis, presence or absence of a change to control flow of the modified copy of the source program code.

After satisfactory outcome of the applied test(s), the testing component 814 can generate, based on the modified copy of the source program code, a next version of the service core. The next version of the service core forms a candidate codebase 840 and includes the updated defined functionality. The next version of the service core constitutes an upgrade—in terms of functionality—of the service core. The upgraded service core provides the service according to the updated defined functionality. The next version of the service core is denoted by $V_{k+1}$ in FIG. 8, simply for the sake of nomenclature. In some embodiments, generating the next version ($V_{k+1}$) of the service core can include incorporating safeguard code into the modified copy of the source program code in order to ensure that existing logic arising from a current version ($V_k$) of the service core remains unaltered by the updated defined functionality.

Because the upgraded service core continues to provide the service that is common across single-tenants, albeit according to the updated defined functionality, the operational integrity of the upgraded service core can be probed. Accordingly, the computing system 800 can build second source program code corresponding to the next version of the service core. The second source program code can be the candidate codebase 840. To that end, the computing system 800 can include a compiler subsystem 850. In one example, the compiler subsystem 850 can be the compiler subsystem 796 (FIG. 7). Building the candidate codebase 840 results in an executable package component (e.g., a container, an executable binary file, or similar). The executable package component can include multiple core modules, which have been built and provide, individually or in combination, an upgraded service having the updated defined functionality. The executable package component also can include a common core API. Additionally, the computing system 800 can include a promotion component 816 that can operate on the executable package component by applying one or more automated validation tests. The automated validation test(s), individually or in combination, can probe operational integrity of the executable package component. Applying the second automated test(s) can include determining, based on control flow analysis, for example, presence or absence of a change to control flow of the executable package component relative to the service core prior to the defined functionality of the service being updated.

A terminal computing device (not depicted in FIG. 8) can cause or otherwise direct the promotion component 816 to apply the automated validation test(s). In some cases, the terminal computing device can apply the automated validation test(s) via the API router component 110 (FIG. 1) and a common core API exposed by the service core. To that end, the terminal computing device can execute program code, such as a script, that applies one or multiple automated validation tests to the executable package component obtained from building the candidate codebase 840 having the updated functionality. The automated validation test(s) can be applied by invoking one or multiple function calls of the common core API via the API router component 110 (FIG. 1). The terminal computing device, in response to executing such program code, can obtain the automated validation test(s) from a virtual partition within the data storage 302 (FIG. 3). The automated validation test(s) can be a subset of the validation tests 316 (FIG. 3), for example.

As is described herein, at least some of the automated validation test(s) can include respective workflows, each including a collection of defined testing stages. An automated validation test can thus be applied computationally efficiently by selectively performing a subset of the testing stages rather than the entire collection, thus speeding up the performance of the automated validation test. For example, automated validation test(s) can be applied in order of decreasing outcome risk posed by a potential error in operation and/or logic of the upgraded service core having the updated functionality, first testing logic that, if erroneous, can yield a catastrophic outcome (e.g., injury to the health of a clinical trial subject) and then continuing testing other operation and/or logic that, if erroneous, yields less catastrophic outcomes. As another example, automated validation test(s) can be applied to portions of the updated functionality (or changed logic), without testing other functionality that has remained unchanged and is known to perform satisfactorily. Additionally, as is described herein, computational efficiency also can be achieved by generating synthetic data that can avoid human intervention in the testing of various vectors of operation. For purposes of illustration, a vector may be that a given clinical trial sets up hospital visits, not at-home visits. Thus, at-home-visit logic need not be tested or otherwise probed, for example.

In response to satisfactory outcome(s) of the testing (e.g., backwards compatibility has not been broken) the promotion component 816 can promote the second source program code in the candidate codebase 840 to a core codebase 860 corresponding to the version $V_{n+1}$ of the service core. Promoting the program code can include persisting the program code in a repository, and assigning a perennial unique identifier defining the version $V_{n+1}$ of the service core.

The JITX subsystem 760 (FIG. 7B) and the upgrade subsystem 810 (FIG. 8), and various repositories coupled thereto, can form a computing system embodying a development environment that can be used to develop core codebases. Such a computing system can be referred to as an evolution system. Compared to existing technologies, that evolution system can provide greater upgrade flexibility and superior capacity for mitigation of errors resulting from changes to structure and/or logic of a service core. Such improvements over existing technologies are achieved by systematically testing and validating changes to the service core prior to promoting the service core to upgraded service core.

In view of the aspects described herein, example methods that may be implemented in accordance with this disclosure can be better appreciated with reference, for example, to the flowcharts in FIGS. 9-12. For the sake of simplicity of explanation, the example methods disclosed herein are presented and described as a series of blocks (with each block representing an action or an operation in a method, for example). However, the example methods are not limited by the order of blocks and associated actions or operations, as some blocks may occur in different orders and/or concurrently with other blocks from those that are shown and described herein. Further, not all illustrated blocks, and associated action(s), may be required to implement an example method in accordance with one or more aspects of the disclosure. Two or more of the example methods (and any other methods disclosed herein) may be implemented in combination with each other. It is noted that the example methods (and any other methods disclosed herein) may be alternatively represented as a series of interrelated states or events, such as in a state diagram.

Figure 9:
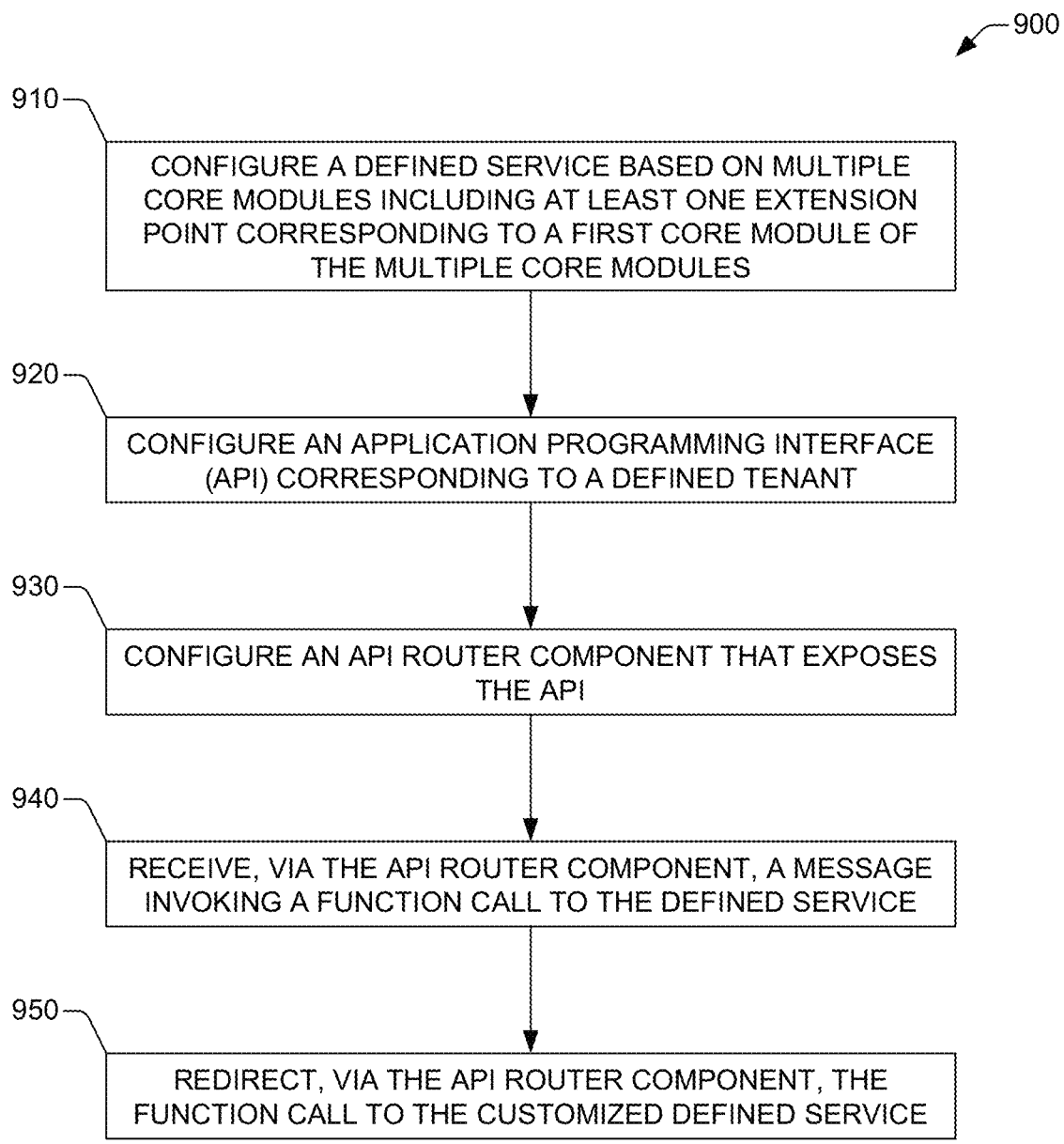
FIG. 9 illustrates an example of a method for providing an extensible service customized to a single-tenant, in accordance with one or more embodiments of this disclosure.

FIG. 9 is a flowchart of an example method 900 for providing an extensible service customized to a single-tenant, in accordance with one or more embodiments of this disclosure. A system of computing devices can implement the example method 900 in its entirety or in part. To that end, each one of the computing devices includes computing resources that may implement at least one of the blocks included in the example method 900. The computing resources comprise, for example, central processing units (CPUs), graphics processing units (GPUs), tensor processing units (TPUs), memory, disk space, incoming bandwidth, and/or outgoing bandwidth, interface(s) (such as I/O interfaces or APIs, or both); controller devices(s); power supplies; a combination of the foregoing; and/or similar resources. In one example, the system of computing devices may include programming interface(s); an operating system; software for configuration and/or control of a virtualized environment; firmware; and similar resources. The system of computing devices can be referred to as a computing system.

At block 910, the computing system can configure a defined service based on multiple core modules including at least one extension point corresponding to a first core module of the multiple core modules.

At block 920, the computing system can configure an API corresponding to a defined tenant. For example, the API can be the API J 130(J) (FIG. 1). The API can be configured by means of a tenant-specific virtual partition (and, in some cases, associated base virtual partitions) as part of building an executable package component that includes the multiple core modules and mapped extension module(s).

At block 930, the computing system can configure an API router component that exposes the API. The API router component can be an API gateway. In one example, the API router component can be the API router component 110 (FIG. 1). As is described herein, the API router component can expose a collection of single-tenant APIs as a multi-tenant arrangement according to a SaaS model of access to a service.

At block 940, the computing system can receive, via the API router component, a message invoking a function call to the defined service. The message can include an attribute indicative of the defined tenant. In some cases, the attribute that identifies the particular tenant can be either an authentication token or a REST parameter. In other cases, the attribute can be a tenant ID that uniquely identifies the defined tenant. The tenant ID can be a UUID, for example.

At block 950, the computing system can redirect, via the API router component, the function call to the customized defined service.

Figure 10:
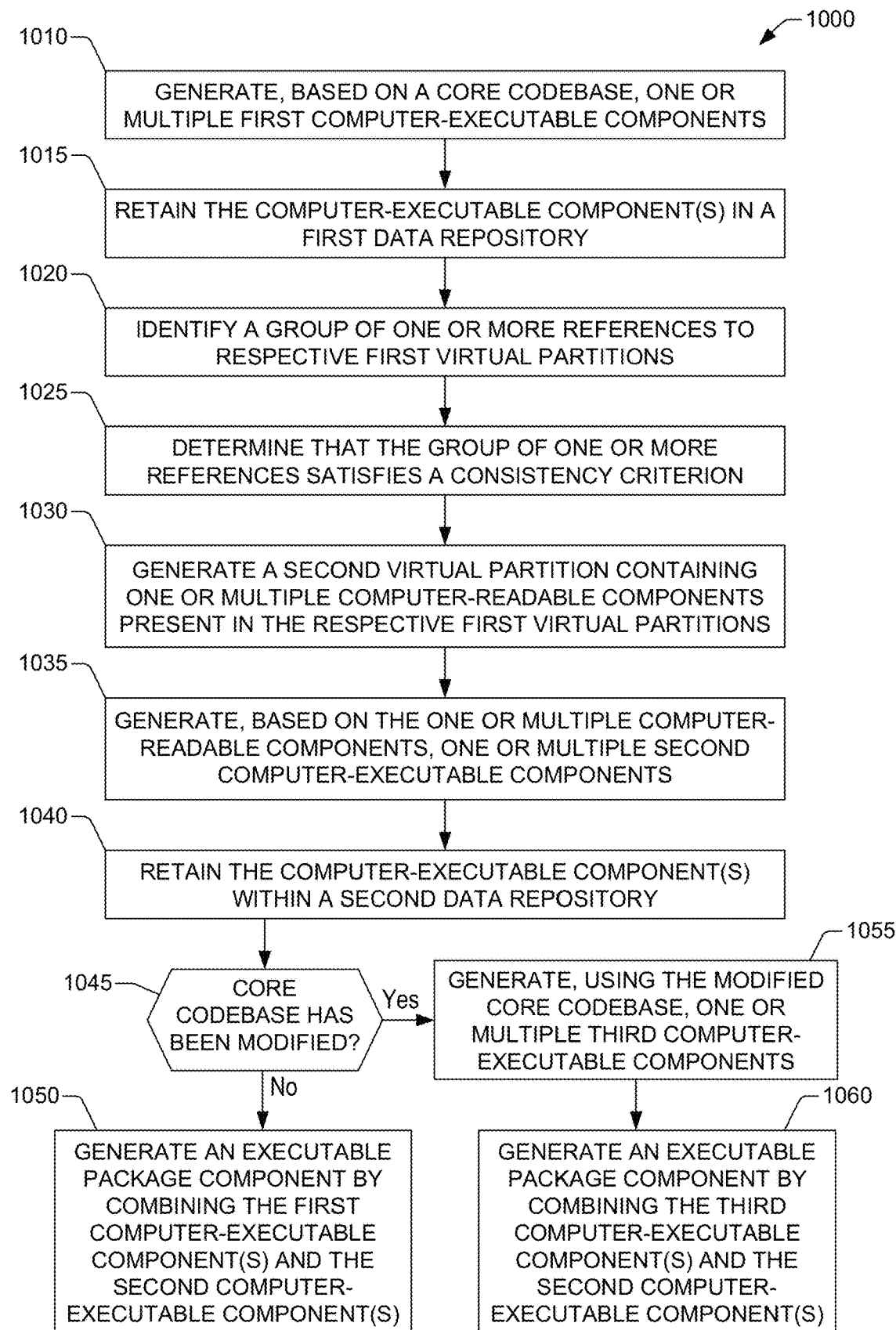
FIG. 10 is a flowchart of an example method for providing an extensible service customized to a single-tenant, in accordance with one or more embodiments of this disclosure.

FIG. 10 is a flowchart of an example method 1000 for providing an extensible service customized to a single-tenant, in accordance with one or more embodiments of this disclosure. A computing device or a system of computing devices can implement the example method 1000 in its entirety or in part. To that end, each one of the computing devices includes computing resources that may implement at least one of the blocks included in the example method 1000. The computing resources comprise, for example, CPUs, GPUs, TPUs, memory, disk space, incoming bandwidth, and/or outgoing bandwidth, interface(s) (such as I/O interfaces or APIs, or both); controller devices(s); power supplies; a combination of the foregoing; and/or similar resources. In one example, the system of computing devices may include programming interface(s); an operating system; software for configuration and/or control of a virtualized environment; firmware; and similar resources. The system of computing devices can be referred to as a computing system.

In some cases, the computing system that implements the example method 1000 can host the parse component(s) 640, merge component(s) 650, transform component(s) 660, and build component(s) 670 (FIG. 6), amongst other software modules. The computing system can implement the example method 1000 by executing one or multiple instances of the parse component(s) 640, merge component(s) 650, transform component(s) 660, and build component(s) 670, for example. Thus, in response to execution, the parse component(s) 640, merge component(s) 650, transform component(s) 660, and build component(s) 670, individually or in combination, can perform the operations corresponding to the blocks, individually or in combination, of the example method 1000.

At block 1010, the computing system can generate, based on a core codebase, one or more computer-executable components. The core codebase (e.g., core codebase 680 (FIG. 6)) can contain program code defining one or more core modules. The computer executable component(s) can be generated by building that program code. The program code can be built via the build component(s) 670, for example. In some cases, multiple computer-executable components can be generated, where each component correspond to a computer-executable core module. The multiple-computer executable components can be the built core modules 688 (FIG. 6).

At block 1015, the computing system can retain the one or more computer-executable components within a first data repository (e.g., data storage 686 (FIG. 6)).

At block 1020, the computing system can identify a group of one or more references to respective first virtual partitions. At least one reference of the group of references can include (i) a unique location identifier indicative of a location, within a computer network, of a particular virtual partition of the respective first virtual partitions and (ii) a datum identifying a version of the particular virtual partition. The unique location identifier can include, for example, a URL and the perennial unique identifier can be a string of characters, for example. Each character in the string of characters can have a meaning defined in a versioning schema. An example of the string of characters is "2.3.1." Regardless of its format, as mentioned, the perennial unique identifier is indicative of immutable content that forms the particular virtual partition at a particular point in time. That immutable content constitutes a version of the particular virtual partition, and thus the version is identified by the perennial unique identifier. In some cases, the group of one or more references defines a graph (such as a directed graph) representing a logical organization of the respective first virtual partitions. The graph includes nodes and edges, where a first node of the nodes represents a first one of the respective first virtual partitions and a second node of the nodes represents a second one of the respective first virtual partitions. As an example, the group of one or more references defines a tree structure, where first virtual partitions constitute respective nodes in the tree structure and each node of the respective nodes can depend (directly in some cases and indirectly and other cases) from a root node. To that point, the tree structure can be the example tree structure 450 shown in FIG. 4D, Accordingly, the first virtual partitions can include the base VP 470(1), base VP 470(2), base VP 470(3), base VP 470(4), and base VP 470(5), and the root node can be the virtual partition 460.

At block 1025, the computing system can determine that the group of one or more references satisfies a consistency criterion. As mentioned, the consistency criterion can dictate that the reference(s) must identify a same instance or same version of a same first virtual partition in order to be consistent.

At block 1030, the computing system can generate a second virtual partition containing one or multiple computer-readable components present in the respective first virtual partitions. The second virtual partition that is generated is a consolidated virtual partition. For example, the second virtual partition can be the consolidated virtual partition 632 (FIG. 6), and while not shown in FIG. 10, the computing system can retain the second virtual partition in a second data repository. In cases where a graph represents a logical organization of the respective first virtual partitions, generating the second virtual partition includes flattening the graph. As is described herein, flattening the graph can include applying one or multiple primitives (or other type of directives) present in the first virtual partitions. The one or multiple primitives can be applied in graph order; that is, according to the order in which references among virtual partitions in the graph are made. Such an order is referred to as graph order.

In addition, or in some cases, flattening the graph can include generating respective copies of all customization assets—e.g., customization components or customization resources, or a combination thereof—within the respective first virtual partitions, and also retaining such respective copies within the consolidated virtual partition. The copies can be generated and retained in graph order, according to the logical organization provided by the graph; that is, according to the order in which references among virtual partitions in the graph are made. Again, such an order is referred to as graph order. In some cases, prior to retaining such respective copies, the computing system can collect information identifying one or multiple conflicts that may be present among two or more copies of respective customization assets. As such, flattening the graph can include determining that a conflict is present among a first copy of the respective copies and a second copy of the respective copies. In response to such a determination, flattening the graph also can include determining a solution to the conflict by applying a defined process based on one or more policies, as is described herein. Further, or in other cases, prior to retaining such respective copies, flattening the graph also can include determining that a conflict is present among a first copy of the respective copies and a second copy of the respective copies. In response to such a determination, flattening the graph also can include sending a report indicative of the conflict. The report can be sent to a computing device or a component functionally coupled to the computing system. Additionally, flattening the graph can include receiving (from the computing device or the component, for example) resolution data defining a solution to the conflict.

At block 1035, the computing system can generate, based on the one or multiple second computer-readable components, one or multiple computer-executable components. The one or multiple second computer-executable components can include at least one tenant-specific extension module. Generating the one or multiple second computer-executable components can include building (e.g., linking and/or compiling) the one or multiple computer-readable components. In some cases, generating the one or multiple second computer-executable components can include transforming at least one component of the one or more computer-readable components into respective program code artifacts. Additionally, generating the one or multiple second computer-executable components also can include building, using the respective program code artifacts, at least one particular computer-executable component of the one or more second computer-executable components.

In addition, or in other cases, generating the one or multiple second computer-executable components can include accessing, from the second virtual partition, abstraction data included in the one or more computer-readable components. As mentioned, abstraction data can define human-readable content indicative of a manner of extending a tenant-specific service, where the human-readable content is devoid of program code or includes a limited amount of custom program code. In one example, the abstraction data can be formatted according to JavaScript object notation and can be retained in a file or another type of data structure. Additionally, generating the one or multiple second computer-executable components also can include accessing a code template. Further, generating the one or multiple second computer-executable components also can include generating, based on the abstraction data and the code template, a first computer-executable component of the one or multiple second computer-executable components.

At block 1040, the computing system can retain the one or multiple computer-executable components within the second data repository (e.g., data storage 630 (FIG. 6)) that can contain the second virtual partition that is generated at block 1030. It is noted that the second data repository can be different from other one or more data repositories that contain the respective first virtual partitions.

Collectively implementing block 1020, block 1025, block 1030, block 1035, and, in some cases, block 1040 permit generating extension modules to customized a core platform associated with the core codebase and the first computer-executable component(s).

In some cases, as is described herein, the generation of the second virtual partition can result in one or multiple modifications to the core codebase. A modification can be, for example, the addition of program code (e.g., program code 684 (FIG. 6) from one of the first virtual partitions. Thus, at block 1045, the computing system can determine if the core codebase has been modified. In response to a negative determination ("No" branch), flow of the example method 1000 can continue to block 1050, where the computing system can generate an executable package component by combining the first computer-executable component(s) and the second computer-executable component(s). The executable package component can be specific to a particular tenant and can be, for example, the executable package component 694 (FIG. 6). The particular tenant can correspond to at least one of the first virtual partitions. The executable package component can be deployed in a runtime subsystem (e.g., runtime subsystem 560 (FIG. 5)) as one of the package components 580, in accordance with aspects described herein. In the alternative, in response to an affirmative determination ("Yes" branch) the flow of the example method 1000 can be directed to block 1055, where the computing system can generate, using the modified core codebase, one or multiple third computer-executable components. At block 1060, the computing system can then generate an executable package component by combining the third computer-executable component(s) and the second computer-executable component(s). The executable package component can be specific to the particular tenant and can be, for example, the executable package component 694 (FIG. 6).

Figure 11:
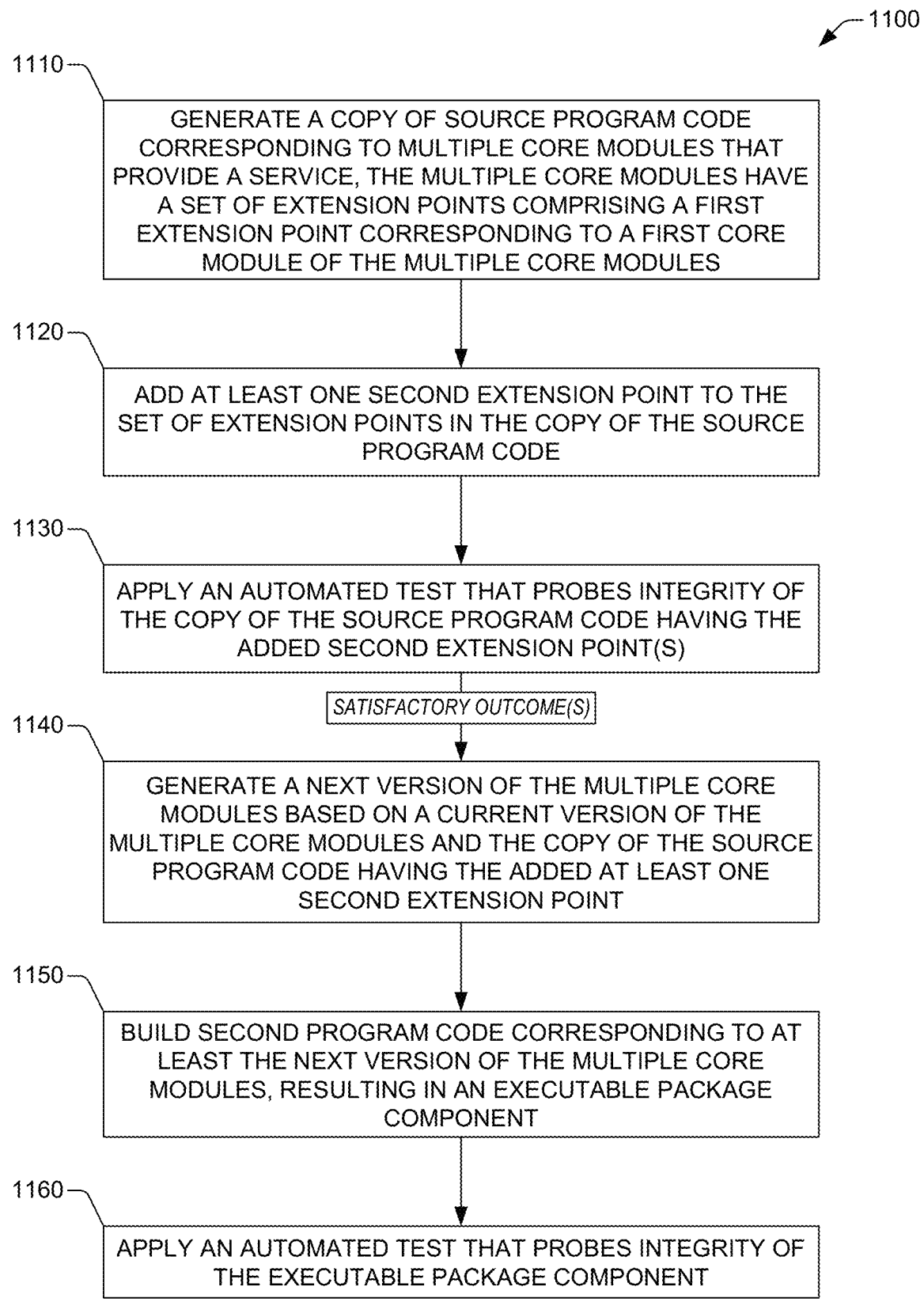
FIG. 11 illustrates an example of a method for expanding the extensibility of a service core associated with a service, in accordance with one or more embodiments of this disclosure.

FIG. 11 is a flowchart of an example method 1100 for expanding the extensibility of a service core associated with a service, in accordance with one or more embodiments of this disclosure. A computing device or a system of computing devices can implement the example method 1100 in its entirety or in part. To that end, each one of the computing devices includes computing resources that may implement at least one of the blocks included in the example method 1100. The computing resources comprise, for example, CPUs, GPUs, TPUs, memory, disk space, incoming bandwidth, and/or outgoing bandwidth, interface(s) (such as I/O interfaces or APIs, or both); controller devices(s); power supplies; a combination of the foregoing; and/or similar resources. In one example, the system of computing devices may include programming interface(s); an operating system; software for configuration and/or control of a virtualized environment; firmware; and similar resources. The system of computing devices can be referred to as a computing system.

In some cases, the computing system that implements the example method 1100 can host the generator component 762, the merger component 764, and the promotion component 766 (FIG. 7B), amongst other software modules. The computing system can implement the example method 1100 by executing one or multiple instances of the generator component 762, the merger component 764, and the promotion component 766, for example. Thus, in response to execution, the generator component 762, the merger component 764, and the promotion component 766, individually or in combination, can perform the operations corresponding to the blocks, individually or in combination, of the example method 1100.

At block 1110, the computing system can generate a copy of source program code corresponding to a service core that provides a service that is common across single-tenants. Such a service can be referred to as common service. The service core includes multiple core modules that provide the service. The multiple core modules, individually or collectively, have a set of extension points. The set of extension points comprises a first extension point corresponding to a first core module of the multiple core modules.

At block 1120, the computing system can add at least one second extension point to the set of extension points in the copy of the source program code. The second extension point is specific to the defined tenant.

At block 1130, the computing system can apply an automated test that probes integrity of the copy of the source program code having the added second extension point. Applying the automated test can include determining, based on control flow analysis, presence or absence of a change to control flow of program code forming the copy of the source program code having the added at least one second extension point. It is noted that the example method 1100 is not limited to a single automated test. Indeed, in some cases, the computing system can apply multiple automated tests that, individually or in a particular combination, probe the integrity of the modified copy of the source program code.

In some cases, outcome(s) of the automated test may not be not satisfactory. In response, the computing system can implement one or more exception handling processes (not depicted in FIG. 11). In other cases, as is illustrated in FIG. 11, one or multiple outcomes of the automated test are satisfactory. In response, flow of the example method 1100 continues to block 1140, where the computing system can generate a next version of the multiple core modules based on a current version of the multiple core modules and the copy of the source program code having the added at least one second extension points. The next version of the multiple core modules includes the added second extension point(s). In some embodiments, generating such a next version can include merging the current version of the multiple core modules and the copy of the source program code having the added at least one second extension points. Such a merging can included identifying the added second extension point(s) in the copy of the source program and incorporating the second extension point(s) into the current version of the multiple core modules. As is described herein, besides the added second extension point(s), other safeguard code also can be incorporated into the current version of the multiple core modules in order to ensure that existing logic arising from the current version of the multiple core modules remains unaltered by the presence of the added second extension point(s).

At block 1150, the computing system can build second source program code corresponding to at least the next version of the multiple core modules having the added at least one second extension point. To that end, in some embodiments, the computing system can include a compiler subsystem. In one example, the compiler subsystem can be embodied in, or can include, the compiler subsystem 796 (FIG. 7B). Building that second program code results in an executable package component. The executable package component includes the multiple core modules comprising the added at least one second extension point, and a core API defined by the service core. As such, the executable package component corresponds to the service core having expanded extensibility. The executable package component, in response to being executed, provides a new service (or functionality thereof) that also is common across single-tenants. The new service has greater extensibility than the common service in view of the addition of the at least one second extension point.

At block 1160, the computing system can apply a second automated test that probes operational integrity of the executable package component. Applying the second automated test can include determining, based on control flow analysis, presence or absence of a change to control flow of executable package component relative to the service core prior to the addition of the at least one second extension point. Again, the example method 1100 is not limited to a single automated test and, in some cases, the computing system can apply multiple second automated tests that, individually or in a particular combination, probe the integrity of the modified copy of the source program code.

Figure 12:
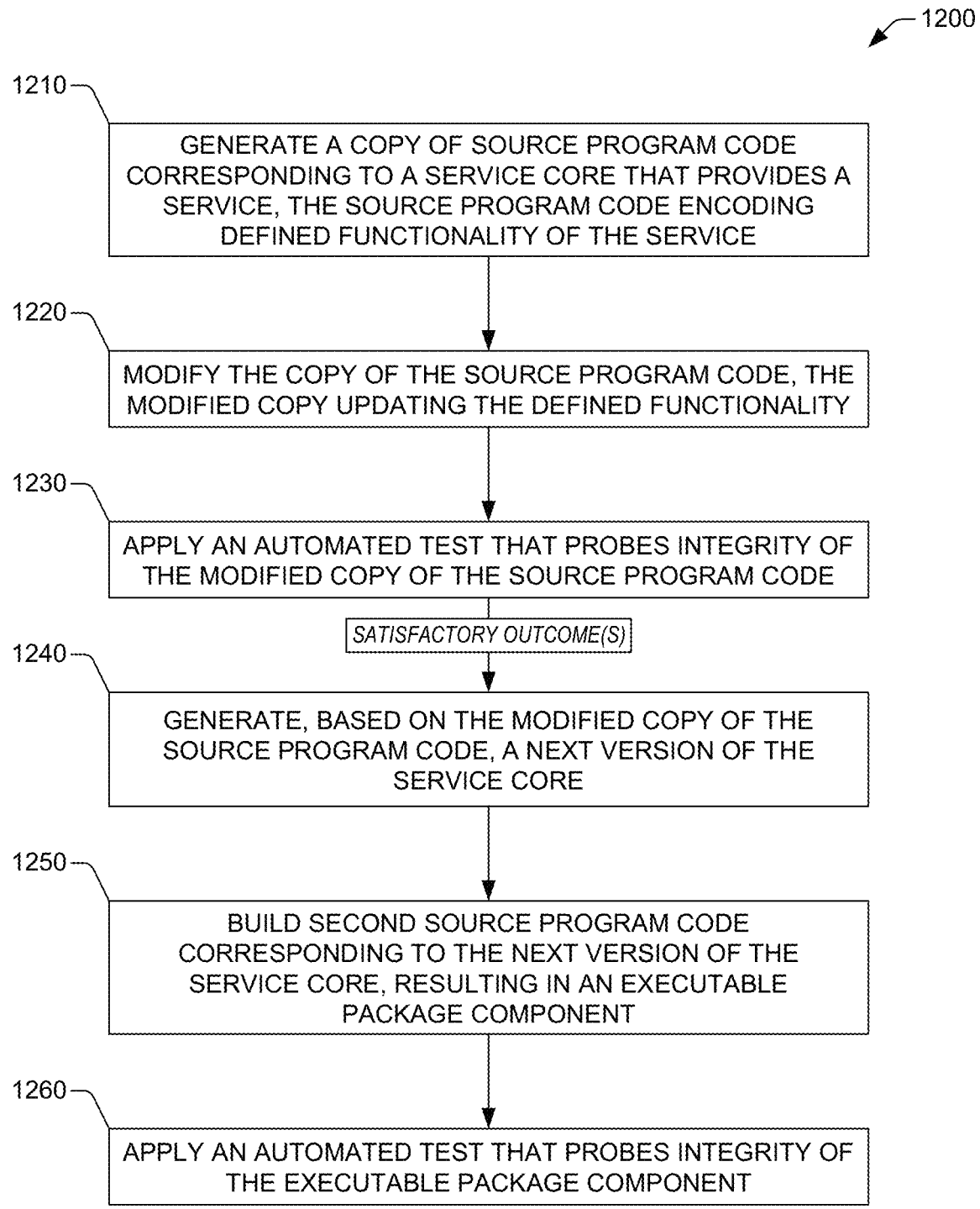
FIG. 12 is a flowchart of another example method for upgrading functionality of a service core associated with a service, in accordance with one or more embodiments of this disclosure.

FIG. 12 is a flowchart of another example method 1200 for upgrading functionality of a service core, in accordance with one or more embodiments of this disclosure. The service core also may be referred to as common core or core platform. As is described herein, the service core (e.g., service core 140) is common across single-tenants. A computing device or a system of computing devices can implement the example method 1200 in its entirety or in part. To that end, each one of the computing devices includes computing resources that may implement at least one of the blocks included in the example method 1200. The computing resources comprise, for example, CPUs, GPUs, TPUs, memory, disk space, incoming bandwidth, and/or outgoing bandwidth, interface(s) (such as I/O interfaces or APIs, or both); controller devices(s); power supplies; a combination of the foregoing; and/or similar resources. In one example, the system of computing devices may include programming interface(s); an operating system; software for configuration and/or control of a virtualized environment; firmware; and similar resources. The system of computing devices can be referred to as a computing system.

In some cases, the computing system that implements the example method 1200 can host the generator component 812, the testing component 814, and the promotion component 816 (FIG. 8), amongst other software modules. The computing system can implement the example method 1200 by executing one or multiple instances of the generator component 812, the testing component 814, and the promotion component 816, for example. Thus, in response to execution, generator component 812, the testing component 814, and the promotion component 816, individually or in combination, can perform the operations corresponding to the blocks, individually or in combination, of the example method 1200.

At block 1210, the computing system can generate a copy of source program code corresponding to a service core that provides a service that is common across single-tenants. As mentioned, that service can be referred to as common service. The generated copy can be referred to as a fork, and the computing system can retain the fork in a forked codebase within a repository. The service core includes multiple core modules that provide the defined service. The source program code corresponds to the multiple core modules, and encodes defined functionality of the service.

At block 1220, the computing system can modify the copy of the source program code. The modified copy of the source program code updates the defined functionality of the service. Modifying the copy of source program code can include adding program code defining new functionality, revising existing program code defining existing functionality, or removing (which may be referred to as deprecating) existing functionality. To modify the copy of the source program code, the computing system can receive input data defining program code and/or signaling altering available program code (such as an instruction to edit a fragment of program code). Additionally, the computing system can integrate added program code and changes to program code into the forked codebase. Thus, the computing system can evolve the forked codebase until one or more desired changes to the copy of the source program code have been implemented.

At block 1230, the computing system can apply an automated test that probes integrity of the modified copy of the source program code. Applying the automated test can include determining, based on control flow analysis, presence or absence of a change to control flow of program code forming the modified copy of the source program code. It is noted that the example method 1200 is not limited to a single automated test and, in some cases, the computing system can apply multiple automated tests that, individually or in a particular combination, probe the integrity of the modified copy of the source program code.

In some cases, outcome(s) of the automated test may not be not satisfactory. In response, the computing system can implement one or more exception handling processes (not depicted in FIG. 12). In other cases, as is illustrated in FIG. 12, one or multiple outcomes of the automated test are satisfactory. In response, flow of the example method 1200 continues to block 1240, where the computing system can generate, based on the modified copy of the source program code, a next version of the service core. The next version of the service core includes the updated defined functionality and constitutes an upgrade—in terms of functionality rather than extension points—of the service core. The upgraded service core provides the service according to the updated defined functionality. In some embodiments, generating the next version of the service core can include persisting source program code corresponding to the next version of the service core as a core codebase and assigning a perennial unique identifier to core base. The perennial unique identifier identifies the next version of the service core. In addition, or in some embodiments, generating the next version of the service core can include incorporating safeguard code into the modified copy of the source program code in order to ensure that existing logic arising from a current version (or otherwise prior version) of the service core remains unaltered by the updated defined functionality.

Because the upgraded service core continues to provide the service that is common across single-tenants, albeit according to the updated defined functionality, the operational integrity of the upgraded service core can be probed. Accordingly, at block 1250, the computing system can build second source program code corresponding to the next version of the service core. To that end, in some embodiments, the computing system can include a compiler subsystem. In one example, the compiler subsystem be embodied in, or can include, the compiler subsystem 796 (FIG. 8). Building that second program code results in an executable package component (e.g., a container, an executable binary file, or similar). The executable package component can include multiple core modules, which have been built and provide, individually or in combination, the updated defined functionality. The executable package component also can include an API.

Additionally, at block 1260, the computing system can apply a second automated test that probes operational integrity of the executable package component. Applying the second automated test can include determining, based on control flow analysis, presence or absence of a change to control flow of the executable package component relative to the service core prior to the defined functionality of the service being updated. Again, the example method 1200 is not limited to a single automated test and, in some cases, the computing system can apply multiple second automated tests that, individually or in a particular combination, probe the operational integrity of the executable package component.

Figure 13:
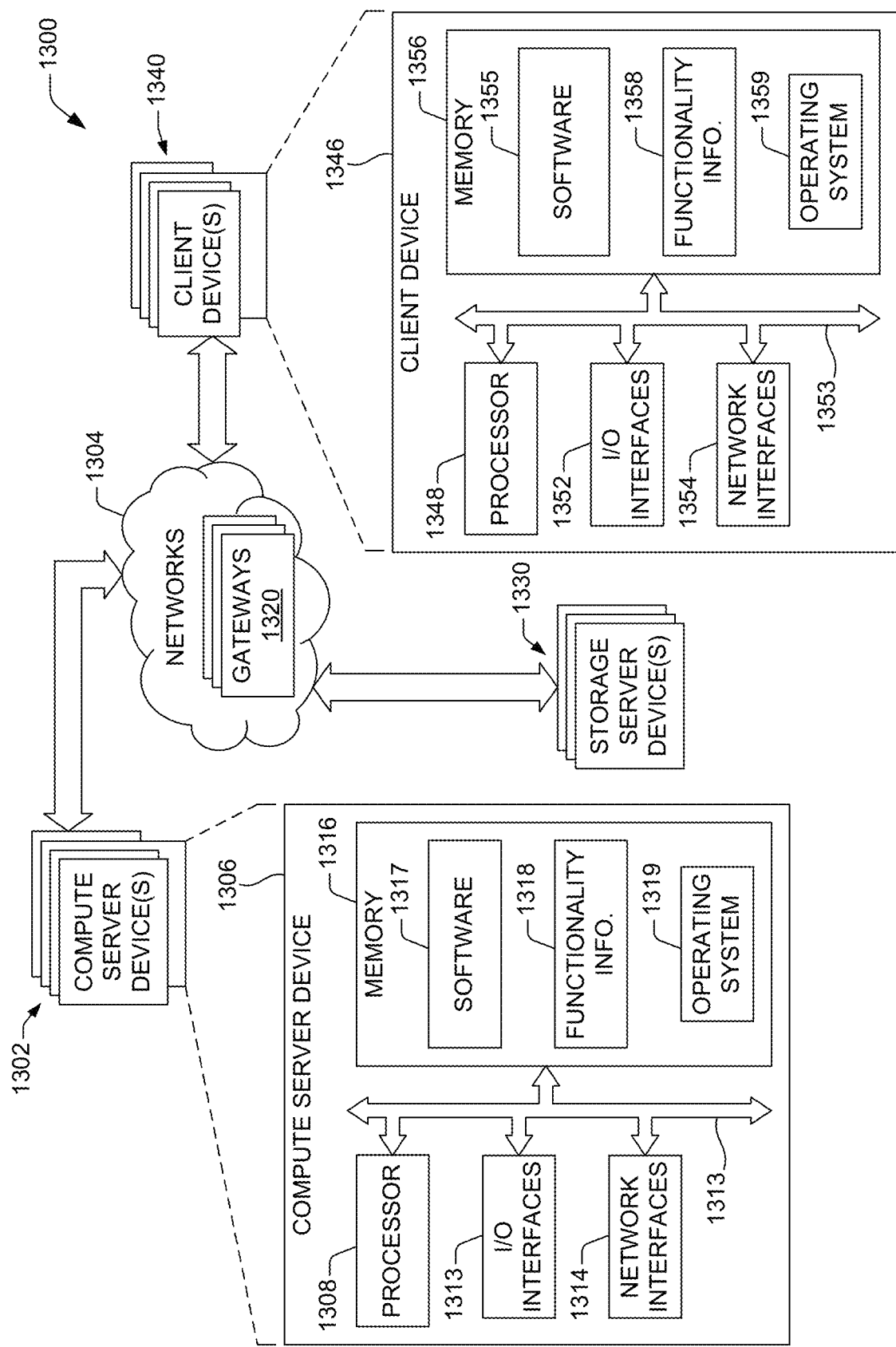
FIG. 13 illustrates an example of a computing system that can implement an extensible SaaS platform providing services customized to respective single-tenants, in accordance with one or more embodiments of this disclosure.

FIG. 13 illustrates an example of a computing system 1300 that can implement an extensible SaaS platform providing services customized to respective single-tenants, in accordance with aspects of this disclosure. The computing system 1300 includes examples of multiple compute server devices 1302 mutually functionally coupled by means of one or more networks 1304, such as the Internet or any wireline or wireless connection. More specifically, the example computing system 1300 includes two types of server devices: Compute server devices 1302 and storage server devices 1330. At least a subset of the compute server devices 1302 can operate in accordance with functionalities described herein in connection with extensible tenant-specific services (such as clinical trials). At least a portion of the computing system 1300 can embody, or can include, the build subsystem 510 (FIG. 5). In addition, or some embodiments, at least another portion of the computing system 1300 can embody, or can include, the runtime subsystem 560 (FIG. 5). That other portion of the computing system 1300 can embody, or can include, the computing system 100 (FIG. 1). Further, or in yet other embodiments, the computing system 1300 also can include the JITX subsystem 760 (FIG. 7B). Furthermore, or in still other embodiments, the computing system 1300 also can include the upgrade subsystem 810 (FIG. 8).

At least the subset of the compute server devices 1302 can be functionally coupled to one or many of the storage server devices 1330. That coupling can be direct or can be mediated by at least one of gateway devices 1320. The storage server devices 1330 include data and metadata that can be used to implement the functionalities described herein in connection with extensible tenant-specific services (such as clinical trials). The storage server devices 1330 can embody at least one database server that can provide databases for respective tenant-specific services. Each one of the databases retained service data for a particular tenant-specific service, where the data is retained according to a data model for that particular tenant-specific service. The storage server devices 1330 can include the database server device(s) 590 (FIG. 5). At least some of the storage server devices 1330 can embody data storage containing one or several virtual partitions (tenant-specific VPs and/or base VPs). Combinations of the storage server devices 1330 also can embody respective data storages containing core codebases, executable package components, and other types of information. At least some of the storage server device(s) can embody various data storage described herein. For example, the at least some of the storage service device(s) can embody data storages described herein in connection with the build subsystem 510 (FIG. 6), the JITX subsystem 760 (FIG. 7B), and the upgrade subsystem 810 (FIG. 8).

Each one of the gateway devices 1320 can include one or many processors functionally coupled to one or many memory devices that can retain application programming interfaces and/or other types of program code for access to the compute server devices 1302 and storage server devices 1330. Such access can be programmatic, via an appropriate function call, for example.

Each one of the compute server devices 1302 can be a digital computer that, in terms of hardware architecture, can include one or more processors 1308 (generically referred to as processor 1308), one or more memory devices 1310 (generically referred to as memory 1310), input/output (I/O) interfaces 1312, and network interfaces 1314. These components (1308, 1310, 1312, and 1314) are functionally coupled via a communication interface 1313. The communication interface 1313 can be embodied in, or can include, for example, one or more bus architectures, or other wireline or wireless connections. The bus architecture(s) can be embodied in, or can include, one or more of several types of bus structures, including a memory bus or a memory controller, a peripheral bus, an accelerated graphics port, and a processor or local bus using any of a variety of bus architectures. As an illustration, such architectures can include an ISA bus, an MCA bus, an EISA bus, a VESA local bus, an AGP bus, a PCI bus, a PCI-Express bus, a PCMCIA bus, a USB, a combination thereof, or the like.

In addition, or in some embodiments, the communication interface 1313 can include additional elements, which are omitted for simplicity, such as controller device(s), buffer device(s) (e.g., cache(s)), drivers, repeaters, transmitter device(s), and receiver device(s), to enable communications. Further, the communication interface 1313 may include address, control, and/or data connections to enable appropriate communications among the aforementioned components.

The processor 1308 can be a hardware device that includes processing circuitry that can execute software, particularly software 1317 stored in one or more memory devices 1316 (referred to as memory 1316). In addition, or as an alternative, the processing circuitry can execute defined operations besides those operations defined by software. The processor 1308 can be any custom-made or commercially available processor, a CPU, a GPU, a TPU, an auxiliary processor among several processors associated with the compute server device 1306, a semiconductor-based microprocessor (in the form of a microchip or chip-set), or generally any device for executing software instructions or performing defined operations. As an illustration, a processor can refer to a single-core processor; a single processor with software multithread execution capability; a multi-core processor; a multi-core processor with software multithread execution capability; a multi-core processor with hardware multithread technology; a parallel processing (or computing) platform; and parallel computing platforms with distributed shared memory.

When the compute server device 1306 is in operation, the processor 1308 can be configured to execute software 1317 stored within the memory 1316, for example, in order to communicate data to and from the memory 1316, and to generally control operations of the compute server device 1306 according to the software 1317 and aspects of this disclosure.

The I/O interfaces 1312 can be used to receive input data from and/or for providing system output to one or more devices or components. Input data can be provided via, for example, a keyboard, a touchscreen display device, a microphone, and/or a mouse. System output can be provided, for example, via the touchscreen display device or another type of display device. The I/O interfaces 1312 can include, for example, a serial port, a parallel port, a Small Computer System Interface (SCSI), an infrared (IR) interface, a radiofrequency (RF) interface, and/or a universal serial bus (USB) interface.

The network interfaces 1314 can be used to transmit and receive data, metadata, and/or signaling from one, some, or all of the compute server device 1302 that are external to the compute server device 1306 on one or more of the network(s) 1304. The network interfaces 1314 also can be used to transmit and receive data, metadata, and/or signaling from other types of apparatuses that are external to the compute server device 1306, on one or more of the network(s) 1304. The network interface 1314 may include, for example, a 10BaseT Ethernet Adaptor, a 100BaseT Ethernet Adaptor, a LAN PHY Ethernet Adaptor, a Token Ring Adaptor, a wireless network adapter (e.g., WiFi), or any other suitable network interface device. The network interfaces 1314 may include address, control, and/or data connections to enable appropriate communications on the network(s) 1304.

The memory 1316 can include any one or combination of volatile memory elements (e.g., random access memory (RAM, such as DRAM, SRAM, SDRAM, etc.)) and non-volatile memory elements (e.g., ROM, hard drive, tape, CDROM, DVDROM, etc.). The memory 1316 also may incorporate electronic, magnetic, optical, solid-state, and/or other types of storage media. In some embodiments, the compute server device 1306 can access one or many of the storage server devices 1330.

Software 1317 that is retained in the memory 1316 may include one or more software components. Each of those software components can include, for example, processor-accessible instructions encoded thereon for implementing logical functions in accordance with aspects of this disclosure. The processor-accessible instructions can include, for example, program instructions that are computer readable and computer-executable. The software 1317 in the memory 1316 of the compute server device 1306 can include one or multiple modules and components described herein. As is illustrated in FIG. 13, the memory 1316 also includes an operating system 1319 (O/S 1319). The O/S 1319 essentially controls the execution of other computer programs and provides, amongst other functions, scheduling, input-output control, file and data management, memory management, and communication control and related services. Specific implementation of such O/S can depend in part on architectural complexity of the compute server device 1306. Example operating systems can include Unix, Linux, and Windows operating system.

The memory 1316 also retains functionality information 1318 (e.g., data, metadata, or a combination of both) that, in combination with the software 1317, can provide the functionality described herein in connection with the computing system 100 (FIG. 1), and/or the build subsystem 510 (FIG. 5) and the runtime subsystem 560 (FIG. 5). As such, in some cases, the software 1317 can include the various components that form part of the build subsystem 510 (FIG. 6), e.g., parse component(s) 640, merge component(s) 650, transform component(s) 660, and build component(s) 670. In addition, or in some embodiments, the software 1317 can include the components that form part of the JITX subsystem 760 (FIG. 7), e.g., generator component 762, merger component 764, and promotion component 766. Further, or in still other embodiments, the software 1317 can include the components that form part of the upgrade subsystem 810 (FIG. 8), e.g., the generator component 812, the testing component 814, and the promotion component 816. The various functionalities provided by the software can be provide in response to being executed by the processor 1308.

Application programs and other executable program components, such as the O/S 1319, are illustrated herein as discrete blocks, although it is recognized that such programs and components can reside at various times in different storage components of the compute server device 1306. An implementation of the software 1315 can be stored on or transmitted across some form of computer-readable storage media. At least subset of the compute server nodes 1302 can execute one or more instances of the software 1315, for example, by processor 1308 present in each of the compute server nodes 1302 in order to provide the various functionalities described herein in accordance with one or more embodiments of this disclosure.

The computing system 1300 also can include one or more client devices 1340. Each one of the client devices 1340 can access at least some of the functionality described herein by means of a gateway of the gateways 1320 and a software application (such as client application) hosted in each one of the client devices 1340. Each one of the client devices is a computing device having the general structure illustrated with reference to a client device 1346 and described hereinafter.

The client device 1346 can include one or more memory devices 1356 (referred to as memory 1346). The memory 1346 can have processor-accessible instructions encoded thereon. The processor-accessible instructions can include, for example, program instructions that are computer readable and computer-executable.

The client device 1346 also can include one or multiple input/output (I/O) interfaces 1352 and network interfaces 1354. A communication interface 1353 can functionally couple two or more of those functional elements of the client device 1346. The communication interface 1353 can include one or more of several types of bus architectures, including a memory bus or memory controller, a peripheral bus, an accelerated graphics port, and a processor or local bus using any of a variety of bus architectures. As an example, such architectures can comprise an ISA bus, an MCA bus, an EISA bus, a VESA local bus, an AGP bus, and a PCI, a PCI-Express bus, a PCMCIA bus, a USB bus, or the like.

Functionality of the client device 1346 can be configured by computer-executable instructions (e.g., program instructions or program modules) that can be executed by at least one of the one or more processors 1348. A subset of the computer-executable instructions can embody a software application, such as the client application or another type of software application (such as an IDE, for example). Such a subset can be arranged in a group of software components. A software component of the group of software components can include computer code, routines, objects, components, data structures (e.g., metadata objects, data object, control objects), a combination thereof, or the like, that can be configured (e.g., programmed) to perform a particular action or implement particular abstract data types in response to execution by the at least one processor.

Thus, the software application can be built (e.g., linked and compiled) and retained in processor-executable form within the memory 1355 or another type of machine-accessible non-transitory storage media. The software application in processor-executable form, for example, can render the client device 1346 a particular machine for configuring or otherwise customizing a tenant-specific service as is described herein, among other functional purposes. The group of built software components that constitute the processor-executable version of the software application can be accessed, individually or in a particular combination, and executed by at least one of the processor(s) 1348. In response to execution, the software application can provide functionality described herein in connection with configuration or otherwise customization of a tenant-specific service. Accordingly, execution of the group of built software components retained in the memory 1356 can cause the client device 1346 to operate in accordance with aspects described herein.

Data and processor-accessible instructions associated with specific functionality of the client device 1346 can be retained in the memory 1356, within functionality information 1358. In one aspect, the processor-accessible instructions can embody any number of components (such as program instructions and/or program modules) that provide specific functionality in response to execution by at least one of the processor(s) 1348. In the subject specification and annexed drawings, memory elements are illustrated as discrete blocks; however, such memory elements and related processor-accessible instructions and data can reside at various times in different storage elements (registers, files, memory addresses, etc.; not shown) in the memory 1356.

The functionality information 1358 can include a variety of data, metadata, or both, associated with configuration or otherwise customization of a tenant-specific service in accordance with aspects described herein.

Memory 1356 can be embodied in a variety of computer-readable media. Examples of computer-readable media can be any available media that is accessible by a processor in a computing device (such as one processor of the processor(s) 1348) and comprises, for example volatile media, non-volatile media, removable media, non-removable media, or a combination the foregoing media. As an example, computer-readable media can comprise "computer storage media," or "computer-readable storage media," and "communications media." Such storage media can be non-transitory storage media. "Computer storage media" comprise volatile and non-volatile, removable and non-removable media implemented in any methods or technology for storage of information such as computer readable instructions, data structures, program modules, or other data. Exemplary computer storage media comprises, but is not limited to, RAM, ROM, EEPROM, flash memory or other memory technology, CD-ROM, DVD or other optical storage, magnetic cassettes, magnetic tape, magnetic disk storage or other magnetic storage devices, or any other medium which can be utilized to store the desired information and which can be accessed by a computer or a processor therein or functionally coupled thereto.

Memory 1356 can comprise computer-readable non-transitory storage media in the form of volatile memory, such as RAM, EEPROM, and the like, or non-volatile memory such as ROM. In one aspect, memory 1356 can be partitioned into a system memory (not shown) that can contain data and/or program modules that enable essential operation and control of the computing device 1346. Such program modules can be implemented (e.g., compiled and stored) in memory elements 1359 (referred to as operating system 1359) whereas such data can be system data that is retained in within system data storage (not depicted in FIG. 13). The operating system 1359 and system data storage can be immediately accessible to and/or are presently operated on by at least one processor of the processor(s) 1348. The operating system 1359 embodies an operating system for the client device 1346. Specific implementation of such O/S can depend in part on architectural complexity of the client device 1346. Higher complexity affords higher-level O/Ss. Example operating systems can include iOS, Android, Windows operating system.

Memory 1356 can comprise other removable/non-removable, volatile/non-volatile computer-readable non-transitory storage media. As an example, memory 1356 can include a mass storage unit (not shown) which can provide non-volatile storage of computer code, computer readable instructions, data structures, program modules, and other data for the client device 1346. A specific implementation of such mass storage unit (not shown) can depend on desired form factor of and space available for integration into the client device 1346. For suitable form factors and sizes of the client device 1346, the mass storage unit (not shown) can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), or the like.

In general, a processor of the one or multiple processors 1348 can refer to any computing processing unit or processing device comprising a single-core processor, a single-core processor with software multithread execution capability, multi-core processors, multi-core processors with software multithread execution capability, multi-core processors with hardware multithread technology, parallel platforms, and parallel platforms with distributed shared memory (e.g., a cache). In addition or in the alternative, a processor of the group of one or multiple processor 1348 can refer to an integrated circuit with dedicated functionality, such as an ASIC, a DSP, a FPGA, a CPLD, a discrete gate or transistor logic, discrete hardware components, or any combination thereof designed to perform the functions described herein. In one aspect, processors referred to herein can exploit nano-scale architectures such as, molecular and quantum-dot based transistors, switches and gates, in order to optimize space usage (e.g., improve form factor) or enhance performance of the computing devices that can implement the various aspects of the disclosure. In another aspect, the one or multiple processors 1348 can be implemented as a combination of computing processing units.

The client device can include or can be functionally coupled to a display device (not depicted in FIG. 13) that can display various user interfaces in connection with configuration or otherwise customization of a tenant-specific service, as is provided, at least in part, by the software application contained in the software 1355.

The one or multiple I/O interfaces 1352 can functionally couple (e.g., communicatively couple) the client device 1346 to another functional element (a component, a unit, server, gateway node, repository, a device, or similar). Functionality of the client device 1346 that is associated with data I/O or signaling I/O can be accomplished in response to execution, by a processor of the processor(s) 1348, of at least one I/O interface that can be retained in the memory 1356. In some embodiments, the at least one I/O interface embodies an API that permits exchange of data or signaling, or both, via an I/O interface. In some embodiments, the one or more I/O interfaces 1352 can include at least one port that can permit connection of the client device 1346 to another other device or functional element. In one or more scenarios, the at least one port can include one or more of a parallel port (e.g., GPIB, IEEE-1284), a serial port (e.g., RS-232, universal serial bus (USB), FireWire or IEEE-1394), an Ethernet port, a V.35 port, a Small Computer System Interface (SCSI) port, or the like.

The at least one I/O interface of the one or more I/O interfaces 1352 can enable delivery of output (e.g., output data or output signaling, or both) to such a device or functional element. Such output can represent an outcome of a specific operation or one or more operations described herein, such as operation (s) performed in the example methods described herein.

Although not shown in FIG. 13, the client device 1346 can include a battery that can power components or functional elements within the client device 1346. The battery can be rechargeable, and can be formed by stacking active elements (e.g., cathode, anode, separator material, and electrolyte) or a winding a multi-layered roll of such elements. In addition to the battery, the client device 1346 can include one or more transformers (not depicted) and/or other circuitry (not depicted) to achieve a power level suitable for the operation of the client device 1346 and components, functional elements, and related circuitry therein.

Figure 14:
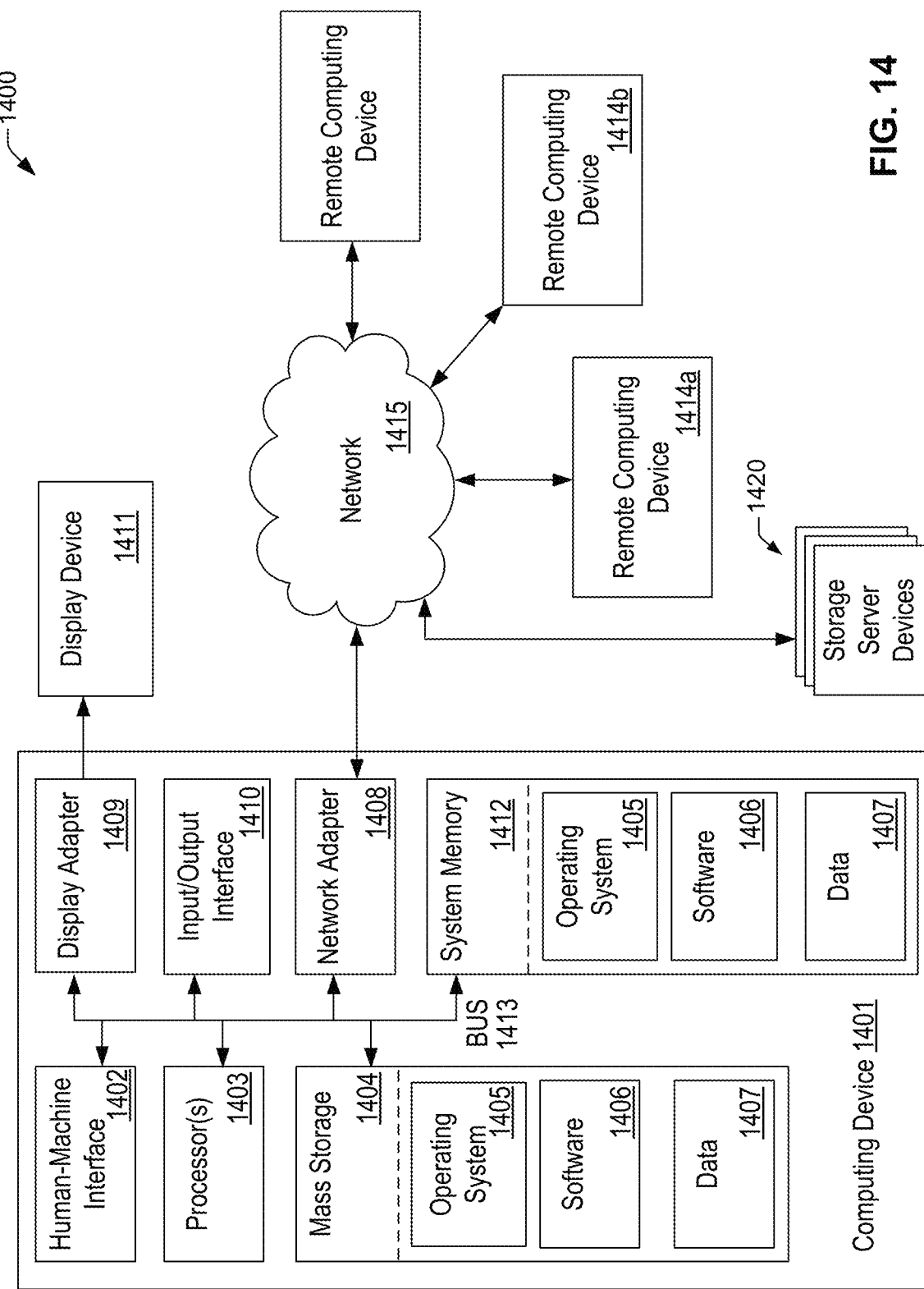
FIG. 14 illustrates an example of a computing system in accordance with one or more embodiments of this disclosure.

In order to provide additional context, the computer-implemented methods and systems of this disclosure can be implemented on the computing system 1400 illustrated in FIG. 14 and described below. Similarly, the computer-implemented methods and systems disclosed herein can utilize one or more computing devices to perform one or more functions in one or more locations. FIG. 14 is a block diagram illustrating an example of a computing system 1400 for performing the disclosed methods and/or implementing the disclosed systems. The computing system 1400 shown in FIG. 14 is only an example of an operating environment and is not intended to suggest any limitation as to the scope of use or functionality of operating environment architecture. Neither should the operating environment be interpreted as having any dependency or requirement relating to any one or combination of components illustrated in the exemplary operating environment.

The computer-implemented methods and systems in accordance with this disclosure can be operational with numerous other general purpose or special purpose computing system environments or configurations. Examples of well-known computing systems, environments, and/or configurations that can be suitable for use with the systems and methods comprise, but are not limited to, personal computers, server computers, laptop devices, and multiprocessor systems. Additional examples comprise set-top boxes, programmable consumer electronics, network PCs, minicomputers, mainframe computers, distributed computing environments that comprise any of the above systems or devices, and the like.

The processing of the disclosed computer-implemented methods and systems can be performed by software components. The disclosed systems and computer-implemented methods can be described in the general context of computer-executable instructions being executed by one or more computers or other processing devices. Generally, program modules can comprise program code, routines, objects, components, data structures, etc. that perform particular tasks or implement particular abstract data types. The disclosed computer-implemented methods can also be practiced in grid-based and distributed computing systems where tasks are performed by remote computing devices that are linked through a communications network. In a distributed computing system, program modules can be located in both local and remote computer storage media including memory storage devices.

Further, the systems and computer-implemented methods disclosed herein can be implemented via a general-purpose computing device in the form of a computing device 1401. The components of the computing device 1401 can comprise one or more processors 1403, a system memory 1412, and a system bus 1413 that functionally couples various system components including the one or more processors 1403 to the system memory 1412. The system can utilize parallel computing in some cases.

The system bus 1413 represents one or more of several possible types of bus structures, including a memory bus or memory controller, a peripheral bus, an accelerated graphics port, or local bus using any of a variety of bus architectures. The system bus 1413, and all buses specified in this description can also be implemented over a wired or wireless network connection and each of the subsystems, including the one or more processors 1403, one or more mass storage devices 1404 (referred to as mass storage 1404), an operating system 1405, software 1406, data 1407, a network adapter 1408, the system memory 1412, an Input/Output Interface 1410, a display adapter 1409, a display device 1411, and a human-machine interface 1402, can be contained within one or more remote computing devices 1414a, b, c at physically separate locations, connected through buses of this form, in effect implementing a fully distributed system.

The computing device 1401 typically comprises a variety of computer-readable media. Examples of readable media can be any available media that is accessible by the computing device 1401 and can include, for example, both volatile and non-volatile media, removable and non-removable media. The system memory 1412 comprises computer readable media in the form of volatile memory, such as random access memory (RAM), and/or non-volatile memory, such as read only memory (ROM). The system memory 1412 typically contains data such as the data 1407 and/or program modules such as the operating system 1405 and the software 1406 that are immediately accessible to and/or are presently operated on by the one or more processors 1403.

The computing device 1401 also can comprise other removable/non-removable, volatile/non-volatile computer storage media. As an example, FIG. 14 illustrates the mass storage 1404 which can provide non-volatile storage of computer code, computer readable instructions, data structures, program modules, and other data for the computing device 1401. For example, the mass storage 1404 can be embodied in, or can include, a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules can be stored on the mass storage 1404, including by way of example, the operating system 1405 and the software 1406. Each of the operating system 1405 and the software 1406 (or some combination thereof) can comprise elements of the programming and the software 1406. The data 1407 can also be stored on the mass storage 1404. The data 1407 can be stored in any of one or more databases. Examples of such databases comprise, DB2®, Microsoft® Access, Microsoft® SQL Server, Oracle®, mySQL, PostgreSQL, and the like. The databases can be centralized or distributed across multiple systems. In some cases, the computing device 1401 can host one or more of the various subsystems described herein. For example, in some cases, the computing device 1401 can host the JITX subsystem 760 (FIG. 7B), where the software 1406 can include the components that form the JITX subsystem 760. In addition, or in other cases, the computing device 1401 can host the build subsystem 510, where the software 1406 can include the components that form the build subsystem 510. Further, or in yet other cases, the computing device 1401 can host the upgrade subsystem 810 (FIG. 8), where the software 1406 can include the components that form the upgrade subsystem 810. Execution of the software 1406 by the processor(s) 1403 can cause the computing device 1401 to provide at least some of the functionality described herein in connection with expanding functionality and/or extension points of a core platform, and/or building code modules and extension modules, and creating executable package components.

In some configurations, one or more of the subsystems described herein can be hosted in distributed fashion. As such, the software 1406 can be replicated across such computing devices. In other configurations, some components of the software 1406 can be localized in a particular one of the computing devices and other components of the software 1406 can be localized in a second particular one of the computing devices. Such distributed embodiments, the computing system can embody, or can constitute the query resolution subsystem 1414. In such embodiments, execution of the software 1406 by at least one processor present in a combination of the computing device 1401 and the remote computing devices 1414a, b, c can cause such a computing system to provide at least some of the functionality described herein in connection with expanding functionality and/or extension points of a core platform, and/or building code modules and extension modules, and creating executable package components, as is described herein.

In another aspect, an end-user can input commands and data into the computing device 1401 via an input device (not shown). Examples of such input devices comprise, but are not limited to, a keyboard, pointing device (e.g., a "mouse"), a microphone, a joystick, a scanner, tactile input devices such as gloves, and other body coverings, and the like These and other input devices can be connected to the one or more processors 1403 via the human-machine interface 1402 that is coupled to the system bus 1413, but can be connected by other interface and bus structures, such as a parallel port, game port, an IEEE 1394 Port (also known as a Firewire port), a serial port, or a universal serial bus (USB).

In yet another aspect, the display device 1411 also can be connected to the system bus 1413 via an interface, such as the display adapter 1409. In some configurations, the computing device 1401 can have more than one display adapter 1409 and the computing device 1401 can have more than one display device 1411. For example, the display device 1411 can be a monitor, an LCD (Liquid Crystal Display), or a projector. In addition to the display device 1411, other output peripheral devices can comprise components such as speakers (not shown) and a printer (not shown) which can be connected to the computing device 1401 via the Input/Output Interface 1410. Any operation and/or result of the methods can be output in any form to an output device. Such output can be any form of visual representation, including, but not limited to, textual, graphical, animation, audio, tactile, and the like. Accordingly, the display device 1411 can present various user interfaces and other information (data, metadata, and/or configuration attributes) pertaining to a tenant-specific service. For example, the display device can present the UIs shown in FIG. 4A and FIG. 4B, among other user interfaces. The display device 1411 and computing device 1401 can be part of one device, or separate devices.

The computing device 1401 can operate in a networked environment using logical connections to one or more remote computing devices 1414a, b, c and/or one or multiple storage server devices 1420. For example, a remote computing device can be a personal computer, portable computer, smartphone, a server, a router, a network computer, a peer device or other common network node, and so on. In some cases, the one or multiple storage server devices 1420 can embody, or can constitute, the storage server device(s) 1330 (FIG. 13). Logical connections between the computing device 1401 and a remote computing device 1414a, b, c and a server storage device of the server storage device(s) 1420 can be made via a network 1415, such as a local area network (LAN) and/or a general wide area network (WAN). Such network connections can be through the network adapter 1408. The network adapter 1408 can be implemented in both wired and wireless environments.

For purposes of illustration, application programs and other executable program components such as the operating system 1405 are illustrated herein as discrete blocks, although it is recognized that such programs and components reside at various times in different storage components of the computing device 1401, and are executed by the one or more processors 1403 of the computer. An implementation of the software 1406 can be stored on or transmitted across some form of computer-readable media. Any of the disclosed methods can be performed by computer readable instructions embodied on computer-readable media. Computer-readable media can be any available media that can be accessed by a computer. As is described herein, "computer storage media" comprise volatile and non-volatile, removable and non-removable media implemented in any methods or technology for storage of information such as computer-readable instructions, data structures, program modules, or other data.

Numerous other embodiments emerge from the foregoing detailed description and annexed drawings. An Example 1 of those embodiments includes a computing system including at least one processor that executes computer-executable components stored in at least one memory device, the computer-executable components comprising multiple core modules configured to provide a defined service, the multiple core modules comprising at least one extension point corresponding to a first core module of the multiple core modules, wherein a first extension point of the at least one extension point has a tenant-specific extension module mapped thereto that customizes the defined service. The computer-executable components also include an application programming interface API corresponding to a defined tenant; and a data model corresponding to the defined tenant.

An Example 2 of the numerous embodiments includes the computing system of Example 1, where the computer-executable components further comprise an API router component configured to receive a message invoking a function call to the customized defined service and including an attribute that identifies the defined tenant, the API router component redirects the function call to the customized defined service based on the attribute, and wherein the API component exposes the API.

An Example 3 of the numerous embodiments includes the computing system of Example 1, where the first core module is configured to provide at least one first element to the data model, and where a second core module of the multiple core modules is configured to provide at least one second element to the data model.

An Example 4 of the numerous embodiments includes the computing system of Example 1, where the first core module is configured to provide at least one first function to the API, and where a second core module of the multiple core modules is configured to provide at least one second function to the API.

An Example 5 of the numerous embodiments includes the computing system of Example 1, where the first core module is configured to change at least one of an extant data model or an extant API, resulting in one of at least a portion of the API or at least a portion of the data model.

An Example 6 of the numerous embodiments includes the computing system of Example 1, where the tenant-specific extension module is configured to provide at least one element to the data model, is configured to provide a function to the API, or is configured to provide the at least one element to the data model and the function to the API.

An Example 7 of the numerous embodiments includes the computing system of Example 1, where the tenant-specific extension module is configured to preserve multiple core functions that constitute the API and further preserve multiple core elements that constitute the data model.

An Example 8 of the numerous embodiments includes the computing system of Example 1, where the tenant-specific extension module is configured to remove a particular core function of multiple core functions that constitute the API and preserve multiple core elements that constitute the data model.

An Example 9 of the numerous embodiments includes the computing system of Example 1, where the tenant-specific extension module is configured to preserve multiple core functions that constitute the API and remove a particular core element of multiple core elements that constitute the data model.

An Example 10 of the numerous embodiments includes the computing system of Example 1, further including at least one second memory device storing a non-transitory storage structure dedicated to the defined tenant, the non-transitory storage structure comprising one or more of configuration attributes, program code defining extension logic, or multiple tenant-specific extension modules.

An Example 11 of the numerous embodiments includes the computing system of Example 10, where the non-transitory storage structure comprises one of a filesystem, a file folder, a database, or a table.

An Example 12 of the numerous embodiments includes the computing system of Example 10, where each tenant-specific extension module of the multiple tenant-specific modules preserves core elements that constitute the data model and further preserves multiple core functions that constitute the API.

An Example 13 of the numerous embodiments includes the computing system of Example 10, where a select tenant-specific module of the multiple tenant-specific modules causes a destructive modification of one or more of a core API corresponding to defined service or a core data model corresponding to the data model, resulting in breaking backward compatibility of the customized defined service with the defined service.

An Example 14 of the numerous embodiments includes the computing system of Example 10, where the non-transitory storage structure further comprises definition data identifying a tenant-specific service, configuration data corresponding to the tenant-specific service, and metadata corresponding to the tenant-specific service.

An Example 15 of the numerous embodiments includes the computing system of Example 10, where the non-transitory storage structure further comprises definition data identifying an extension point, the definition data comprising: first data identifying a domain of the extension point; second data identifying functionality corresponding to the extension point; and a description of the extension point identifying one or more methods corresponding to the extension point, input parameters of the extension point, and output type corresponding to the extension point.

An Example 16 of the numerous embodiments includes the computing system of Example 10, where the non-transitory storage structure further comprises abstraction data defining human-readable content indicative of a manner of extending a tenant-specific service, wherein the human-readable content is devoid of program code or the human-readable content comprises a snippet of custom program code.

An Example 17 of the numerous embodiments includes the computing system of Example 10, the at least one second memory device further storing a second non-transitory storage structure associated with one or more tenants, the second non-transitory storage structure comprising one or more of second configuration attributes, second program code defining extension logic, or multiple extension modules.

An Example 18 of the numerous embodiments includes the computing system of Example 17, where the non-transitory storage structure and the second non-transitory storage structure are logically configured in a hierarchical structure.

An Example 19 of the numerous embodiments includes the computing system of Example 18, where the hierarchical structure comprises a graph having a first node representing the non-transitory storage structure and a second node representing the second non-transitory storage structure.

An Example 20 of the numerous embodiments includes the computing system of Example 18, where the hierarchical structure comprises a tree structure, and wherein a first node representing the non-transitory storage structure is a root node and a second node representing the second non-transitory storage structure is a leaf node.

An Example 21 of the numerous embodiments includes the computing system of Example 10, the at least one memory device comprising a permission attribute configured to grant exclusive access to the customized defined service to the defined tenant.

An Example 22 of the numerous embodiments includes a computer-implemented method including generating a copy of source program code corresponding to multiple core modules that provide a defined service, the multiple core modules comprising at least one first extension point corresponding to a first core module of the multiple core modules. The computer-implemented method also includes adding at least one second extension point to the at least one first extension point in the copy of the source program code, the at least one second extension point being specific to a defined tenant.

An Example 23 of the numerous embodiments includes the computer-implemented method of Example 22, further including applying an automated test that probes integrity of the copy of the source program code having the added at least one second extension point.

An Example 24 of the numerous embodiments includes the computer-implemented method of Example 23, where the applying the automated test comprises determining, based on control flow analysis, presence or absence of a change to control flow of program code forming the copy of the source program code having the added at least one second extension point.

An Example 25 of the numerous embodiments includes the computer-implemented method of Example 22, further including generating a next version of the multiple core modules based on a current version of the multiple core modules and the copy of the source program code having the added at least one second extension point.

An Example 26 of the numerous embodiments includes the computer-implemented method of Example 25, where the generating the next version of the multiple core modules comprises integrating at least the added at least one second extension point into the current version of the multiple core modules.

An Example 27 of the numerous embodiments includes the computer-implemented method of Example 25, further including building second program code corresponding to at least the next version of the multiple core modules having the added at least one second extension point, resulting in an executable package component comprising the multiple core modules comprising the added at least one second extension point.

An Example 28 of the numerous embodiments includes the computer-implemented method of Example 27, further including applying an automated test that probes integrity of the executable package component.

An Example 29 of the numerous embodiments includes a computing system including one or more processors, and one or more memory devices storing computer-executable instructions that, in response to execution by the one or more processors, cause the computing system to: generate a copy of source program code corresponding to multiple core modules that provide a defined service, the multiple core modules comprising at least one first extension point corresponding to a first core module of the multiple core modules; and add at least one second extension point to the at least one first extension point in the copy of the source program code, the at least one second extension point being specific to the defined tenant.

An Example 30 of the numerous embodiments includes the computing system of Example 29, the one or more memory devices storing further computer-executable instructions that, in response to further execution by the one or more processors, further cause the computing system to apply an automated test that probes integrity of the copy of the source program code having the added at least one second extension point.

An Example 31 of the numerous embodiments includes the computing system of Example 29, where applying the automated test comprises determining, based on control flow analysis, presence or absence of a change to control flow of program code forming the copy of the source program code having the added at least one second extension point.

An Example 32 of the numerous embodiments includes the computing system of Example 29, the one or more memory devices storing further computer-executable instructions that, in response to further execution by the one or more processors, further cause the computing system to generate a next version of the multiple core modules based on a current version of the multiple core modules and the copy of the source program code having the added at least one second extension point.

An Example 33 of the numerous embodiments includes the computing system of Example 29, the one or more memory devices storing further computer-executable instructions that, in response to further execution by the one or more processors, further cause the computing system to build second program code corresponding to at least the next version of the multiple core modules having the added at least one second extension point, resulting in an executable package component comprising the multiple core modules comprising the added at least one second extension point.

An Example 34 of the numerous embodiments includes the computing system of Example 29, the one or more memory devices storing further computer-executable instructions that, in response to further execution by the one or more processors, further cause the computing system to apply an automated test that probes integrity of the executable package component.

An Example 35 of the numerous embodiments includes at least one non-transitory computer-readable storage medium having processor-executable instructions encoded thereon that, in response to execution, cause one or more computing devices to perform operations including: generating a copy of source program code corresponding to multiple core modules that provide a defined service, the multiple core modules comprising at least one first extension point corresponding to a first core module of the multiple core modules; and adding at least one second extension point to the at least one first extension point in the copy of the source program code, the at least one second extension point being specific to the defined tenant.

An Example 36 of the numerous embodiments includes the at least one non-transitory computer-readable storage medium of Example 35, the operations further including applying an automated test that probes integrity of the copy of the source program code having the added at least one second extension point.

An Example 37 of the numerous embodiments includes the at least one non-transitory computer-readable storage medium of Example 36, where the applying the automated test comprises determining, based on control flow analysis, presence or absence of a change to control flow of program code forming the copy of the source program code having the added at least one second extension point.

An Example 38 of the numerous embodiments includes the at least one non-transitory computer-readable storage medium of Example 35, the operations further including generating a next version of the multiple core modules based on a current version of the multiple core modules and the copy of the source program code having the added at least one second extension point.

An Example 39 of the numerous embodiments includes the at least one non-transitory computer-readable storage medium of Example 38, where the generating the next version of the multiple core modules comprises integrating at least the added at least one second extension point into the current version of the multiple core modules.

An Example 40 of the numerous embodiments includes the at least one non-transitory computer-readable storage medium of Example 38, the operations further comprising building second program code corresponding to at least the next version of the multiple core modules having the added at least one second extension point, resulting in an executable package component comprising the multiple core modules comprising the added at least one second extension point.

An Example 41 of the numerous embodiments includes the at least one non-transitory computer-readable storage medium of Example 40, the operations further including applying an automated test that probes integrity of the executable package component.

An Example 42 of the numerous embodiments includes a computer-implemented method including identifying a group of one or more references to respective first virtual partitions, the group of one or more references defining a graph representative of a logical organization of the respective first virtual partitions, wherein the graph comprises a first node representing a first one of the respective first virtual partitions and a second node representing a second one of the respective first virtual partitions. The computer-implemented method also includes determining that the group of one or more references satisfies a consistency criterion. The computer-implemented method further includes generating a second virtual partition by flattening the graph, the second virtual partition containing one or more computer-readable components present in the respective first virtual partitions. The flattening comprises applying, in graph order, one or more primitives present in at least one of the respective first virtual partitions. The computer-implemented method still further includes generating, based on the one or more computer-readable components, one or more computer-executable components.

An Example 43 of the numerous embodiments includes the computer-implemented method of Example 42, further comprising generating an executable package component by combining the one or more computer-readable components with second computer-executable components corresponding to a group of core modules.

An Example 44 of the numerous embodiments includes the computer-implemented method of Example 42, further comprising retaining the one or more computer-executable components within a data repository, wherein the one or more computer-executable component comprise at least one tenant-specific extension module.

An Example 45 of the numerous embodiments includes the computer-implemented method of Example 42, where the one or more computer-readable components comprise abstraction data defining human-readable content defining a manner of extending a tenant-specific service, wherein the human-readable content is devoid of program code or the human-readable content comprises a snippet of program code.

An Example 46 of the numerous embodiments includes the computer-implemented method of Example 45, where the generating, based on the one or more computer-readable components, the one or more computer-executable components comprises: transforming the human-readable content into at least one program code artifact; and building, using the at least one program code artifact, at least one particular computer-executable component of the one or more computer-executable components.

An Example 47 of the numerous embodiments includes the computer-implemented method of Example 42, where the generating, based on the one or more computer-readable components, the one or more computer-executable components comprises: accessing, from the second virtual partition, the abstraction data; accessing a code template; and generating, based on the abstraction data and the code template, a first computer-executable component of the one or more computer-executable components.

An Example 48 of the numerous embodiments includes the computer-implemented method of Example 44, where the second virtual partition forms a part of the data repository, and wherein the respective first virtual partitions form part of a second data repository.

An Example 49 of the numerous embodiments includes the computer-implemented method of Example 42, where a first reference of the group of references comprises a unique location identifier indicative of a location, within a computer network, of a particular virtual partition of the respective first virtual partitions and further comprises a datum identifying a version of the particular virtual partition.

An Example 50 of the numerous embodiments includes the computer-implemented method of Example 49, where the unique location identifier comprises a uniform resource locator (URL), and wherein the version corresponds to a perennial unique identifier indicative of immutable content that forms the particular virtual partition at a defined time.

An Example 51 of the numerous embodiments includes the computer-implemented method of Example 42, where the flattening comprises: generating respective copies of configuration assets within the respective first virtual partitions; and retaining, in graph order, the respective copies within the second virtual partition.

An Example 52 of the numerous embodiments includes the computer-implemented method of Example 51, where the flattening further comprises determining that a conflict is present among a first copy of the respective copies and a second copy of the respective copies; and determining a solution to the conflict by applying a defined process based on one or more policies.

An Example 53 of the numerous embodiments includes the computer-implemented method of Example 51, where the flattening further comprises determining that a conflict is present among a first copy of the respective copies and a second copy of the respective copies; sending (to a computing device or component, for example) a report indicative of the conflict; receiving (from the computing device or component, for example) resolution data defining a solution to the conflict; and resolving the conflict by applying the solution.

An Example 54 of the numerous embodiments includes a computing system including one or more processors; and one or more memory devices storing computer-executable instructions that, in response to execution by the one or more processors, cause the computing system to: identify a group of one or more references to respective first virtual partitions, the group of one or more references defining a graph representative of a logical organization of the respective first virtual partitions, wherein the graph comprises a first node representing a first one of the respective first virtual partitions and a second node representing a second one of the respective first virtual partitions; determine that the group of one or more references satisfies a consistency criterion; generate a second virtual partition by flattening the graph, the second virtual partition containing one or more computer-readable components present in the respective first virtual partitions, where the flattening comprises applying, in graph order, one or more primitives present in at least one of the respective first virtual partitions; and generate, based on the one or more computer-readable components, one or more computer-executable components.

An Example 55 of the numerous embodiments include the computing system of Example 54, the one or more memory devices storing further computer-executable instructions that, in response to further execution by the one or more processors, further cause the computing system to generate an executable package component by combining the one or more computer-readable components with second computer-executable components corresponding to a group of core modules.

An Example 56 of the numerous embodiments includes the computing system of Example 54, the one or more memory devices storing further computer-executable instructions that, in response to further execution by the one or more processors, further cause the computing system to retain the one or more computer-executable components within a data repository, wherein the one or more computer-executable component comprise at least one tenant-specific extension module.

An Example 57 of the numerous embodiments includes the computing system of Example 54, where the one or more computer-readable components comprise abstraction data defining human-readable content defining a manner of extending a tenant-specific service, wherein the human-readable content is devoid of program code or the human-readable content comprises a snippet of program code.

An Example 58 of the numerous embodiments includes the computing system of Example 57, where generating, based on the one or more computer-readable components, the one or more computer-executable components comprises: transforming the human-readable content into at least one program code artifact; and building, using the at least one program code artifact, at least one particular computer-executable component of the one or more computer-executable components.

An Example 59 of the numerous embodiments includes the computing system of Example 54, where generating, based on the one or more computer-readable components, the one or more computer-executable components comprises: accessing, from the second virtual partition, the abstraction data; accessing a code template; and generating, based on the abstraction data and the code template, a first computer-executable component of the one or more computer-executable components.

An Example 60 of the numerous embodiments includes the computing system of Example 56, where the second virtual partition forms a part of the data repository, and wherein the respective first virtual partitions form part of a second data repository.

An Example 61 of the numerous embodiments includes the computing system of Example 54, where the flattening further comprises: generating respective copies of configuration assets within the respective first virtual partitions; and retaining, in graph order, the respective copies within the second virtual partition.

An Example 62 of the numerous embodiments includes the computing system of Example 61, where the flattening further comprises: determining that a conflict is present among a first copy of the respective copies and a second copy of the respective copies; and determining a solution to the conflict by applying a defined process based on one or more policies.

An Example 63 of the numerous embodiments includes the computing system of Example 61, wherein the flattening further comprises: determining that a conflict is present among a first copy of the respective copies and a second copy of the respective copies; sending (to a computing device or component, for example) a report indicative of the conflict; receiving (from the computing device or component, for example) resolution data defining a solution to the conflict; and resolving the conflict by applying the solution.

An Example 64 of the numerous embodiments includes at least one non-transitory computer-readable storage medium having processor-executable instructions encoded thereon that, in response to execution, cause a computing system to: identify a group of one or more references to respective first virtual partitions, the group of one or more references defining a graph representative of a logical organization of the respective first virtual partitions, wherein the graph comprises a first node representing a first one of the respective first virtual partitions and a second node representing a second one of the respective first virtual partitions; determine that the group of one or more references satisfies a consistency criterion; generate a second virtual partition by flattening the graph, the second virtual partition containing one or more computer-readable components present in the respective first virtual partitions, wherein the flattening comprises applying, in graph order, one or more primitives present in at least one of the respective first virtual partitions; and generate, based on the one or more computer-readable components, one or more computer-executable components.

An Example 65 of the numerous embodiments includes at least one non-transitory computer-readable storage medium of Example 64, where the processor-executable instructions, in response to further execution, further cause the computing system to generate an executable package component by combining the one or more computer-readable components with second computer-executable components corresponding to a group of core modules.

An Example 66 of the numerous embodiments includes at least one non-transitory computer-readable storage medium of Example 64, where the processor-executable instructions, in response to further execution, further cause the computing system to retain the one or more computer-executable components within a data repository, wherein the one or more computer-executable component comprise at least one tenant-specific extension module.

An Example 67 of the numerous embodiments includes at least one non-transitory computer-readable storage medium of Example 64, where the one or more computer-readable components comprise abstraction data defining human-readable content defining a manner of extending a tenant-specific service, wherein the human-readable content is devoid of program code or the human-readable content comprises a snippet of program code.

An Example 68 of the numerous embodiments includes at least one non-transitory computer-readable storage medium of Example 67, where generating, based on the one or more computer-readable components, the one or more computer-executable components comprises: transforming the human-readable content into at least one program code artifact; and building, using the at least one program code artifact, at least one particular computer-executable component of the one or more computer-executable components.

An Example 69 of the numerous embodiments includes at least one non-transitory computer-readable storage medium of Example 64, where generating, based on the one or more computer-readable components, the one or more computer-executable components comprises: accessing, from the second virtual partition, the abstraction data; accessing a code template; and generating, based on the abstraction data and the code template, a first computer-executable component of the one or more computer-executable components.

An Example 70 of the numerous embodiments includes at least one non-transitory computer-readable storage medium of Example 66, where the second virtual partition forms a part of the data repository, and wherein the respective first virtual partitions form part of a second data repository.

An Example 71 of the numerous embodiments includes at least one non-transitory computer-readable storage medium of Example 64, where a first reference of the group of references comprises a unique location identifier indicative of a location, within a computer network, of a particular virtual partition of the respective first virtual partitions and further comprises a datum identifying a version of the particular virtual partition.

An Example 72 of the numerous embodiments includes at least one non-transitory computer-readable storage medium of Example 71, where the unique location identifier comprises a uniform resource locator (URL), and wherein the version corresponds to a perennial unique identifier indicative of immutable content that forms the particular virtual partition at a defined time.

An Example 73 of the numerous embodiments includes at least one non-transitory computer-readable storage medium of Example 64, where the flattening comprises: generating respective copies of configuration assets within the respective first virtual partitions; and retaining, in graph order, the respective copies within the second virtual partition.

An Example 74 of the numerous embodiments includes at least one non-transitory computer-readable storage medium of Example 73, where the flattening further comprises determining that a conflict is present among a first copy of the respective copies and a second copy of the respective copies; and determining a solution to the conflict by applying a defined process based on one or more policies.

An Example 75 of the numerous embodiments includes at least one non-transitory computer-readable storage medium of Example 73, where the flattening further comprises determining that a conflict is present among a first copy of the respective copies and a second copy of the respective copies; sending (to a computing device or a component, for example) a report indicative of the conflict; receiving (from the computing device, for example) resolution data defining a solution to the conflict; and resolving the conflict by applying the solution.

It is to be understood that the methods and systems described here are not limited to specific operations, processes, components, or structure described, or to the order or particular combination of such operations or components as described. It is also to be understood that the terminology used herein is for the purpose of describing exemplary embodiments only and is not intended to be restrictive or limiting.

As used herein the singular forms "a," "an," and "the" include both singular and plural referents unless the context clearly dictates otherwise. Values expressed as approximations, by use of antecedents such as "about" or "approximately," shall include reasonable variations from the referenced values. If such approximate values are included with ranges, not only are the endpoints considered approximations, the magnitude of the range shall also be considered an approximation. Lists are to be considered exemplary and not restricted or limited to the elements comprising the list or to the order in which the elements have been listed unless the context clearly dictates otherwise.

Throughout the specification and claims of this disclosure, the following words have the meaning that is set forth: "comprise" and variations of the word, such as "comprising" and "comprises," mean including but not limited to, and are not intended to exclude, for example, other additives, components, integers, or operations. "Include" and variations of the word, such as "including" are not intended to mean something that is restricted or limited to what is indicated as being included, or to exclude what is not indicated. "May" means something that is permissive but not restrictive or limiting. "Optional" or "optionally" means something that may or may not be included without changing the result or what is being described. "Prefer" and variations of the word such as "preferred" or "preferably" mean something that is exemplary and more ideal, but not required. "Such as" means something that serves simply as an example.

Operations and components described herein as being used to perform the disclosed methods and construct the disclosed systems are illustrative unless the context clearly dictates otherwise. It is to be understood that when combinations, subsets, interactions, groups, etc. of these operations and components are disclosed, that while specific reference of each various individual and collective combinations and permutation of these may not be explicitly disclosed, each is specifically contemplated and described herein, for all methods and systems. This applies to all aspects of this application including, but not limited to, operations in disclosed methods and/or the components disclosed in the systems. Thus, if there are a variety of additional operations that can be performed or components that can be added, it is understood that each of these additional operations can be performed and components added with any specific embodiment or combination of embodiments of the disclosed systems and methods.

Embodiments of this disclosure may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. Any suitable computer-readable storage medium may be utilized including hard disks, CD-ROMs, optical storage devices, or magnetic storage devices, whether internal, networked, or cloud-based.

Embodiments of this disclosure have been described with reference to diagrams, flowcharts, and other illustrations of computer-implemented methods, systems, apparatuses, and computer program products. Each block of the block diagrams and flowchart illustrations, and combinations of blocks in the block diagrams and flowchart illustrations, respectively, can be implemented by processor-accessible instructions. Such instructions can include, for example, computer program instructions (e.g., processor-readable and/or processor-executable instructions). The processor-accessible instructions can be built (e.g., linked and compiled) and retained in processor-executable form in one or multiple memory devices or one or many other processor-accessible non-transitory storage media. These computer program instructions (built or otherwise) may be loaded onto a general-purpose computer, special purpose computer, or other programmable data processing apparatus to produce a machine. The loaded computer program instructions can be accessed and executed by one or multiple processors or other types of processing circuitry. In response to execution, the loaded computer program instructions provide the functionality described in connection with flowchart blocks (individually or in a particular combination) or blocks in block diagrams (individually or in a particular combination). Thus, such instructions which execute on the computer or other programmable data processing apparatus create a means for implementing the functions specified in the flowchart blocks (individually or in a particular combination) or blocks in block diagrams (individually or in a particular combination).

These computer program instructions may also be stored in a computer-readable memory that can direct a computer or other programmable data processing apparatus to function in a particular manner, such that the instructions stored in the computer-readable memory produce an article of manufacture including processor-accessible instruction (e.g., processor-readable instructions and/or processor-executable instructions) to implement the function specified in the flowchart blocks (individually or in a particular combination) or blocks in block diagrams (individually or in a particular combination). The computer program instructions (built or otherwise) may also be loaded onto a computer or other programmable data processing apparatus to cause a series of operations to be performed on the computer or other programmable apparatus to produce a computer-implemented process. The series of operations can be performed in response to execution by one or more processor or other types of processing circuitry. Thus, such instructions that execute on the computer or other programmable apparatus provide operations for implementing the functions specified in the flowchart blocks (individually or in a particular combination) or blocks in block diagrams (individually or in a particular combination).

Accordingly, blocks of the block diagrams and flowchart illustrations support combinations of means for performing the specified functions in connection with such diagrams and/or flowchart illustrations, combinations of operations for performing the specified functions and program instruction means for performing the specified functions. Each block of the block diagrams and flowchart illustrations, and combinations of blocks in the block diagrams and flowchart illustrations, can be implemented by special purpose hardware-based computer systems that perform the specified functions or operations, or combinations of special purpose hardware and computer instructions.

As is used in this specification and annexed drawings, the terms "module," "component," "system," "platform," and the like, can refer to and/or can include a computer-related entity or an entity related to an operational machine with one or more specific functionalities. Such entities can be either hardware, a combination of hardware and software, software (program code or executable program code, for example), or software in execution. In one example, a component can be a process running on a processor, a processor, an object, an executable (e.g., binary software), a thread of execution, a computer program, and/or a computing device. Simply as an illustration, a software application running on a server device can be a component and the server device also can be a component. One or more modules can reside within a process and/or thread of execution. One or more components also can reside within a process and/or thread of execution. Each one of a module and a component can be localized on one computing device and/or distributed between two or more computing devices. In another example, respective components (or modules) can execute from various computer-readable storage media having various data structures stored thereon. The components (or modules) can communicate via local and/or remote processes such as in accordance with a signal having one or more data packets (e.g., data from one component interacting with another component in a local system, distributed system, and/or across a network such as the Internet with other systems via the signal). As another illustrations, in some cases, a component can emulate an electronic component via a virtual machine, e.g., within a cloud computing system. The terms "module" and "component" (and their plural versions) may be used interchangeably where clear from context, in some cases.

As is used in this specification and annexed drawings, the term "processor" can refer to substantially any computing processing unit or computing device, including single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to electronic circuitry designed in assembled to execute code instructions and/or operate on data and signaling. Such electronic circuitry can be assembled in a chipset, for example. Accordingly, in some cases, a processor can be embodied, or can include, an application specific integrated circuit (ASIC), a digital signal processor (DSP), a field programmable gate array (FPGA), a complex programmable logic device (CPLD), a discrete gate or transistor logic, discrete hardware components, or any combination thereof designed and assembled to perform the functionality described herein. Further, in some cases, processors can exploit nano-scale architectures, such as molecular and quantum-dot based transistors, switches and gates, in order to optimize space usage or enhance performance of computing devices. A processor can also be implemented as a combination of computing processing units.

Further, in this specification and annexed drawings, terms such as "storage," "data storage," "repository," and substantially any other information storage component relevant to operation and functionality of a system, subsystem, module, and component are utilized to refer to "memory components," entities embodied in a "memory," or components including a memory. As is described herein, memory and/or memory components of this disclosure can be either volatile memory or nonvolatile memory, or can include both volatile and nonvolatile memory. Simply as an illustration, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Embodiments of this disclosure are not limited to these types of memory, and other types of memory devices can be contemplated.

The methods, apparatuses, devices, and systems can employ artificial intelligence techniques such as machine learning and iterative learning. Examples of such techniques include, but are not limited to, expert systems, case-based reasoning, Bayesian networks, behavior-based AI, neural networks, fuzzy systems, evolutionary computation (e.g. genetic algorithms), swarm intelligence (e.g. ant algorithms), and hybrid intelligent systems (e.g. expert inference rules generated through a neural network or production rules from statistical learning).

While the computer-implemented methods, apparatuses, devices, and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its operations be performed in a specific order. Accordingly, where a method claim does not actually recite an order to be followed by its operations or it is not otherwise specifically stated in the claims or descriptions that the operations are to be limited to a specific order, it is in no way intended that an order be inferred, in any respect. This holds for any possible non-express basis for interpretation, including: matters of logic with respect to arrangement of operations or operational flow; plain meaning derived from grammatical organization or punctuation; the number or type of embodiments described in the specification.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

What is claimed is:

1. A computer-implemented method comprising:
identifying a group of one or more references to respective first virtual partitions, the group of one or more references defining a graph representative of a logical organization of the respective first virtual partitions, wherein the graph comprises a first node representing a first one of the respective first virtual partitions and a second node representing a second one of the respective first virtual partitions;
determining, by a parse component, based on a parse of the one or more references, that the group of one or more references satisfies a consistency criterion;
generating, by a merge component, a second virtual partition by flattening the graph, the second virtual partition containing one or more computer-readable components present in the respective first virtual partitions, wherein the flattening comprises applying, in graph order, one or more primitive code segments present in at least one of the respective first virtual partitions;
generating, by a build subsystem, based on the one or more computer-readable components, one or more computer-executable components; and
executing the one or more computer-executable components.

2. The computer-implemented method of claim 1, further comprising generating an executable package component by combining the one or more computer-readable components with second computer-executable components corresponding to a group of core modules.

3. The computer-implemented method of claim 1, further comprising retaining the one or more computer-executable components within a data repository, wherein the one or more computer-executable components comprise at least one tenant-specific extension module.

4. The computer-implemented method of claim 1, wherein the one or more computer-readable components comprise abstraction data defining human-readable content defining a manner of extending a tenant-specific service, wherein the human-readable content is devoid of program code or the human-readable content comprises a snippet of program code.

5. The computer-implemented method of claim 4, wherein the generating, based on the one or more computer-readable components, the one or more computer-executable components comprises:
transforming the human-readable content into at least one program code artifact; and
building, using the at least one program code artifact, at least one particular computer-executable component of the one or more computer-executable components.

6. The computer-implemented method of claim 4, wherein the generating, based on the one or more computer-readable components, the one or more computer-executable components comprises:
accessing, from the second virtual partition, the abstraction data;
accessing a code template; and
generating, based on the abstraction data and the code template, a first computer-executable component of the one or more computer-executable components.

7. The computer-implemented method of claim 3, wherein the second virtual partition forms a part of the data repository, and wherein the respective first virtual partitions form part of a second data repository.

8. The computer-implemented method of claim 1, wherein a reference of the group of one or more references comprises a unique location identifier indicative of a location, within a computer network, of a particular virtual partition of the respective first virtual partitions and further comprises a datum identifying a version of the particular virtual partition.

9. The computer-implemented method of claim 8, wherein the unique location identifier comprises a uniform resource locator (URL), and wherein the version corresponds to a perennial unique identifier indicative of immutable content that forms the particular virtual partition at a defined time.

10. The computer-implemented method of claim 1, wherein the flattening further comprises:
generating respective copies of configuration assets within the respective first virtual partitions; and
retaining, in the graph order, the respective copies within the second virtual partition.

11. The computer-implemented method of claim 10, wherein the flattening further comprises:
determining that a conflict is present among a first copy of the respective copies and a second copy of the respective copies; and
determining a solution to the conflict by applying a defined process based on one or more policies.

12. The computer-implemented method of claim 10, wherein the flattening further comprises:
determining that a conflict is present among a first copy of the respective copies and a second copy of the respective copies;
sending a report indicative of the conflict;
receiving resolution data defining a solution to the conflict; and
resolving the conflict by applying the solution.

13. A computing system comprising:
one or more processors; and
one or more memory devices storing computer-executable instructions that, in response to execution by the one or more processors, cause the computing system to:
identify a group of one or more references to respective first virtual partitions, the group of one or more references defining a graph representative of a logical organization of the respective first virtual partitions, wherein the graph comprises a first node representing a first one of the respective first virtual partitions and a second node representing a second one of the respective first virtual partitions;
determine, by a parse component, based on a parse of the one or more references, that the group of one or more references satisfies a consistency criterion;
generate, by a merge component, a second virtual partition by flattening the graph, the second virtual partition containing one or more computer-readable components present in the respective first virtual partitions, wherein the flattening comprises applying, in graph order, one or more primitive code segments present in at least one of the respective first virtual partitions;
generate, based on the one or more computer-readable components, one or more computer-executable components; and
execute the one or more computer-executable components.

14. The computing system of claim 13, the one or more memory devices storing further computer-executable instructions that, in response to further execution by the one or more processors, further cause the computing system to generate an executable package component by combining the one or more computer-readable components with second computer-executable components corresponding to a group of core modules.

15. The computing system of claim 13, the one or more memory devices storing further computer-executable instructions that, in response to further execution by the one or more processors, further cause the computing system to retain the one or more computer-executable components within a data repository, wherein the one or more computer-executable components comprise at least one tenant-specific extension module.

16. The computing system of claim 13, wherein the one or more computer-readable components comprise abstraction data defining human-readable content defining a manner of extending a tenant-specific service, wherein the human-readable content is devoid of program code or the human-readable content comprises a snippet of program code.

17. The computing system of claim 16, wherein generating, based on the one or more computer-readable components, the one or more computer-executable components comprises:
transforming the human-readable content into at least one program code artifact; and
building, using the at least one program code artifact, at least one particular computer-executable component of the one or more computer-executable components.

18. The computing system of claim 16, wherein generating, based on the one or more computer-readable components, the one or more computer-executable components comprises:
accessing, from the second virtual partition, the abstraction data;
accessing a code template; and
generating, based on the abstraction data and the code template, a first computer-executable component of the one or more computer-executable components.

19. The computing system of claim 15, wherein the second virtual partition forms a part of the data repository, and wherein the respective first virtual partitions form part of a second data repository.

20. The computing system of claim 13, wherein the flattening comprises:
generating respective copies of configuration assets within the respective first virtual partitions; and
retaining, in the graph order, the respective copies within the second virtual partition.

21. The computing system of claim 20, wherein the flattening further comprises:
determining that a conflict is present among a first copy of the respective copies and a second copy of the respective copies; and
determining a solution to the conflict by applying a defined process based on one or more policies.

22. The computing system of claim 20, wherein the flattening further comprises:
determining that a conflict is present among a first copy of the respective copies and a second copy of the respective copies;
sending a report indicative of the conflict;
receiving resolution data defining a solution to the conflict; and
resolving the conflict by applying the solution.

23. At least one non-transitory computer-readable storage medium having processor-executable instructions encoded thereon that, in response to execution, cause a computing system to:
identify a group of one or more references to respective first virtual partitions, the group of one or more references defining a graph representative of a logical organization of the respective first virtual partitions, wherein the graph comprises a first node representing a first one of the respective first virtual partitions and a second node representing a second one of the respective first virtual partitions;

determine, by a parse component, based on a parse of the one or more references, that the group of one or more references satisfies a consistency criterion;

generate, by a merge component, a second virtual partition by flattening the graph, the second virtual partition containing one or more computer-readable components present in the respective first virtual partitions, wherein the flattening comprises applying, in graph order, one or more primitive code segments present in at least one of the respective first virtual partitions;

generate, by a build subsystem, based on the one or more computer-readable components, one or more computer-executable components; and execute the one or more computer-executable components.

24. The at least one computer-readable non-transitory storage medium of claim 23, wherein the processor-executable instructions, in response to further execution, further cause the computing system to generate an executable package component by combining the one or more computer-readable components with second computer-executable components corresponding to a group of core modules.

25. The at least one computer-readable non-transitory storage medium of claim 23, wherein the processor-executable instructions, in response to further execution, further cause the computing system to retain the one or more computer-executable components within a data repository, wherein the one or more computer-executable components comprise at least one tenant-specific extension module.

26. The at least one computer-readable non-transitory storage medium of claim 23, wherein the one or more computer-readable components comprise abstraction data defining human-readable content defining a manner of extending a tenant-specific service, wherein the human-readable content is devoid of program code or the human-readable content comprises a snippet of program code.

27. The at least one computer-readable non-transitory storage medium of claim 26, wherein generating, based on the one or more computer-readable components, the one or more computer-executable components comprises:

transforming the human-readable content into at least one program code artifact; and building, using the at least one program code artifact, at least one particular computer-executable component of the one or more computer-executable components.

28. The at least one computer-readable non-transitory storage medium of claim 26, wherein generating, based on the one or more computer-readable components, the one or more computer-executable components comprises:

accessing, from the second virtual partition, the abstraction data;

accessing a code template; and generating, based on the abstraction data and the code template, a first computer-executable component of the one or more computer-executable components.

29. The at least one computer-readable non-transitory storage medium of claim 25, wherein the second virtual partition forms a part of the data repository, and wherein the respective first virtual partitions form part of a second data repository.

30. The at least one computer-readable non-transitory storage medium of claim 23, wherein a reference of the group of one or more references comprises a unique location identifier indicative of a location, within a computer network, of a particular virtual partition of the respective first virtual partitions and further comprises a datum identifying a version of the particular virtual partition.

31. The at least one computer-readable non-transitory storage medium of claim 30, wherein the unique location identifier comprises a uniform resource locator (URL), and wherein the version corresponds to a perennial unique identifier indicative of immutable content that forms the particular virtual partition at a defined time.

32. The at least one computer-readable non-transitory storage medium of claim 23, wherein the flattening comprises:

generating respective copies of configuration assets within the respective first virtual partitions; and retaining, in the graph order, the respective copies within the second virtual partition.

33. The at least one computer-readable non-transitory storage medium of claim 32, wherein the flattening further comprises:

determining that a conflict is present among a first copy of the respective copies and a second copy of the respective copies; and determining a solution to the conflict by applying a defined process based on one or more policies.

34. The at least one computer-readable non-transitory storage medium of claim 32, wherein the flattening further comprises:

determining that a conflict is present among a first copy of the respective copies and a second copy of the respective copies;

sending a report indicative of the conflict;

receiving resolution data defining a solution to the conflict; and resolving the conflict by applying the solution.

\* \* \* \* \*